(12) United States Patent
Mei et al.

(10) Patent No.: US 12,164,209 B2
(45) Date of Patent: *Dec. 10, 2024

(54) ELECTROCHROMIC DEVICES HAVING N-DOPED CONDUCTIVE POLYMER AS TRANSPARENT CONDUCTING LAYER, ION STORAGE LAYER, AND/OR ELECTROCHROMIC LAYER

(71) Applicant: AMBILIGHT INC, Grand Cayman (KY)

(72) Inventors: Jianguo Mei, West Lafayette, IN (US); Inho Song, West Lafayette, IN (US); Ashkan Abtahi, West Lafayette, IN (US)

(73) Assignee: AMBILIGHT INC, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,911

(22) Filed: Dec. 7, 2023

(65) Prior Publication Data
US 2024/0160073 A1    May 16, 2024

Related U.S. Application Data

(63) Continuation-in-part of application No. 18/099,850, filed on Jan. 20, 2023, which is a continuation-in-part (Continued)

(51) Int. Cl.
*G02F 1/1516* (2019.01)
*B32B 17/06* (2006.01)
(Continued)

(52) U.S. Cl.
CPC .......... *G02F 1/15165* (2019.01); *B32B 17/06* (2013.01); *B32B 27/08* (2013.01);
(Continued)

(58) Field of Classification Search
CPC ........ G02F 1/15; G02F 1/155; G02F 1/15165; G02F 1/163; G02F 1/1514; G02F 1/1516;
(Continued)

(56) References Cited

U.S. PATENT DOCUMENTS

| | | | |
|---|---|---|---|
| 6,795,226 B2 * | 9/2004 | Agrawal | G02F 1/163 359/254 |
| 2005/0200935 A1 | 9/2005 | Liu et al. | |

(Continued)

FOREIGN PATENT DOCUMENTS

| | | |
|---|---|---|
| EP | 4365262 A1 | 5/2024 |
| WO | 2005084350 A2 | 9/2005 |

(Continued)

OTHER PUBLICATIONS

Written Opinion of the International Searching Authority and International Search Report for PCT Application No. PCT/US2022/048711 mailed on Feb. 8, 2023 (27 pages).

(Continued)

*Primary Examiner* — Jie Lei

(57) ABSTRACT

This disclosure presents electrochromic devices that incorporate an n-doped organic conductive polymer, which can function as a transparent conductor, and/or ion storage material, and/or an electrochromic material in the electrochromic devices.

30 Claims, 36 Drawing Sheets

Related U.S. Application Data of application No. PCT/US2022/048711, filed on Nov. 2, 2022.

(51) Int. Cl.
| | |
|---|---|
| *B32B 27/08* | (2006.01) |
| *B32B 27/36* | (2006.01) |
| *B32B 37/24* | (2006.01) |
| *C09D 161/02* | (2006.01) |
| *G02F 1/153* | (2006.01) |

(52) U.S. Cl.
CPC .............. *B32B 27/36* (2013.01); *B32B 37/24* (2013.01); *C09D 161/02* (2013.01); *G02F 1/1533* (2013.01); *B32B 2037/243* (2013.01); *B32B 2250/02* (2013.01); *B32B 2255/10* (2013.01); *B32B 2255/26* (2013.01); *B32B 2255/28* (2013.01); *B32B 2307/202* (2013.01); *B32B 2307/412* (2013.01); *B32B 2457/20* (2013.01)

(58) Field of Classification Search
CPC ........ G02F 1/1533; G02F 1/153; G02F 1/157; G02F 1/1525; G02F 1/1523; G02F 1/1508; B32B 17/06; B32B 27/08; B32B 27/36; B32B 37/24; B32B 2250/02; B32B 2255/10; B32B 2255/26; B32B 2255/28; B32B 2307/202; B32B 2307/412; B32B 2457/20; B32B 2037/243; C09D 161/02
USPC ................ 359/265, 266, 270, 271, 273, 900
See application file for complete search history.

(56) References Cited

U.S. PATENT DOCUMENTS

| | | | |
|---|---|---|---|
| 2020/0387040 | A1* | 12/2020 | He ........................ G02F 1/1525 |
| 2021/0141281 | A1 | 5/2021 | Trajkovska-Broach et al. |
| 2021/0232014 | A1 | 7/2021 | Mei et al. |
| 2023/0312785 | A1 | 10/2023 | Huang et al. |

FOREIGN PATENT DOCUMENTS

| | | |
|---|---|---|
| WO | 2017148864 A1 | 9/2017 |
| WO | 2020/018621 A1 | 1/2020 |
| WO | 2020/051419 A1 | 3/2020 |

OTHER PUBLICATIONS

The extended European search report issued for European Application No. 24152993.2, dated Jun. 11, 2024, 8 pages.
The extended European search report issued for European Application No. 24152973.4, dated Jun. 11, 2024, 7 pages.

* cited by examiner

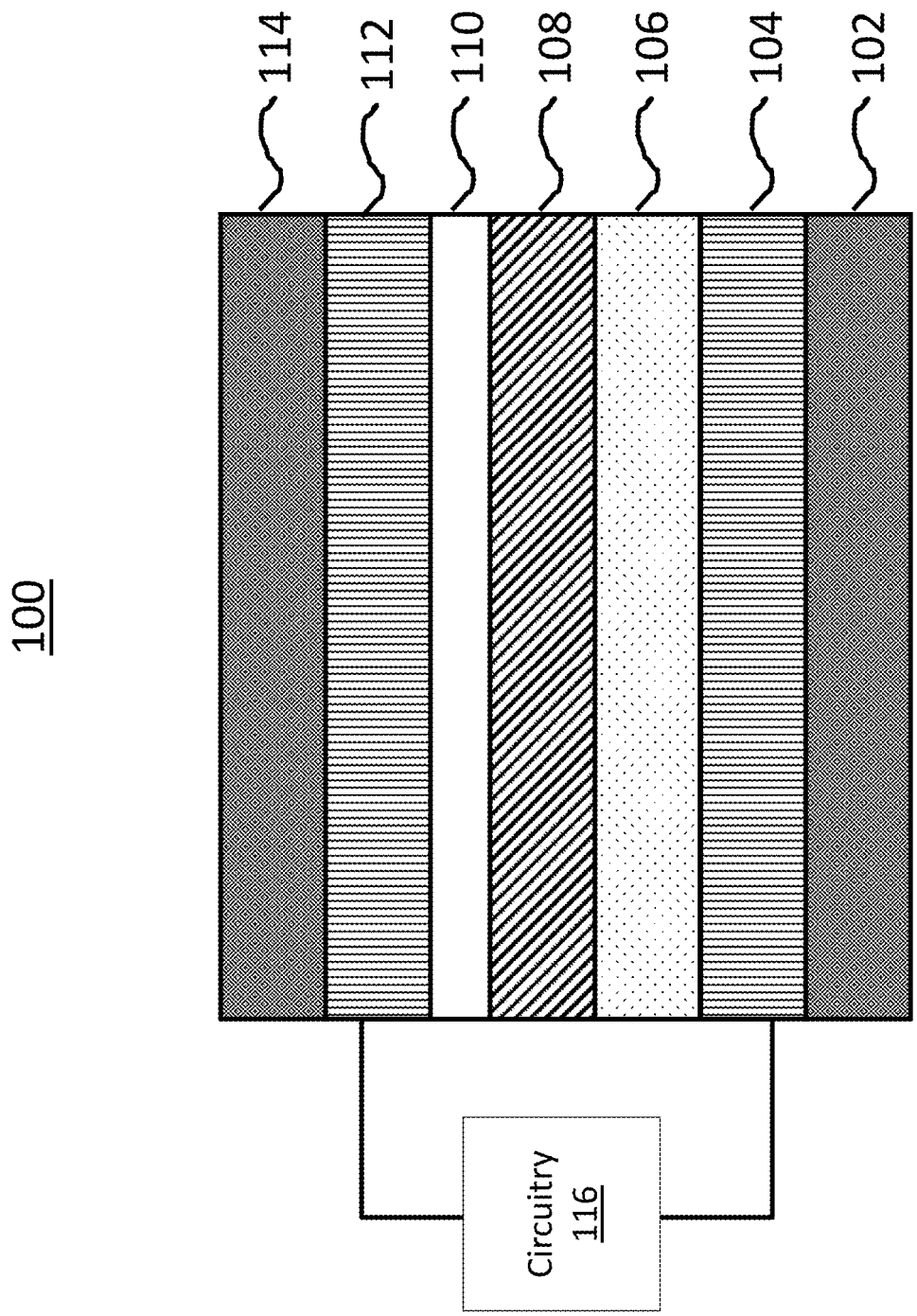

ELECTROCHROMIC DEVICES HAVING N-DOPED CONDUCTIVE POLYMER AS TRANSPARENT CONDUCTING LAYER, ION STORAGE LAYER, AND/OR ELECTROCHROMIC LAYER

CROSS-REFERENCE TO RELATED APPLICATIONS

This application is a Continuation-In-Part application of U.S. application Ser. No. 18/099,850, filed on Jan. 20, 2023, which is a Continuation-In-Part application of International Application No. PCT/US2022/048711, filed on Nov. 2, 2022. The entire contents of all the above applications are incorporated herein by reference in their entirety.

FIELD OF THE INVENTION

The present invention is related to electrochromic devices having an n-doped organic conductive polymer, which can serve as a transparent conducting layer, or/and an ion storage layer, or/and an electrochromic layer.

BACKGROUND

An electrochromic device (ECD) typically consists of seven layers, including, two non-conductive layers as substrates, one or two transparent conducting (TC) layers, an electrochromic layer as a working electrode (WE), an ion storage layer as a counter electrode (CE), and an electrolyte layer. The electrochromic layer undergoes a color changing when an external electrical bias is applied. Meanwhile, the ion storage layer undergoes opposite reactions to the one in the electrochromic layer to balance the charge generated at the electrochromic layer. Between an electrochromic layer and an ion storage layer is an electrolyte layer that functions as the ion source and ion conduction channel. The electrochromic and ion storage layers are disposed on transparent conductors, which is the current collector for the device. When two transparent conductor layers are chosen, the device functions as a transmissive device. While one layer of transparent conductor is used (e.g., the other conducting layer is a reflective conducting layer), it typically functions as a reflective device. The most used TC layer in ECDs is indium tin oxide (ITO) because of its low sheet resistance, high optical transparency, and sufficiently large voltage window for most EC materials. However, ITO is mechanically fragile with a small bending radius and strain that limits its application in roll-to-roll manufacturing and flexible electronics. In addition, indium is a rare earth mineral, which has a scarce mineral reserve. With the increasing demand of ITO, indium availability will become highly constrained within two decades and a soaring price has been witnessed in recent years. Thus, it is highly desired to find ITO alternatives that offer high performance as well as low cost, and it is further appreciated to reduce layers of the ECDs to simplify device structures to further lower the cost. Further, solution-processable minimally color-changing transmissive ion storage materials are also desired to pair up with electrochromic materials for improved performance and durability.

SUMMARY

The present disclosure is related to electrochromic devices that comprise an n-doped organic conductive polymer.

In one aspect, the disclosed electrochromic device includes two substrates and a plurality of areas disposed between the two substrates and each of the areas comprises a first conducting layer; an electrolyte layer on the top of the first conducting layer; an electrochromic layer on the top of the electrolyte layer; and a second conducting layer on the top of the electrochromic layer. In the disclosed electrochromic device, the first conducting layer comprises an n-doped organic conductive polymer with a formula of

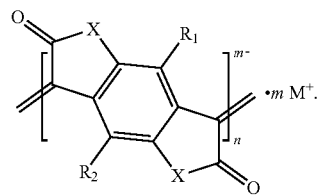

In this formula, X is O, S, or Se; each of m and n is an integer greater than zero; each of $R_1$ and $R_2$ is independently selected from one of hydrogen, halogen, or $C_1$-$C_{10}$ alkyl; $M^+$ is an organic or metal cation. In some embodiments, the second conducting layer comprises the n-doped organic conductive polymer. In some embodiments, a thickness of the second conducting layer is less than a thickness of the first conducting layer. In some embodiments, the disclosed electrochromic device further comprises an ion storage layer disposed between the first conducting layer and the electrolyte layer and here the ion storage layer does not comprise the n-doped organic conductive polymer. In some embodiments, each of the electrolyte layer and the electrochromic layer are made of polymer. In some embodiments, the electrolyte layer is a solid electrolyte layer. In some embodiments, the areas comprise a first area and a second area, wherein the first area comprises a first electrochromic layer different from a second electrochromic layer of the second area for displaying different colors. In some embodiments, at least one of the substrates is flexible. In some embodiments, the first conducting layer or the second conducting layer is transparent or semi-transparent. In some embodiments, the disclosed electrochromic device further comprises a conductive polymer interconnect connecting two adjacent areas. In some embodiments, the conductive polymer interconnect comprises the n-doped organic conductive polymer. In some embodiments, each of the areas in a bleached stated is transparent to enable the electrochromic device to become a see-through display. In some embodiments, the n-doped organic conductive polymer has minimal color changing transparency in wavelength between 380 nm and 800 nm with a color chroma change ΔC* less than 5 between an oxidized state and a reduced state of the n-doped organic conductive polymer. In some embodiments, the disclosed electrochromic device is operated at less than 3 volts. In some embodiments, the disclosed electrochromic device has a transmittance decay ΔT<5% for 1000 seconds of operation under an open circuit potential at each reduction or oxidation potential bias. In some embodiments, the areas comprise a first area and a second area, where the electrochromic layer and the second conducting layer of the first area are separated from the electrochromic layer and the second conducting layer of the second area, and the second conducting layer of the first area and the second conducting layer of the second area are connected by a first conductive polymer interconnect disposed therebetween. In some embodiments, the electrolyte layer and the first conducting layer of the first area are separated from the electrolyte layer and the first conducting layer of the second area, where the first conducting layer of the first area and the first conducting layer of the second area are connected by a second conductive polymer interconnect disposed therebetween.

In one aspect, the disclosed electrochromic device comprises two substrates and layers disposed between the two substrates. Here the layers comprise a first conducting layer; an electrolyte layer on top of the first conducting layer; an electrochromic layer on top of the electrolyte layer; and a second conducting layer on top of the electrochromic layer, where the first conducting layer comprises a n-doped poly(3,7-dihydrobenzo[1,2-b:4,5-b']difuran-2,6-dione) (n-PBDF) with a formula of

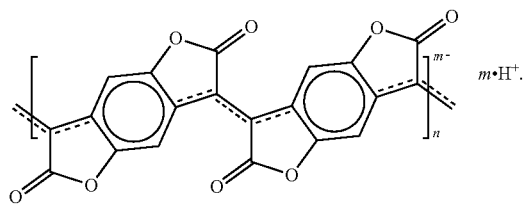

In this formula, each of m and n is an integer greater than zero. In some embodiments, the second conducting layer comprises n-PBDF. In some embodiments, a thickness of the second conducting layer is less than a thickness of the first conducting layer. In some embodiments, the disclosed electrochromic device comprises an ion storage layer disposed between the first conducting layer and the electrolyte layer and the ion storage layer comprises no n-PBDF. In some embodiments, each of the electrolyte layer and the electrochromic layer are made of polymer. In some embodiments, the electrolyte layer is a solid electrolyte layer. In some embodiments, at least one of the substrates is flexible. In some embodiments, the first conducting layer or the second conducting layer are transparent or semi-transparent. In some embodiments, the first conducting layer has minimal color changing transparency in wavelength between 380 nm and 800 nm with a color chroma change $\Delta C^*$ less than 5 between an oxidized state and a reduced state of the first conducting layer. In some embodiments, the disclosed electrochromic device is operated at less than 3 volts. In some embodiments, the disclosed electrochromic device has a transmittance decay $\Delta T<5\%$ for 1000 seconds of operation under an open circuit potential at each reduction or oxidation potential bias.

In one aspect, a method for forming an electrochromic device is disclosed. The method comprises coating a first conducting layer on a first substrate, where the first conducting layer comprises an n-doped organic conductive polymer with a formula of

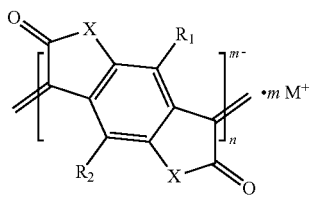

and in this formula, X is O, S, or Se; each of m and n is an integer greater than zero; each of $R_1$ and $R_2$ is independently selected from one of hydrogen or $C_1$-$C_{10}$ alkyl; $M^+$ is an organic or metal cation; patterning the first conducting layer to form first areas and first electric interconnects between adjacent first areas; coating a second conducting layer on a second substrate; patterning the second conducting layer to form second areas and second electric interconnects between adjacent second areas; and performing one of the following steps: a) forming a first electrolyte layer on each of the first areas, where the first electrolyte layers are separated from each other; forming an electrochromic layer on each of the second areas, where the electrochromic layers are separated from each other; forming a second electrolyte layer on each of the electrochromic layers, where the second electrolyte layers are separated from each other; and laminating the first substrate and the second substrate such that the first electrolyte layers are aligned with and in contact with the second electrolyte layers; or b) forming an electrolyte layer on each of the first areas, where the electrolyte layers are separated from each other; forming an electrochromic layer on each of the electrolyte layers, where the electrochromic layers are separated from each other; and laminating the first substrate and the second substrate such that the electrochromic layers are aligned with and in contact with the second areas; or c) forming an electrochromic layer on each of the second areas, where the electrochromic layers are separated from each other; forming an electrolyte layer on each of the electrochromic layers, where the electrolyte layers are separated from each other; and laminating the first substrate and the second substrate such that the electrolyte layers are aligned with and in contact with the first areas.

In one aspect, the disclosed electrochromic device includes a first insulating substrate; a first conducting layer disposed over the first insulating substrate, an ion storage layer disposed over the first conducting layer, an electrolyte layer disposed over the ion storage layer, an electrochromic layer disposed over the electrolyte layer, a second conducting layer disposed over the electrochromic layer, and a second insulating substrate disposed over the second conducting layer. In this electrochromic device, the first conducting layer or the second conducting layer or the ion storage layer or any combination thereof comprises an n-doped organic conductive polymer with the formula of

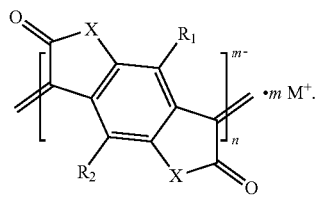

In this formula, X is O, S, or Se; each of m and n is an integer greater than zero; each of $R_1$ and $R_2$ is independently selected from one of hydrogen or $C_1$-$C_{10}$ alkyl; $M^+$ is an organic or metal cation on. In some embodiments, X is O, each of $R_1$ and $R_2$ is hydrogen, and $M^+$ is a proton. In some embodiments, the first conducting layer or the second conducting layer or the ion storage layer or any combination of the first conducting layer and the second conducting layer and the ion storage layer consists of the disclosed n-doped organic conductive polymer. In some embodiments, both the first conducting layer and the ion storage layer comprise the disclosed n-doped organic conductive polymer and are integrated into one single layer. Both inorganic and organic electrochromic materials may be used in the electrochromic layer in the electrochromic device disclosed herein. In some embodiments, the electrochromic layer in the electrochromic device disclosed herein includes one or more of $WO_3$, $NiO$, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles. Different types of electrolyte materials (e.g., liquid electrolyte, gel electrolyte, or solid electrolyte) may be used in the electrolyte layer in the electrochromic device disclosed herein. In some embodiments, the electrolyte layer in the electrochromic device disclosed herein includes a solid electrolyte or a gel electrolyte. Both inorganic and organic ion storage materials may be used in the ion storage layer in the electrochromic device disclosed herein. In some embodiments, when the ion storage layer does not include the disclosed n-doped organic conductive polymer, the ion storage layer in the electrochromic device disclosed herein includes one or more oxides of metal elements in Group 4-12, or a mixture of the oxides, or one of the oxides doped by any other metal oxides. In some embodiments, at least one of the first conducting layer and the second conducting layer is transparent. In some embodiments, both the first conducting layer and the second conducting layer are transparent. In some embodiments, the first conducting layer or the second conducting layer comprises a reflective conducting layer.

In another aspect, the disclosed electrochromic device includes a first insulating substrate; a first conducting layer disposed over the first insulating substrate, a first electrochromic layer disposed over the first conducting layer and comprising an n-doped organic

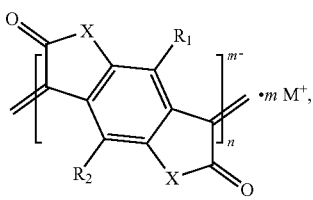

conductive polymer with the formula of an electrolyte layer disposed over the first electrochromic layer, a second electrochromic layer disposed over the electrolyte layer comprising a p-doped electrochromic material, a second conducting layer disposed over the second electrochromic layer, and a second insulating substrate disposed over the second conducting layer. In this formula, X is O, S, or Se; each of m and n is an integer greater than zero; each of $R_1$ and $R_2$ is independently selected from one of hydrogen or $C_1$-$C_{10}$ alkyl; $M^+$ is an organic or metal cation. In some embodiments, X is O, each of $R_1$ and $R_2$ is hydrogen, and $M^+$ is a proton. In some embodiments, the first electrochromic layer disposed over the first conducting layer consists of the disclosed n-doped organic conductive polymer. Both inorganic and organic p-doped electrochromic materials may be used in the second electrochromic layer in the electrochromic device disclosed herein. In some embodiments, the p-doped electrochromic material in the electrochromic device disclosed herein includes one or more $NiO$, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles. In some embodiments, the p-doped electrochromic material is a p-doped electrochromic polymer. Different types of electrolyte materials (e.g., liquid electrolyte, gel electrolyte, or solid electrolyte) may be used in the electrolyte layer in the electrochromic device disclosed herein. In some embodiments, the electrolyte layer in the electrochromic device disclosed herein includes a solid electrolyte or a gel electrolyte. In some embodiments, one of the first conducting layer or the second conducting layer comprises an inorganic conductive material. In some embodiments, the inorganic conductive material comprises indium tin oxide or a metal. In some embodiments, at least one of the first conducting layer or the second conducting layer is transparent. In some embodiments, both of the first conducting layer and the second conducting layer are transparent. In some embodiments, the first conducting layer or the second conducting layer are reflective and includes a reflective conducting material.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized. The accompanying drawings include:

FIG. 1 depicts a cross-section view of an electrochromic device that includes a layer of the disclosed n-doped organic conductive polymer functioning as a transparent conducting layer, according to one example embodiment of the present disclosure.

FIG. 3(A) is a schematic illustration of the 3-electrode electrochromic device, according to one example embodiment. FIG. 3(B) is the cross-sectional view of the working electrode in FIG. 3(A).

FIG. 5(A) is cyclic voltammograms of 30 nm thick n-BDF thin film at different rates on ITO in 0.2M Tetrabutylammonium-bis-trifluoromethanesulfonimidate (TBA-TFSI) in propylene carbonate (PC). FIG. 5(B) illustrates averaged current density at 0.3 V (vs. Ag/AgCl) plotted vs scan rate.

FIG. 7(A) is the spectro-electrochemistry at colored and bleached states and FIG. 7(B) depicts the switching kinetics from stepwise potential fast chronoamperometry (SPFC), according to one example embodiment.

FIG. 9(A) is the spectro-electrochemistry at colored and bleached states and FIG. 9(B) depicts the switching kinetics from SPFC, according to one example embodiment.

FIG. 10(A) is the spectro-electrochemistry at colored and bleached states and FIG. 10(B) depicts the switching kinetics from SPFC, according to one example embodiment.

FIG. 11(A) is the spectro-electrochemistry at colored and bleached states and FIG. 11(B) depicts the switching kinetics from SPFC, according to one example embodiment.

FIG. 14(A) the spectro-electrochemistry at colored and bleached states and FIG. 14(B) depicts the switching kinetics from SPFC, according to one example embodiment.

FIG. 16(A) shows optical absorption spectra. FIG. 16(B) shows CIE L*, a*, b* color coordinate values estimated from FIG. 16(A).

FIG. 18(A) shows optical absorbance spectra; FIG. 18(B) shows dynamic transmittance change; FIG. 18(C) shows optical memory.

FIG. 19(A) shows the comparison of dynamic coloration/bleaching rate and optical contrast; FIG. 19(B) shows the comparison of electrochromic efficiency; FIG. 19(C) shows the comparison of CIE a* and b* color coordinate value change.

FIG. 23(A) shows the coloration of target pixel P5. FIG. 23(B) shows the image as two target pixels are turned-on. The voltage of −0.8 V is applied for 10 s at the target pixels.

FIG. 25(A) is the image of a watch band. FIG. 27(B) is the image of human skin with ring-like structures.

DETAILED DESCRIPTION OF EMBODIMENTS

Figure 2A:
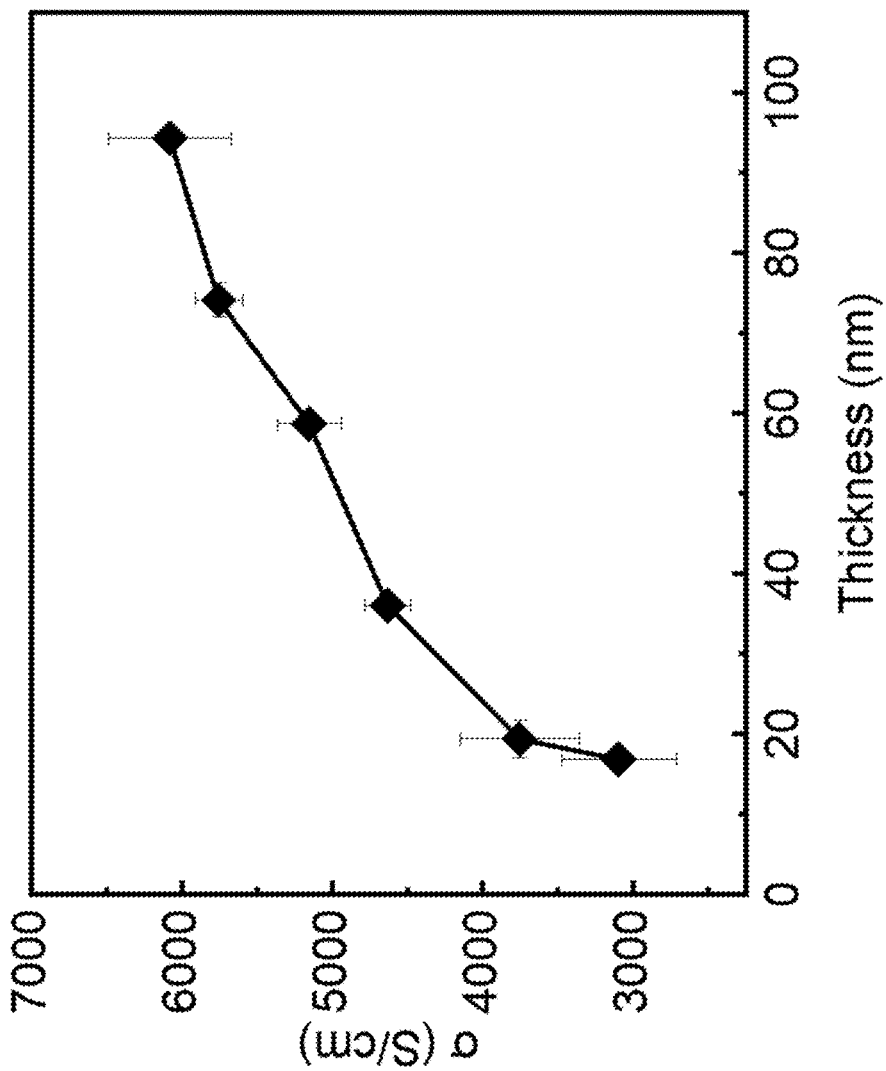
FIGS. 2(A)-(C) are diagrams containing the electrical conductivity (FIG. 2(A)), transmittance (FIG. 2(B)) and sheet resistance and transmittance at 550 nm (FIG. 2(C)) of an example n-doped organic conductive polymer n-PBDF thin films at different thicknesses, according to some example embodiments.

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments. "Transparent" means transmittance higher than 75% in visible light region. "Semi-transparent" means transmittance higher than 15% in visible light region.

Various embodiments described herein are directed to electrochromic devices that comprise an n-doped organic conductive polymer with the formula of

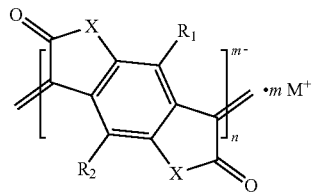

In this formula, X is O, S, or Se; each of m and n is an integer greater than zero; each of $R_1$ and $R_2$ is independently selected from one of hydrogen or $C_1$-$C_{10}$ alkyl; $M^+$ is an organic or metal cation. In some embodiments, X is O, each of $R_1$ and $R_2$ is hydrogen, and $M^+$ is a proton and the n-doped organic conductive polymer according to these embodiments is called a n-doped poly(3,7-dihydrobenzo[1,2-b:4,5-b']difuran-2,6-dione) (n-PBDF) with a formula of

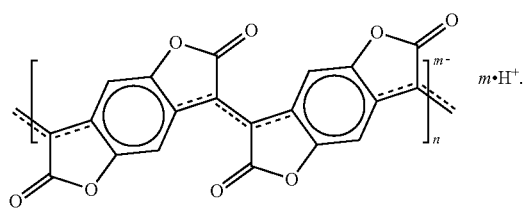

A layer including the disclosed n-doped organic conductive polymer may function as a transparent conducting (TC) layer, and/or an ion storage layer, and/or an electrochromic layer. Three specific electrochromic polymers are used throughout this specification for example purposes. It is to be understood that this disclosure is not limited to these examples. ECP-Magenta (ECP-M) is an example magenta-colored ECP. ECP-Blue (ECP-B) is an example blue-colored ECP. ECP-Black (ECP-BK) is an example black-colored ECP. Structures of the example ECP-M, ECP-B, and ECP-BK are shown in the following below, respectively, where n is an integer greater than zero.

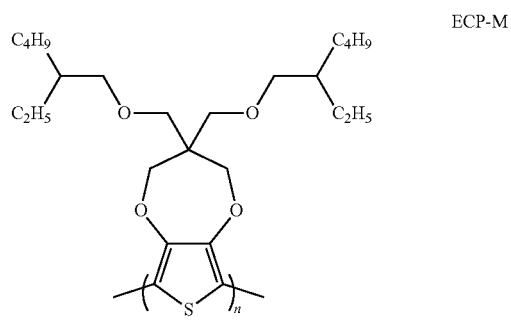

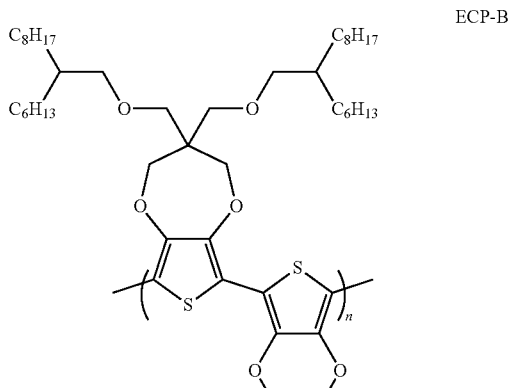

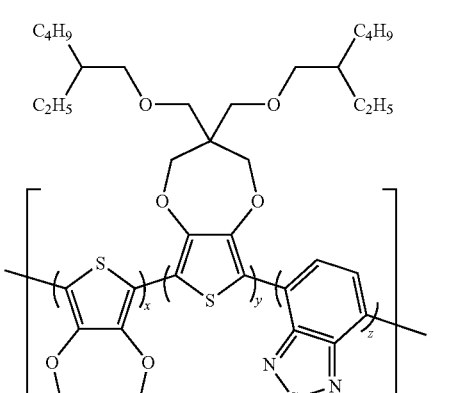

x = 0.65, y = 1, z = 0.35

A conventional ECD consists of seven layers, including, two non-conductive layers as substrates, one or two transparent conducting (TC) layers (one for a working electrode and one for a counter electrode) disposed on the substrates respectively, an electrochromic layer as a working electrode (WE), an ion storage layer as a counter electrode (CE), and an electrolyte layer interposed between the WE and CE. In the present disclosure, a layer including the disclosed n-doped organic conductive polymer can serve as a TC layer, or/and an ion storage layer, or/and an electrochromic layer. In some embodiments, the disclosed n-doped organic conductive polymer can replace traditional ITO to be great transparent conductor and a layer including the disclosed n-doped organic conductive polymer can function as at least one of the TC layers in an ECD. In some embodiments, a layer including the disclosed n-doped organic conductive polymer can function as the ion storage layer in an ECD. In some embodiments, a layer including the disclosed n-doped organic conductive polymer can function as both the TC layer for the counter electrode and the ion storage layer separately. In some embodiments, a layer including the disclosed n-doped organic conductive polymer can function as both the TC layer for the counter electrode and the ion storage layer simultaneously (e.g., integrated as one single layer), such that the layers are reduced, simplifying the electrochromic device structure. In some embodiments, a layer including the disclosed n-doped organic conductive polymer can function as the ion storage layer for the counter electrode and the TC layer for the working electrode separately. In some embodiments, a layer including the disclosed n-doped organic conductive polymer can function as both the TC layer for the counter electrode and the ion storage layer simultaneously (e.g., integrated as one single layer) and the TC layer for the working electrode, such that the layers are reduced, simplifying the electrochromic device structure. In some embodiments, a layer including the disclosed n-doped organic conductive polymer can function as both the TC layer for the counter electrode and the ion storage layer separately and the TC layer for the working electrode. In some embodiments, a layer including the disclosed n-doped organic conductive polymer can conduct a redox reaction to exhibit electrochromic properties to function as an electrochromic layer (as a counter electrode, to replace the conventional ion storage layer) to be paired with the electrochromic layer including a p-doped electrochromic material as a working electrode. In some embodiments, the disclosed ECD comprises a layer consisting of the disclosed n-doped organic conductive polymer. When a layer including the disclosed n-doped organic conductive polymer functioning as a TC layer and/or an ion storage layer might include, beside the disclosed n-doped organic conductive polymer, other components which will not significantly affect the layer's optical properties and electrical conductivity, such as electrolyte salts, (e.g. $Li^+$ salt, $Na^+$ salt, $TBA^+$ (tetrabutylammonium)) or some stabilizers to adjust its mechanical properties (e.g. PEG (polyethylene glycol), polystyrene). When a layer including the disclosed n-doped organic conductive polymer functioning as an electrochromic layer might include, beside the disclosed n-doped organic conductive polymer, other components which will not significantly affect the layer's optical properties and electrical conductivity, such as electrolyte salts, (e.g. $Li^+$ salt, $Na^+$ salt, $TBA^+$ (tetrabutylammonium)) or some stabilizers to adjust its mechanical properties (e.g. PEG (polyethylene glycol), polystyrene), or some other n-doped electrochromic materials, such as $WO_3$, viologen, or n-doped electrochromic polymers. A p-doped electrochromic material means the material undergoes an electrochromic process when being oxidized. A n-doped electrochromic materials means the material undergoes an electrochromic process when being reduced.

In the present disclosure, the disclosed n-doped organic conductive polymer shows low sheet resistance, high optical transparency, and large voltage window for most EC materials, which makes the disclosed n-doped organic conductive polymer an organic transparent conductor for ECDs. Besides that, the disclosed n-doped organic conductive polymer is mechanically flexible and can be easily applied to roll-to-roll manufacturing and flexible ECDs, which rivals traditional transparent conductor ITO. In an ECD disclosed in the present disclosure, when a layer including the disclosed n-doped organic conductive polymer functions as both the ion storage layer and the TC layer for the counter electrode simultaneously, the ECD structure can be simplified, thus can be manufactured with less cost and improved throughput. Therefore, the disclosed techniques can provide high performance ECDs with a lower cost.

In one aspect, the disclosed electrochromic device comprises a layer including the disclosed n-doped organic conductive polymer which does not go through a redox reaction and remains transparent within the applied device voltage window. There are three main different types of disclosed electrochromic device configurations. Each example configuration from each type is shown and discussed as follow.

The first type of the disclosed electrochromic device has at least one of the TC layers including the disclosed n-doped organic conductive polymer. As shown in FIG. 1, such example configuration may have a first insulating substrate 102, a first conducting layer 104 comprising the disclosed n-doped organic conductive polymer disposed over the first insulating substrate 102, an ion storage layer 106 disposed on the first conducting layer 104, an electrolyte layer 108 disposed over the ion storage layer 106, an electrochromic layer 110 disposed over the electrolyte layer 108, a second conducting layer 112 disposed over the electrochromic layer 110, a second insulating substrate 114 disposed over the second conducting layer 112, and circuitry 116 to operate the electrochromic device 100. In some embodiments, at least one of the first conducting layer or the second conducting layer is transparent (When the conducting layer is transparent, it is called a TC layer.). In some embodiments, both of the first conducting layer and the second conducting layer are transparent (For these disclosed ECDs, they have two TC layers.). In some embodiments, the first conducting layer or the second conducting layer comprises a reflective conducting layer, such as a metal layer, to form a reflective ECD. In some embodiments, the first conducting layer 104 may include a transparent conductor (e.g., ITO) without the disclosed n-doped organic conductive polymer while the second conducting layer 112 includes the disclosed n-doped organic conductive polymer. In some embodiments, both the first conducting layer 104 and the second conducting layer 112 include the disclosed n-doped organic conductive polymer. In some embodiments, at least one of the first conducting layer 104 and the second conducting layer 112 consists of the disclosed n-doped organic conductive polymer.

Figure 2B:
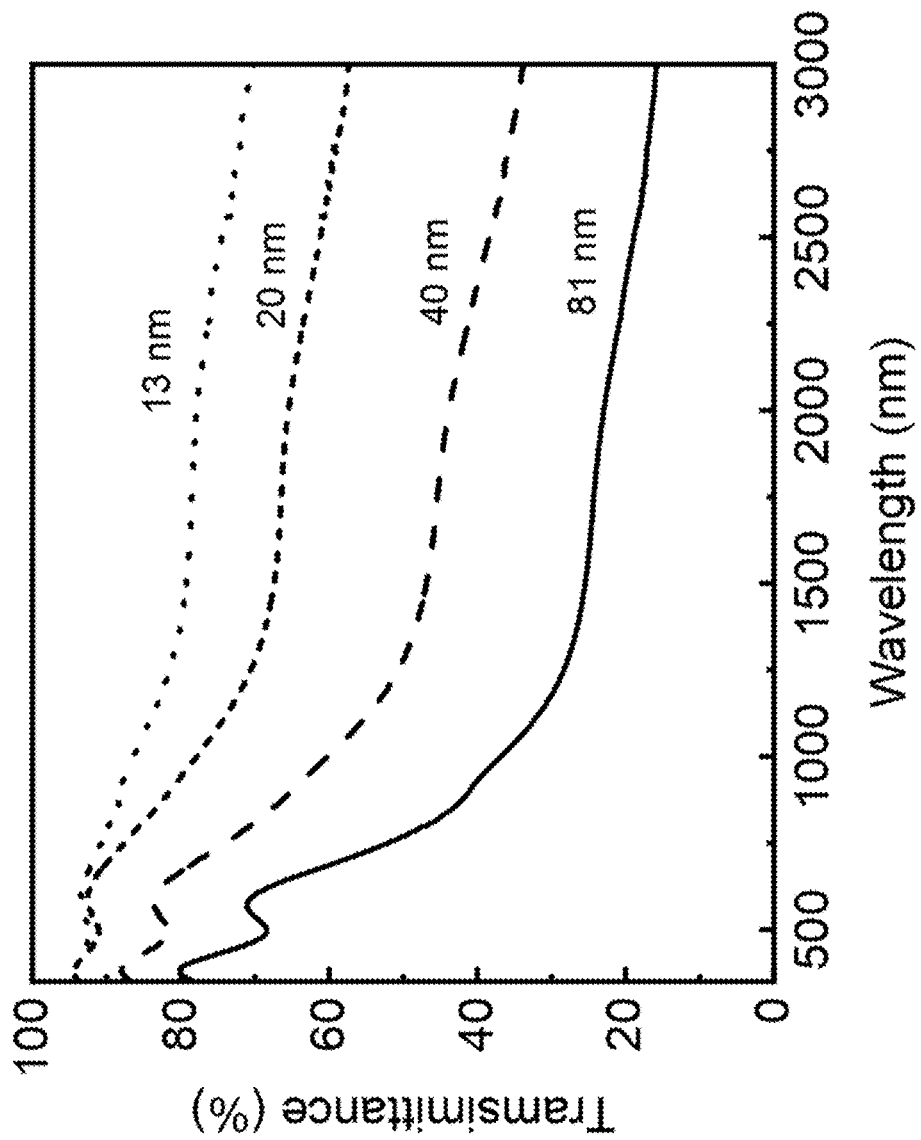
Figure 2C:
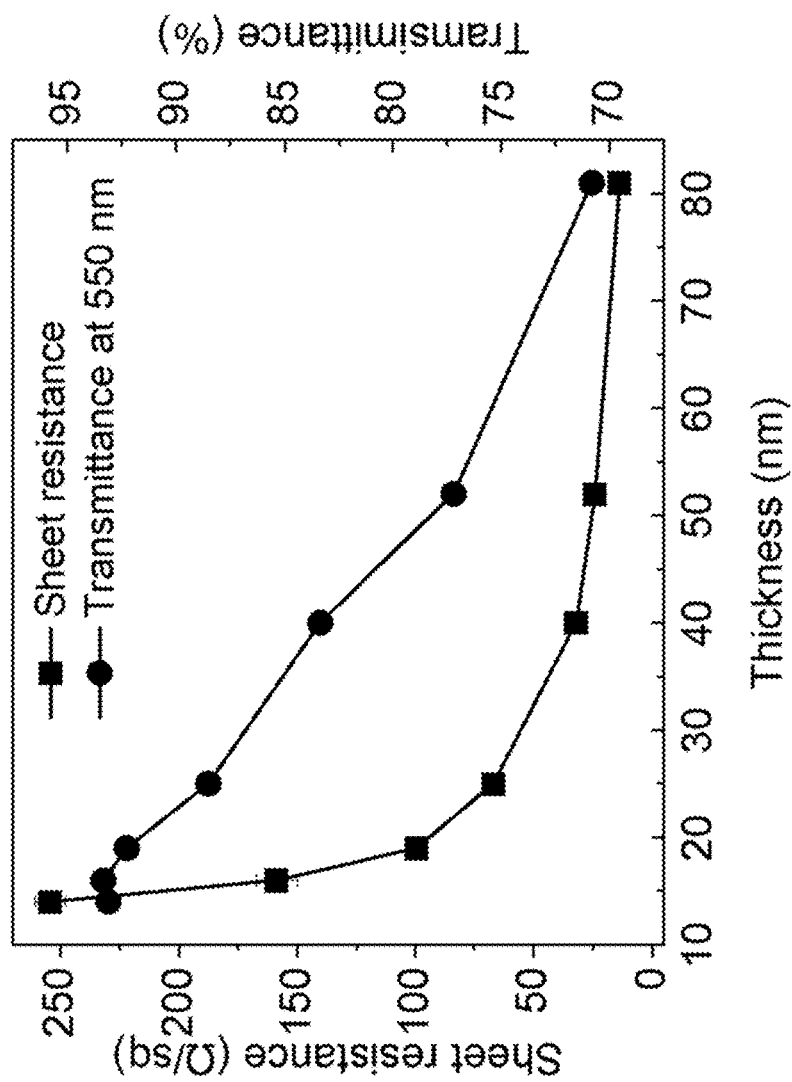

The disclosed n-doped organic conductive polymer can function as a high-performance transparent conductor. To demonstrate it, n-PBDF is used as an example n-doped organic conductive polymer and its optical transmittance, electrical conductivity and sheet resistance at various thicknesses are investigated. FIG. 2(A) is a diagram showing the conductivity of the thin films with thickness ranging from 16 nm to 94 nm. The conductivity of the thin films increases as the film thickness increases. It reaches 6100 S/cm around the thickness of 94 nm. Optical transmittance of n-PBDF thin films is depicted in FIG. 2(B). As shown in FIG. 2(B), the n-PBDF thin films show a high transmittance in the visible region (e.g., 400-700 nm). High conductivity and transmittance in the visible region of the thin films indicate that the disclosed n-doped organic conductive polymer is suitable to be used as a transparent conductor. This is further evident in FIG. 2(C) where sheet resistance and optical transmittance are plotted with film thickness. At 550 nm wavelength which human eye is the most sensitive to, the optimized n-PBDF thin film exhibits low sheet resistance of 45 Ω/sq and high transmittance ($T_{550}$>80%) which can rival traditional transparent conductor ITO. Thus, the disclosed n-doped organic conductive polymer is established as a high-performance transparent conductor.

Figure 3B:
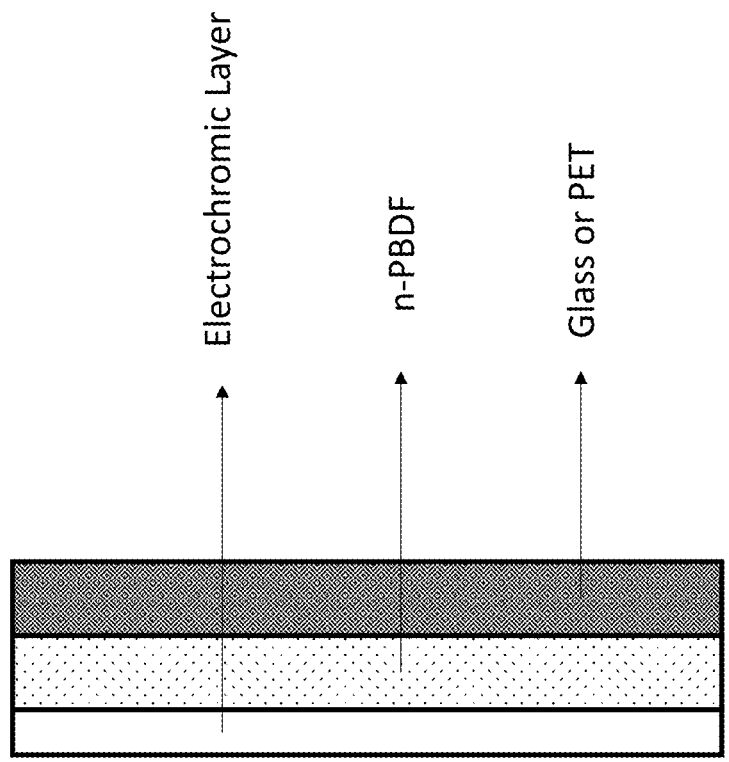
FIGS. 3(A)-(B) depict example designs of a 3-electrode electrochromic device including a layer of an example n-doped organic conductive polymer n-PBDF functioning as the TC layer of the electrochromic device.
Figure 3A:
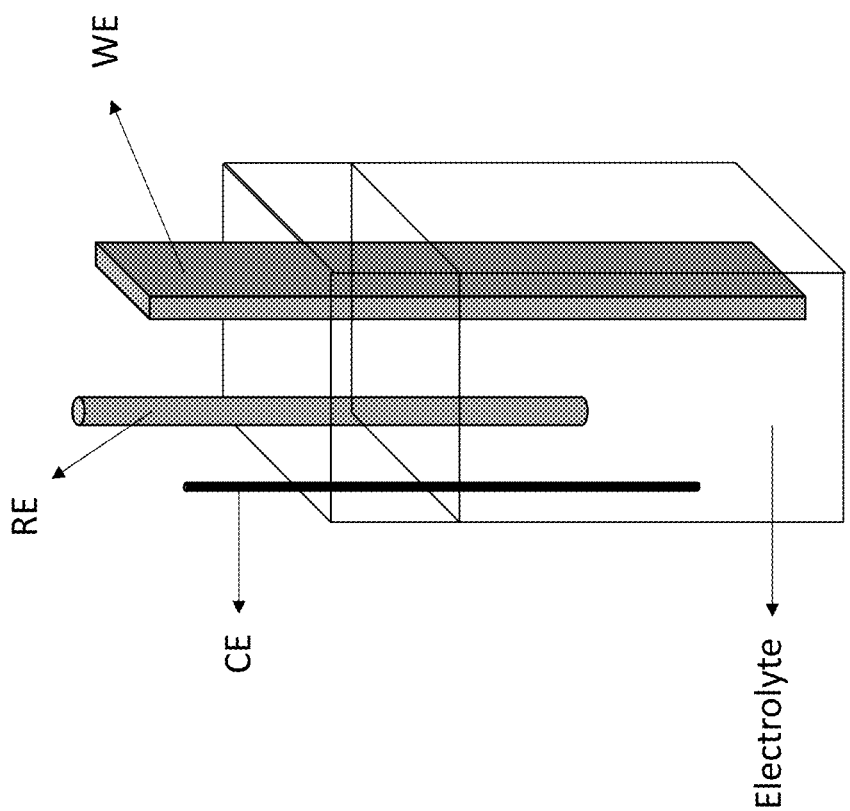
Figure 4B:
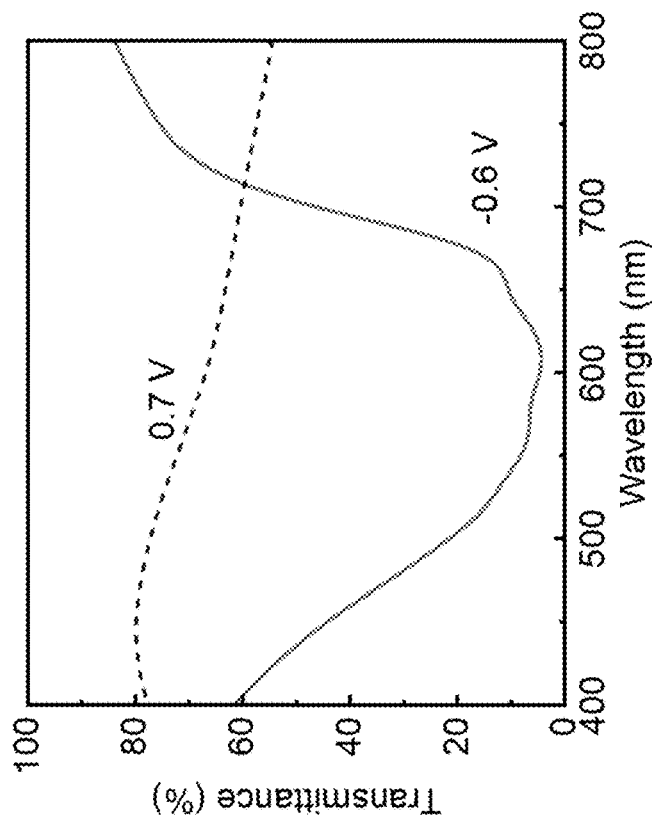
FIGS. 4(A)-(B) are diagrams containing cyclic voltammograms of electrochromic polymer (ECP)-B on ITO/substrate and on an example n-doped organic conductive polymer n-PBDF/substrate, and cyclic voltammograms of n-PBDF on a platinum button electrode (FIG.4(A)), and the spectro-electrochemistry of ECP-B on n-PBDF/substrate (FIG. 4(B)).
Figure 4A:
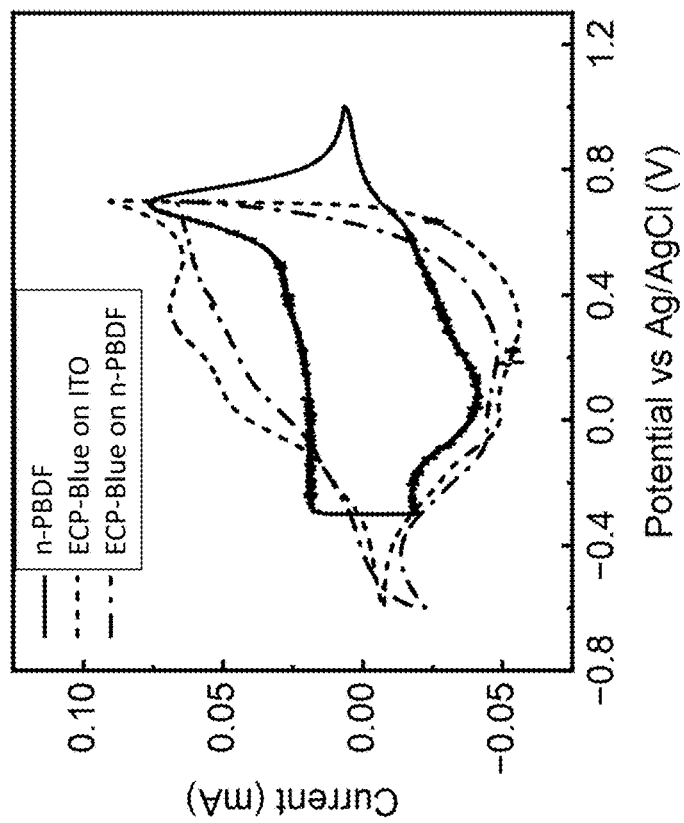

To simplify the demonstration of the disclosed n-doped organic conductive polymer functioning as a TC layer in an ECD, a 3-electrode electrochromic device 300 is adopted. As shown in schematic illustration in FIG. 3(A), the ECD 300 disclosed here includes a counter electrode (e.g., Pt) CE, a reference electrode (e.g., Ag/AgCl) RE, and a working electrode WE. As shown in a diagram illustrating a cross-section view of the working electrode WE in FIG. 3(B), the working electrode WE includes a piece of glass or PET as substrate, a layer of the disclosed n-doped organic conductive polymer as the transparent conductor, and a layer of electrochromic material (e.g., ECP-B) as the electrochromic layer. In one embodiment, a layer of the example n-doped organic conductive polymer n-PBDF with $T_{550}$ (transmittance at wavelength 550 nm)>85% and a $R_s$ (sheet resistance)<80 Ω/sq is first coated on a bare glass substrate, followed by an electrochromic layer, such as ECP-B. The glass slide is then immersed in a liquid electrolyte to set up a 3-electrode electrochromic device. In one embodiment, upon applying a positive potential up to 0.7 V (vs. Ag/AgCl), the ECP-B is gradually oxidized and becomes transmissive. This process is captured in spectro-electrochemical measurements of the ECP-B on n-PBDF/substrate structure as shown in FIG. 4(B). As the applied voltage increases, the transmittance of ECP-B in the visible region (e.g., 400-700 nm) increases. The same measurement is performed when ITO is used as a transparent electrode and a very similar electrochromic response is recorded. The CV measurement results for ECP-B on ITO/substrate, ECP-B on n-PBDF/substrate, and n-PBDF itself taken on a platinum button working electrode are shown in FIG. 4(A), ECP-B electrochromic layer shows ECP-B has the same oxidation onset on both ITO and n-PBDF transparent conductors at around −0.2 V (vs Ag/AgCl), which is about 0.8 V lower than the oxidation onset of n-PBDF (0.58 V vs Ag/AgCl). Thus, when the voltage applied to n-PBDF is lower than 0.58V, n-PBDF does not go through a redox reaction. Overall, these results demonstrate that the disclosed n-doped organic conductive polymer can be used as an TC layer in electrochromic devices without negatively affecting the optical and electrical property of the electrochromic devices and comparable to the inorganic TC (e.g., ITO).

Figure 5A:
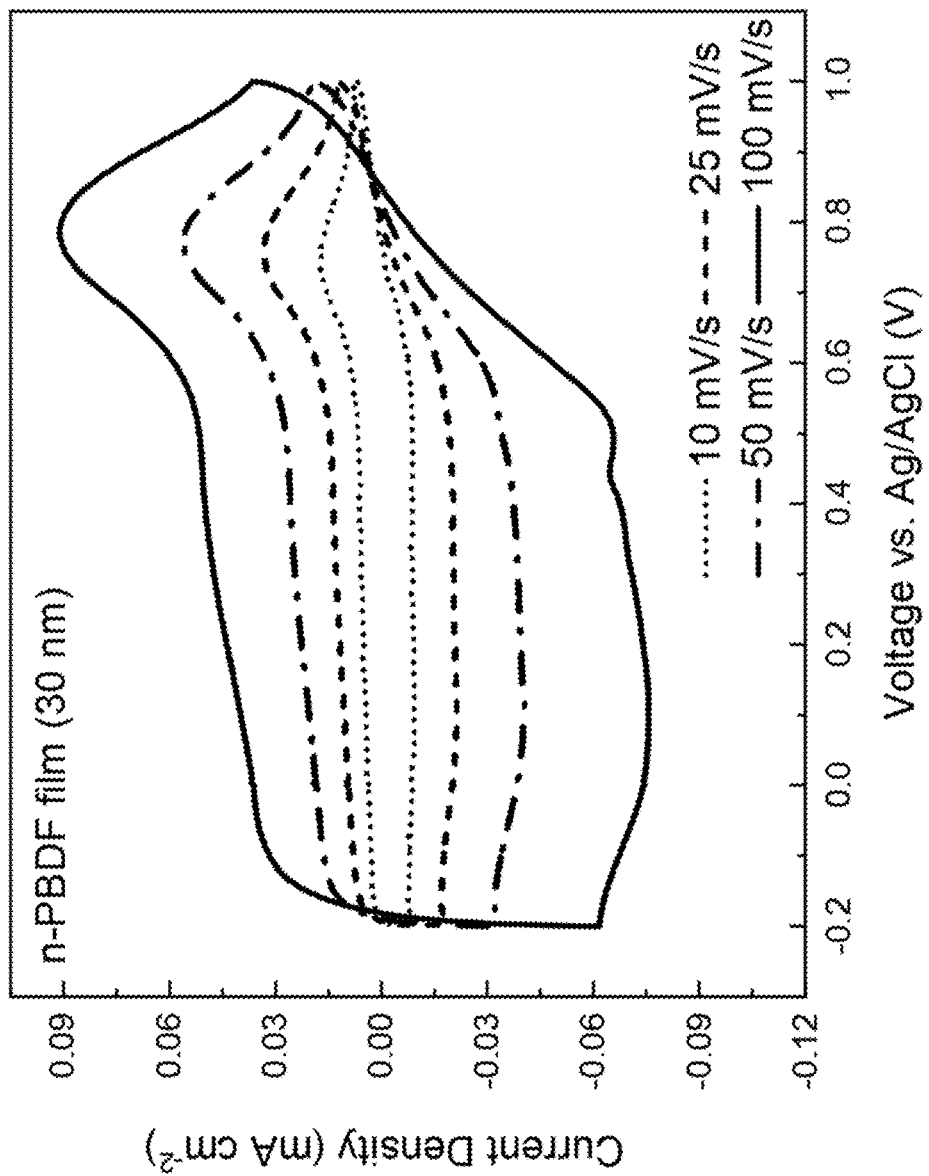
FIGS. 5(A)-(B) are diagrams illustrating charge capacity of an example n-doped organic conductive polymer n-PBDF.
Figure 5B:
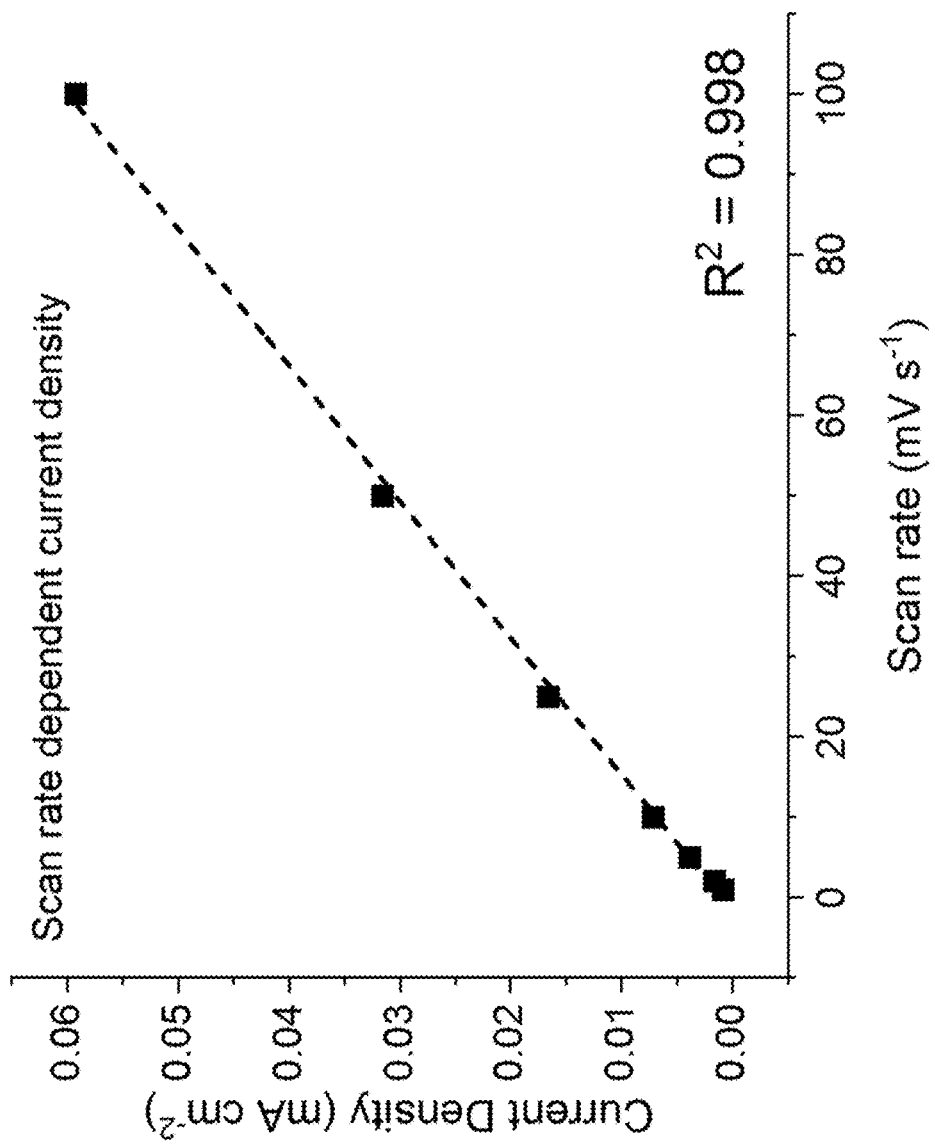

Besides transparency, the disclosed n-doped organic conductive polymer exhibits high charge density. The example n-doped organic conductive polymer n-PBDF is used for the demonstration. As shown in FIG. 5(A), the specific volumetric capacitance (C*) of an n-PBDF thin film was measured by recording cyclic voltammograms at different scan rates in 0.2 M TBA-TFSI (PC) electrolyte. According to the cyclic voltammograms, the non-zero current plateau in the −0.2 V to +0.4 V range represent double-layer capacitance. Capacitive behavior is also confirmed by the linear increase of the current density with the scan rate as shown in FIG. 5(B). Both high optical transmissivity and large charge capacity ensure the disclosed n-doped organic conductive polymer used in ion storage materials in ECD.

Figure 6:
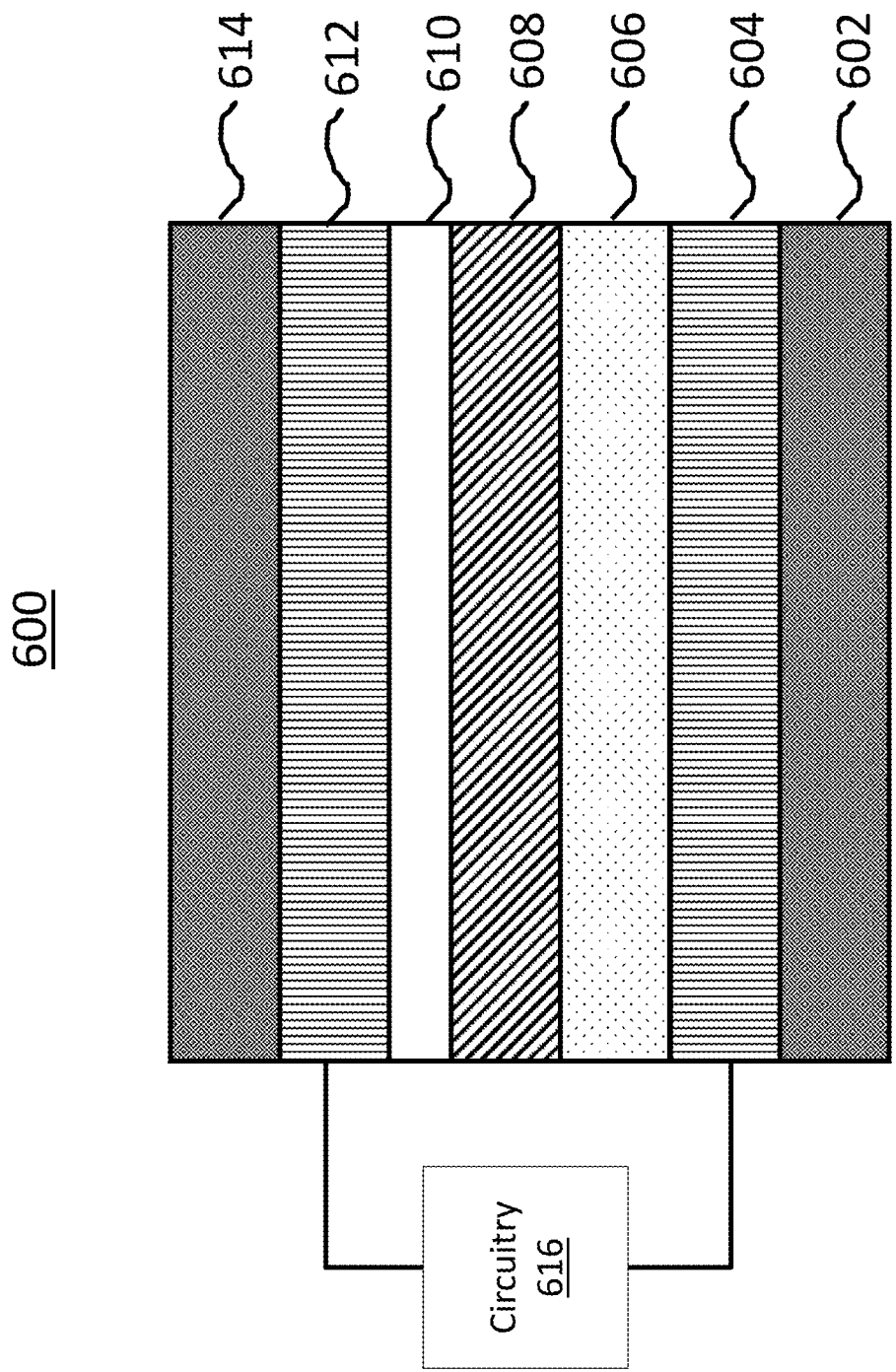
FIG. 6 is a cross-sectional view of an electrochromic device that includes a layer of the disclosed n-doped organic conductive polymer functioning as an ion storage layer, according to some example embodiments of the present disclosure.

The second type of the disclosed electrochromic device has a layer including the disclosed n-doped organic conductive polymer as an ion storage layer. An example ECD scheme with the layer including the disclosed n-doped organic conductive polymer functioning as an ion storage layer is shown in FIG. 6. The ECD includes a first insulating substrate 602, a first conducting layer 604 disposed over the first insulating substrate 602, an ion storage layer 606 including the disclosed n-doped organic conductive polymer disposed on the first conducting layer 604, an electrolyte layer 608 disposed over the ion storage layer 606 including the disclosed n-doped organic conductive polymer, an electrochromic layer 610 disposed over the electrolyte layer 608, a second conducting layer 612 disposed over the electrochromic layer 610, a second insulating substrate 614 disposed over the second conducting layer 612, and a circuitry 616 to operate the electrochromic device 600. The disclosed n-doped organic conductive polymer layer functions as an ion storage layer and can work with either inorganic or organic electrochromic materials in the electrochromic layer 610 (working electrode). In some embodiments, the ion storage layer 606 consists of the disclosed n-doped organic conductive polymer. In some embodiments, at least one of the first conducting layer or the second conducting layer is transparent. In some embodiments, both of the first conducting layer and the second conducting layer are transparent. In some embodiments, the first conducting layer or the second conducting layer comprises a reflective conducting layer, such as a metal layer, to form a reflective ECD.

Figure 7B:
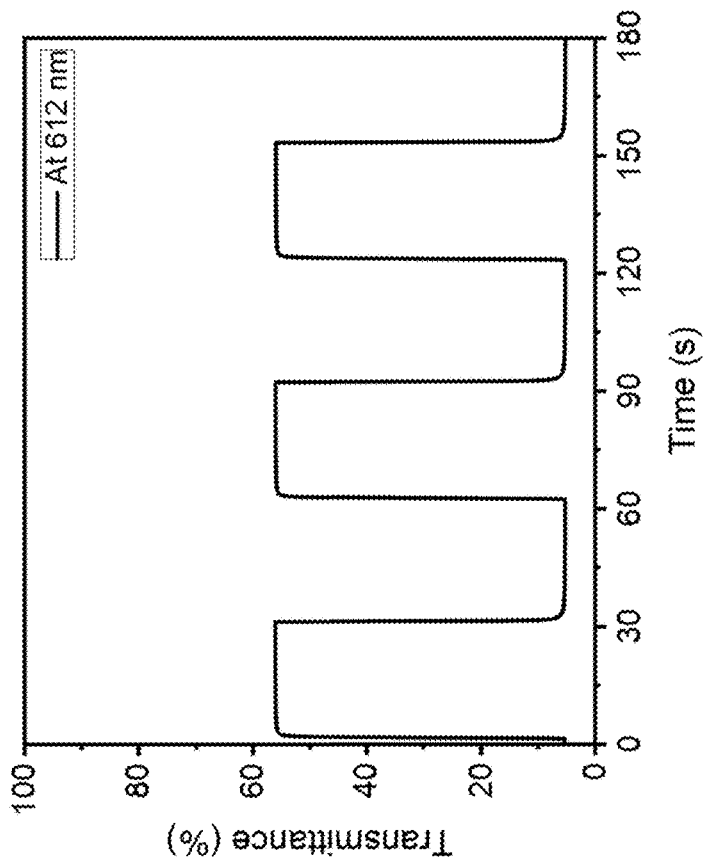
FIGS. 7(A)-(B) are diagrams of an example ITO/an example n-doped organic conductive polymer n-PBDF/ECP-B electrochromic device including a layer of n-PBDF functioning as the ion storage layer, according to one example embodiment.
Figure 7A:
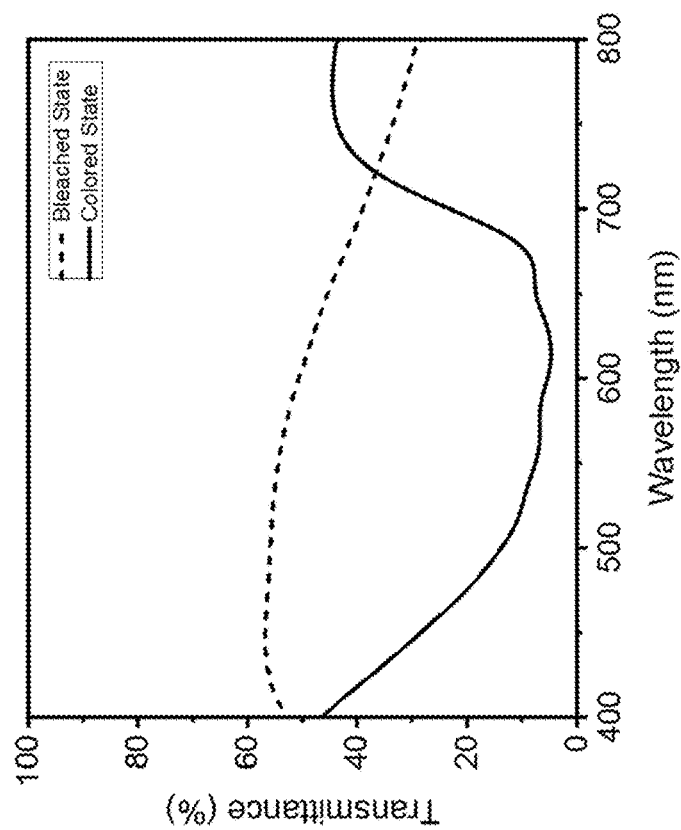

To demonstrate the performance of a layer including the disclosed n-doped organic conductive polymer as the ion storage layer (counter electrode) for the electrochromic device, ECP-B is used as an example ECP as the working electrode at the electrochromic layer and the example n-doped organic conductive polymer n-PBDF is used in the following ECD embodiment. In-situ crosslinked 1:1 PEGDA:0.2 M TBATFSI in PC is used as the electrolyte layer 608. The disclosed n-PBDF thin film is employed as the ion storage layer 606 for counter electrode. FIG. 7(A) is a diagram depicting the transmittance spectra of the disclosed electrochromic device. The transmittance spectra show great changes during the coloration process, indicating the successful switch of the electrochromic device between the colored state and the bleached state. The switching kinetics from stepwise potential fast chronoamperometry (SPFC) is shown in FIG. 7(B), which indicates that the electrochromic device achieves fast switching from 5% to 55% at 612 nm. The results demonstrate the disclosed n-doped organic conductive polymer works excellent as an ion storage material for the electrochromic device.

Figure 8:
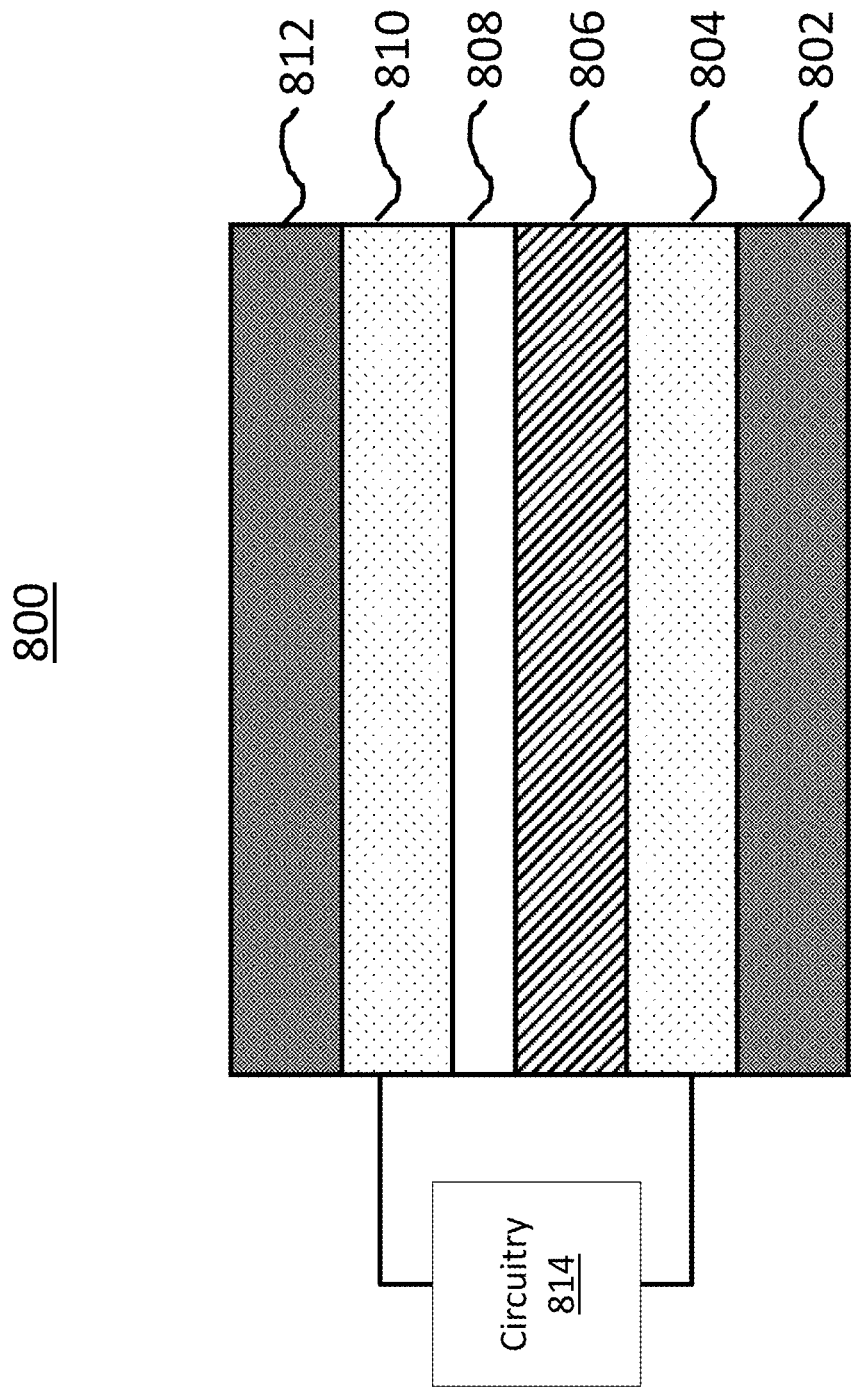
FIG. 8 is a cross-sectional view of an electrochromic device that includes a layer of the disclosed n-doped organic conductive polymer functioning as both an ion storage layer and a TC layer simultaneously for the counter electrode and another layer of the disclosed n-doped organic conductive polymer functioning as a TC layer for the working electrode, according to some example embodiments of the present disclosure.

The third type of the disclosed electrochromic device has a layer including the disclosed n-doped organic conductive polymer which functions as both a TC layer and an ion storage layer. One example configuration of electrochromic device 800 is shown in FIG. 8. The ECD 800 includes a first insulating substrate 802, a layer including the disclosed n-doped organic conductive polymer 804 disposed over the first insulating substrate 802, an electrolyte layer 806 disposed over the layer including the disclosed n-doped organic conductive polymer 804, an electrochromic layer 808 disposed over the electrolyte layer 806, a TC layer 810 disposed over the electrochromic layer 808, and a second insulating substrate 812 disposed over the conducting layer 810. The conducting layer 810 may include the disclosed n-doped organic conductive polymer or consist of the disclosed n-doped organic conductive polymer, or may be a TC layer without the disclosed n-doped organic conductive polymer, e.g., ITO, or may be a reflective conducting layer, e.g., a metal. The electrochromic device 800 further includes circuitry 814 to operate the electrochromic device 800. In this example device 800, the single layer 804 including the disclosed n-doped organic conductive polymer functions as both a TC layer for counter electrode and an ion storage layer simultaneously, thus simplifying the device structure with lower cost and higher throughput. In some embodiments, due to variations from other components in each layer, the layer including the disclosed n-doped organic conductive polymer 804 may be split into two separate layers with one layer including the disclosed n-doped organic conductive polymer functioning as a TC layer and the other layer including the disclosed n-doped organic conductive polymer functioning as an ion storage layer. The TC layer 810 may also include the disclosed n-doped organic conductive polymer or consist of the disclosed n-doped organic conductive polymer or may be a TC layer without the disclosed n-doped organic conductive polymer, e.g., ITO. In some embodiments, the layer 804 including the disclosed n-doped organic conductive polymer may be split into two separate layers with one layer including the disclosed n-doped organic conductive polymer as the ion storage layer and one TC layer without the disclosed n-doped organic conductive polymer, e.g. ITO, and the TC layer 810 may also include the disclosed n-doped organic conductive polymer or consist of the disclosed n-doped organic conductive polymer. In some embodiments, the disclosed electrochromic device has a layer consisting of the disclosed n-doped organic conductive polymer which functions as both a TC layer and an ion storage layer.

Figure 9B:
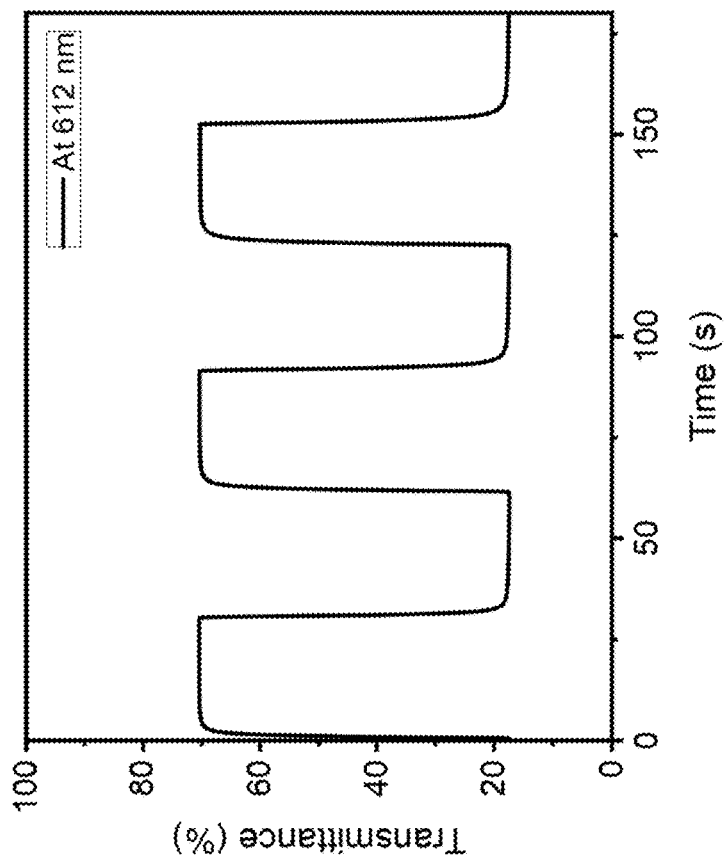
FIGS. 9(A)-(B) are diagrams of an example n-doped organic conductive polymer n-PBDF/ECP-B electrochromic device including a layer of n-PBDF functioning as both an ion storage layer and a TC layer simultaneously for the counter electrode and another layer of n-PBDF functioning as a TC layer for the working electrode, according to one example embodiment.
Figure 9A:
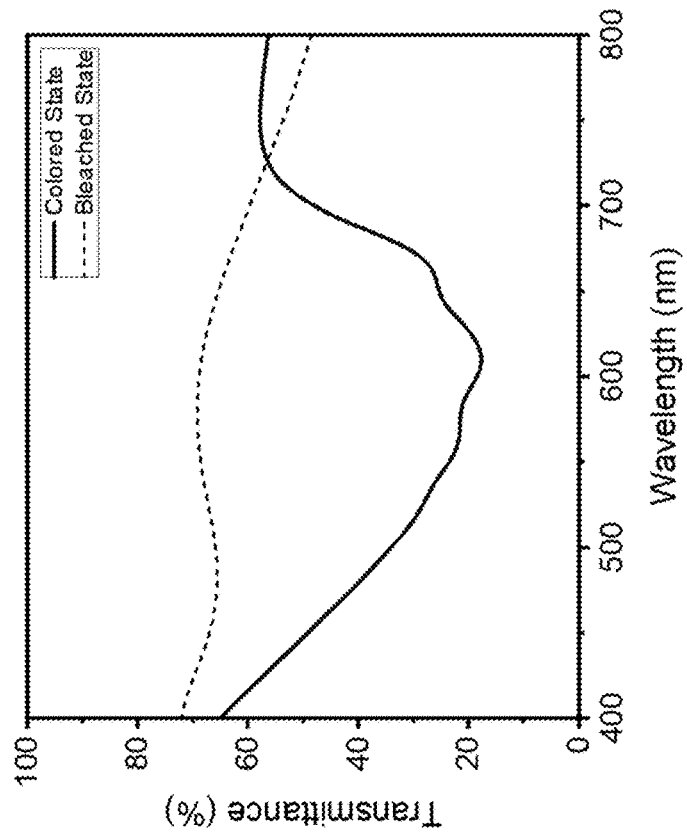

In one embodiment, the example n-doped organic conductive polymer n-PBDF is assembled into an electrochromic device using ECP-B as the electrochromic layer 808 (working electrode), in-situ crosslinked 1:1 PEGDA:0.2 M TBATFSI in PC as the electrolyte layer 806, the n-PBDF thin film as the transparent conducting layer 810 for the working electrode 808, and n-PBDF layer 804. The n-PBDF layer 804 functions as both a transparent conductor and an ion storage layer simultaneously for the counter electrode. The optical performances of the electrochromic device are illustrated in FIGS. 9(A) and 9(B). FIG. 9(A) is a diagram depicting the transmittance spectra of the electrochromic device. The transmittance spectra show great changes during the coloration process, indicating the successful switch of the electrochromic device between the colored state and the bleached state. The switching kinetics from stepwise potential fast chronoamperometry SPFC is shown in FIG. 9(B), which indicates that the electrochromic device achieves fast switching from 18% to 70% at 612 nm. The results demonstrate the disclosed n-doped organic conductive polymer works excellent as a transparent conductor and an ion storage material for the counter electrode.

Figure 10B:
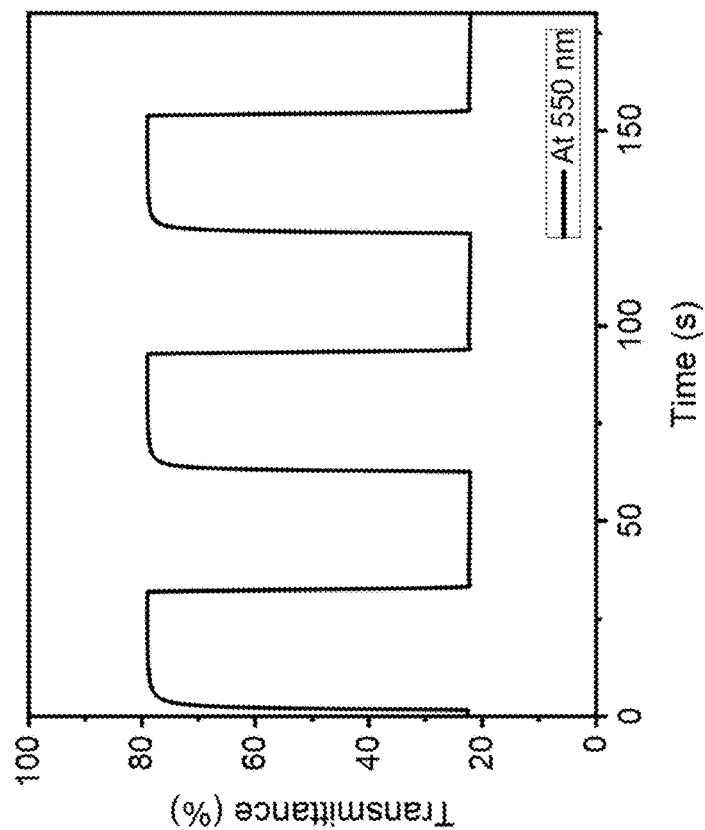
FIGS. 10(A)-(B) are diagrams of an example n-doped organic conductive polymer n-PBDF/ECP-M electrochromic device including a layer of n-PBDF functioning as both an ion storage layer and a TC layer simultaneously for the counter electrode and another layer of n-PBDF functioning as a TC layer for the working electrode, according to one example embodiment.
Figure 10A:
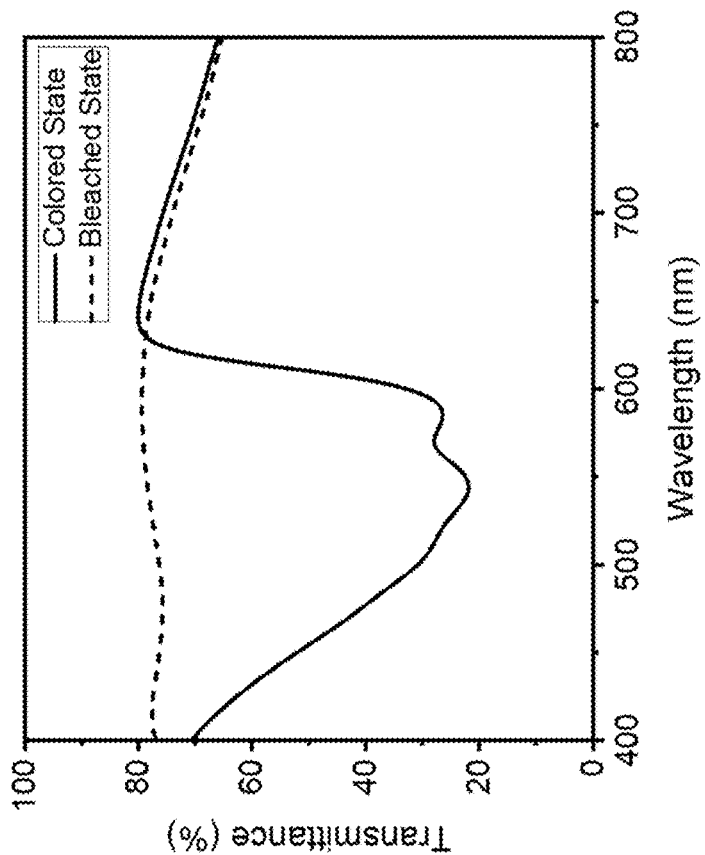

The above structural configuration can be also applied to other types of ECP. For example, the ECP-B of the electrochromic layer 808 may be replaced with ECP-M or ECP-BK. The optical performances of the electrochromic device having ECP-M electrochromic layer 808 are illustrated in FIGS. 10(A) and 10(B). FIG. 10(A) is a diagram depicting the transmittance spectra of the electrochromic device. The transmittance spectra show great changes during the coloration process, indicating the successful switch of the electrochromic device between the colored state and the bleached state. The switching kinetics from stepwise potential fast chronoamperometry SPFC is shown in FIG. 10(B), which indicates that the electrochromic device achieves fast switching from 22% to 78% at 550 nm. The results demonstrate the disclosed n-doped organic conductive polymer works excellent as a transparent conductor and an ion storage material with ECP-M electrochromic layer 808.

Figure 11B:
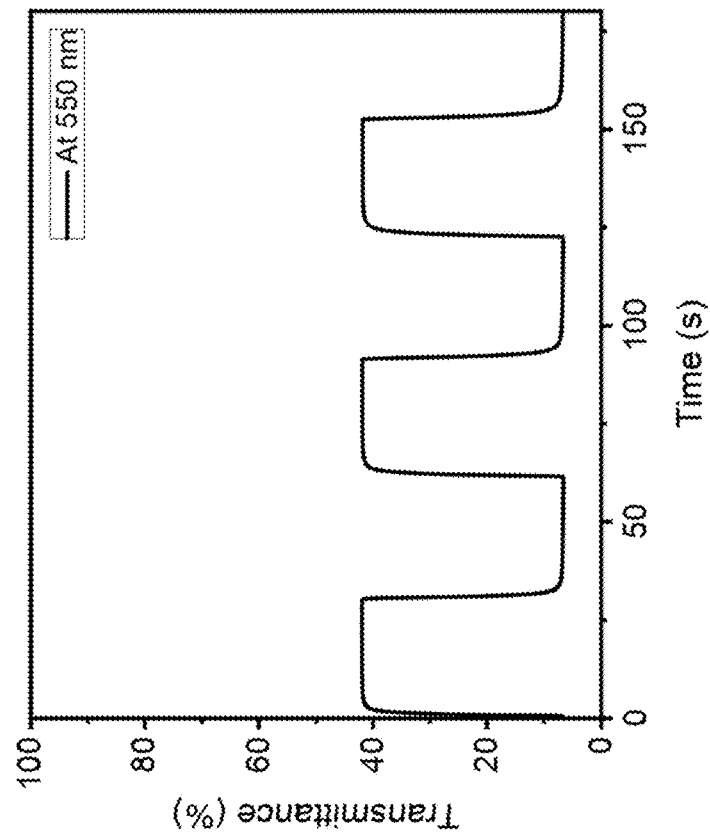
FIGS. 11(A)-(B) are diagrams of an example n-doped organic conductive polymer n-PBDF/ECP-BK electrochromic device including a layer of n-PBDF functioning as both an ion storage layer and a TC layer simultaneously for the counter electrode and another layer of n-PBDF functioning as a TC layer for the working electrode, according to one example embodiment.
Figure 11A:
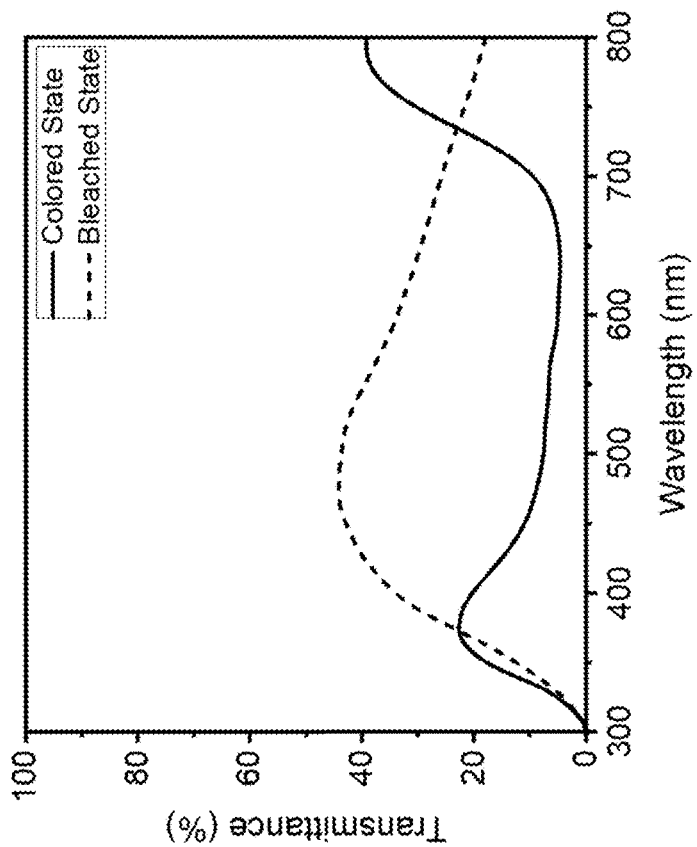

The optical performances of the electrochromic device having ECP-BK electrochromic layer 808 are illustrated in FIGS. 11(A) and 11(B). FIG. 11(A) is a diagram depicting the transmittance spectra of the electrochromic device. The transmittance spectra show great changes during the coloration process, indicating the successful switch of the electrochromic device between the colored state and the bleached state. The switching kinetics from stepwise potential fast chronoamperometry SPFC is shown in FIG. 11(B), which indicates that the electrochromic device achieves fast switching from 7% to 40% at 550 nm. The results demonstrate the disclosed n-doped organic conductive polymer also works excellent as a transparent conductor and/or ion storage material with ECP-BK electrochromic layer 808.

Both inorganic and organic electrochromic materials may be used in the electrochromic layer in the electrochromic device disclosed herein. In some embodiments, the electrochromic layer in the electrochromic device disclosed herein includes one or more of $WO_3$, $NiO$, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles. Different types of electrolyte materials (e.g., liquid electrolyte, gel electrolyte, or solid electrolyte) may be used in the electrolyte layer in the electrochromic device disclosed herein. In some embodiments, the electrolyte layer in the electrochromic device disclosed herein includes a solid electrolyte or a gel electrolyte.

Both inorganic and organic ion storage materials may be used in the ion storage layer in the electrochromic device disclosed herein. In some embodiments, when the ion storage layer does not include the disclosed n-doped organic conductive polymer, the ion storage layer in the electrochromic device disclosed herein includes one or more oxides of metal elements in Group 4-12, or a mixture of the oxides, or one of the oxides doped by any other metal oxides. The substrates 102 and 114 may be any insulting substrate, such as glass or plastic. The substrates 102 and 114 may be flexible to adapt in roll-to-roll manufacturing processes.

Figure 12:
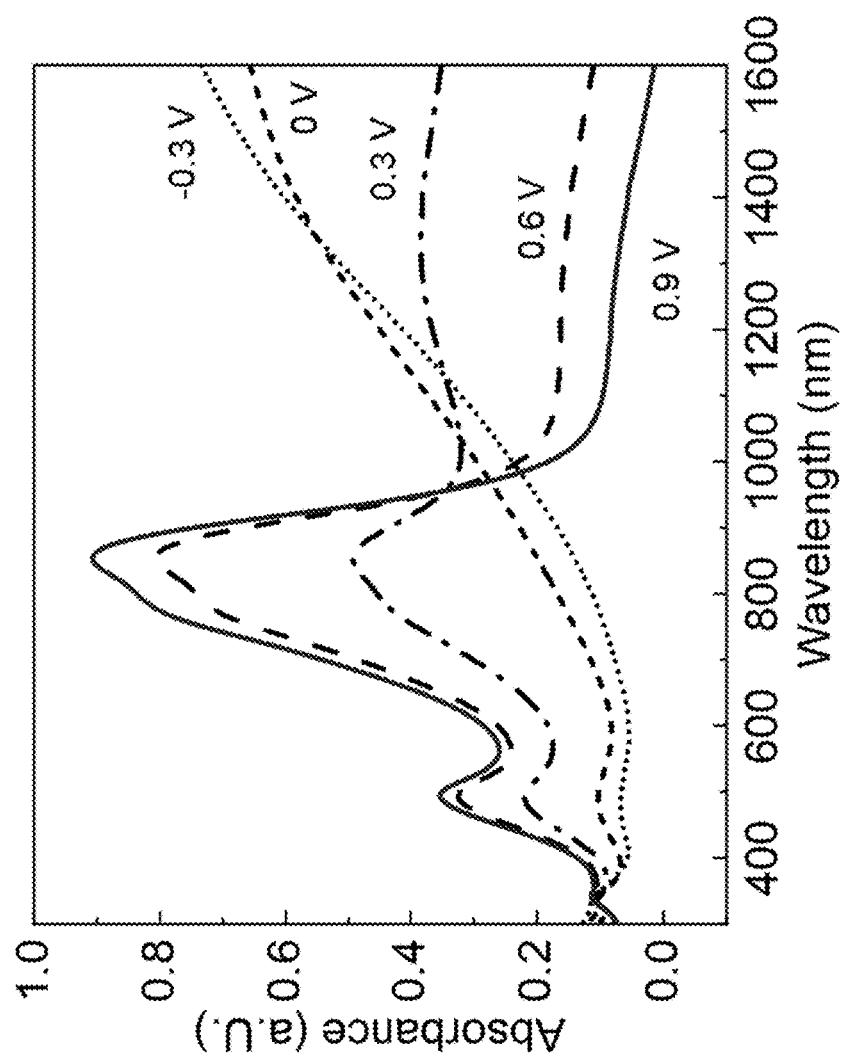
FIG. 12 is absorbances spectroelectrochemistry of an example n-doped organic conductive polymer n-PBDF in 0.2M TBA-TFSI in PC with the applied voltage increased from −0.3V to 0.9V.
Figure 13:
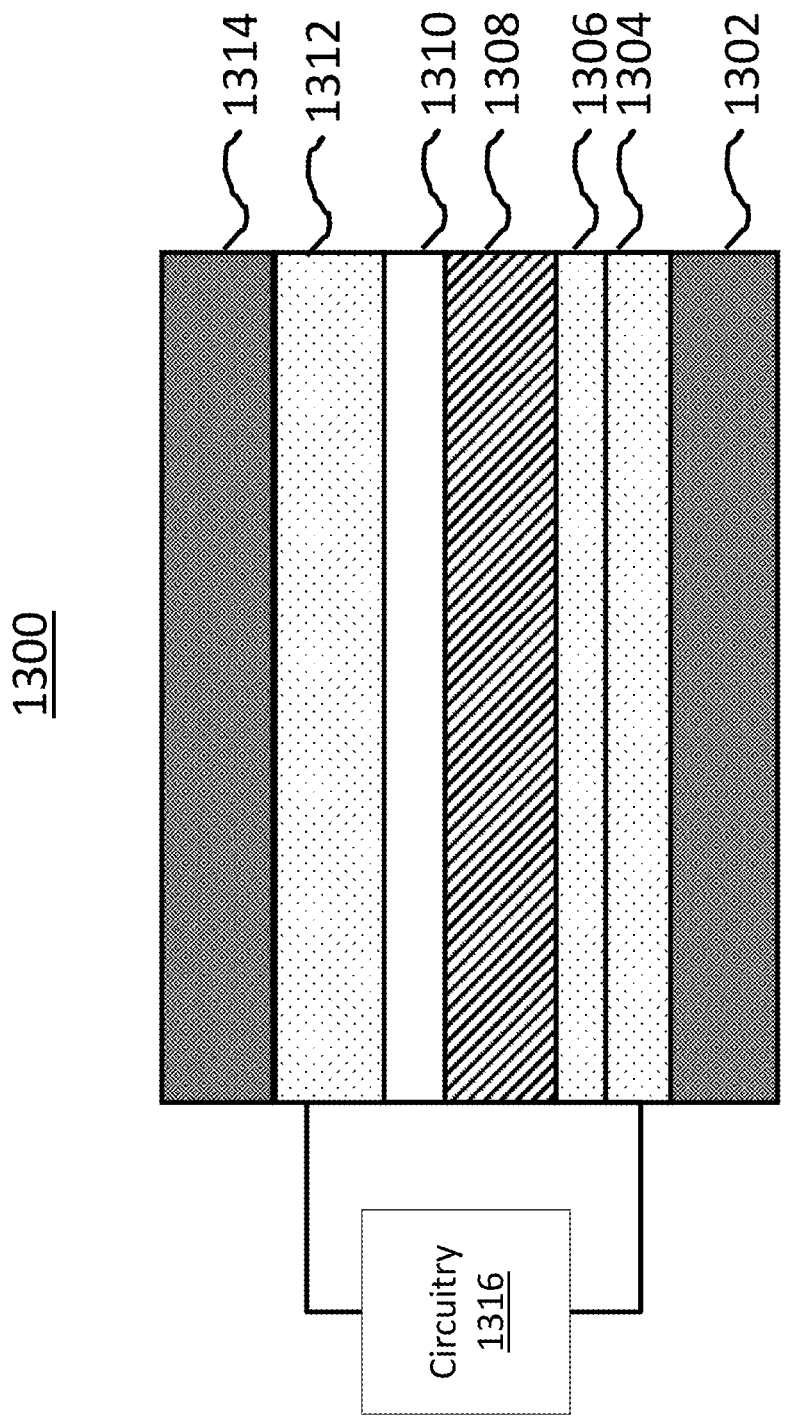
FIG. 13 is a cross-sectional view of an electrochromic device that includes a layer of a disclosed n-doped organic conductive polymer functioning as an electrochromic layer for the counter electrode, according to one example embodiment.

In another aspect, the present disclosure is also related to the use of the disclosed n-doped organic conductive polymer as an electrochromic layer. The example organic conductive polymer PBDF and the example n-doped organic conductive polymer n-PBDF are a redox couple. Thus, they can potentially function as an electrochromic material. The spectro-electrochemical characterization of the example n-doped organic conductive polymer n-PBDF in 0.2M TBA-TFSI in PC is performed. As shown in FIG. 12, n-PBDF can conduct a redox reaction and presents a color with a maximum absorbance at around 850 nm and the absorbance increases with the increasing applied voltages. FIG. 13 depicts a configuration of an electrochromic device 1300 that employs the disclosed n-doped organic conductive polymer as an electrochromic material for the counter electrode, according to one example embodiment. The electrochromic device 1300 includes a first insulating substrate 1302, a first conducting layer 1304 disposed over the first insulating substrate 1302, a first electrochromic layer 1306 including the disclosed n-doped organic conductive polymer disposed over the first conducting layer 1304, an electrolyte layer 1308 disposed over the first electrochromic layer 1306 including the disclosed n-doped organic conductive polymer, a second electrochromic layer 1310 including a p-doped electrochromic material disposed over the electrolyte layer 1308, a second conducting layer 1312 disposed over the second electrochromic layer 1310 including the p-doped electrochromic material, and a second insulating substrate 1314 disposed over the second conducting layer 1312. In some embodiments, one of the first or the second conducting layers 1304 and 1312 may include an organic or inorganic conductive material (such as ITO). In some embodiments, one of the first and the second conducting layers includes a reflective conducting material, such as metal, to form a reflective ECD. In some embodiments, at least one of the first conducting layer or the second conducting layer is transparent. In some embodiments, both of the first conducting layer and the second conducting layer are transparent. In some embodiments, the first and the second conducting layers 1304 and 1312 do not include the disclosed n-doped organic conductive polymer since under the applied voltage window for such a dual-polymer ECD as illustrated here, the disclosed n-doped organic conductive polymer may be colored. The disclosed n-doped organic conductive polymer in the first electrochromic layer 1306 functions as an n-doped ECP. The electrochromic device 1300 further includes circuitry 1316 to operate the electrochromic device 1300. In some embodiment, the first electrochromic layer 1306 consists of the disclosed n-doped organic conductive polymer.

Both inorganic and organic p-doped electrochromic materials may be used in the second electrochromic layer 1310. In some embodiments, the p-doped electrochromic materials in the second electrochromic layer 1310 includes one or more of NiO, $IrO_2$, $V_2O_5$, isoindigo, poly(decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propyl-enedioxythiophene) and its derivatives, polyfluorene and its derivatives, polycarbazole and its derivatives, and copolymers thereof, or the copolymers containing acceptor units including benzothiadiazole, benzotriazole, or diketopyrrolopyrroles. In some embodiments, the p-doped electrochromic material is a p-doped electrochromic polymer. Different types of electrolyte materials (e.g., liquid electrolyte, gel electrolyte, or solid electrolyte) may be used in the electrolyte layer 1308 in the electrochromic device disclosed herein. In some embodiments, the electrolyte layer 1308 in the electrochromic device disclosed herein includes a solid electrolyte or a gel electrolyte.

Figure 14A:
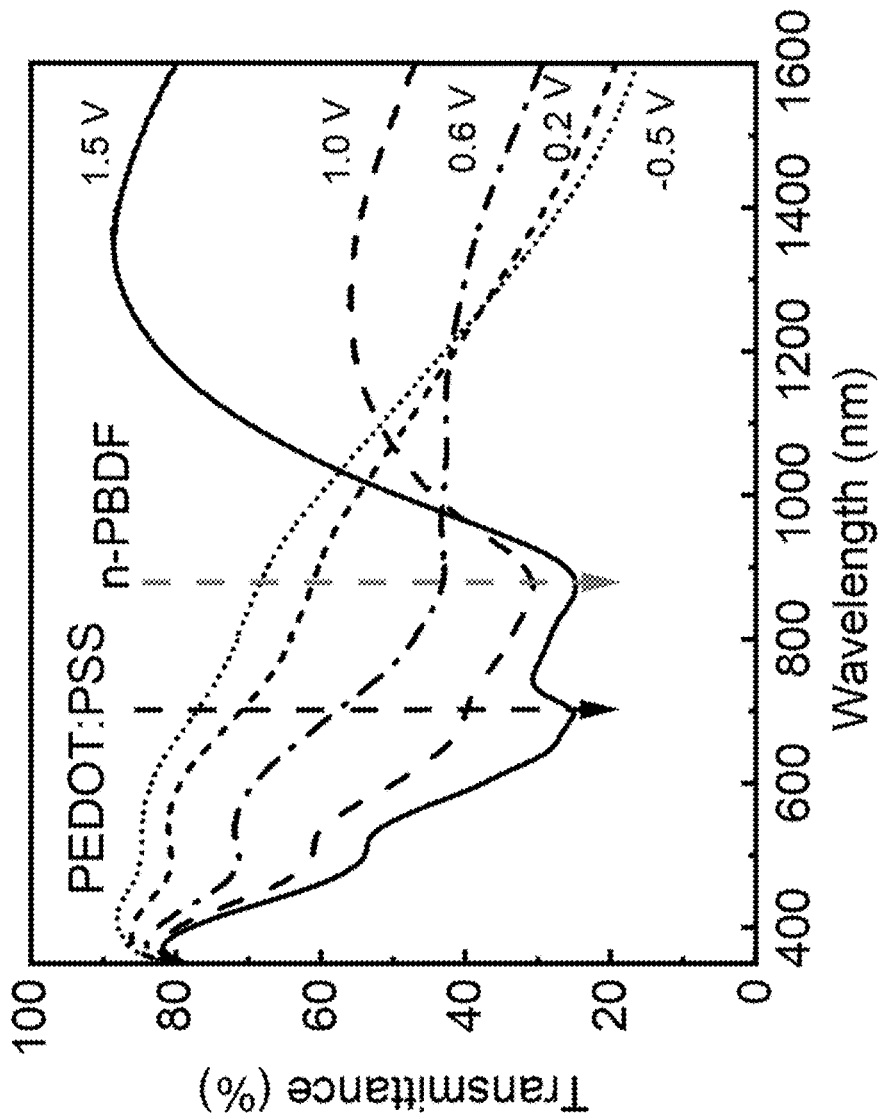
FIGS. 14(A)-(B) contain diagrams of an example an example n-doped organic conductive polymer n-PBDF/PE-DOT:PSS electrochromic device including a layer of n-PBDF functioning as an electrochromic layer for the counter electrode, according to one example embodiment.
Figure 14B:
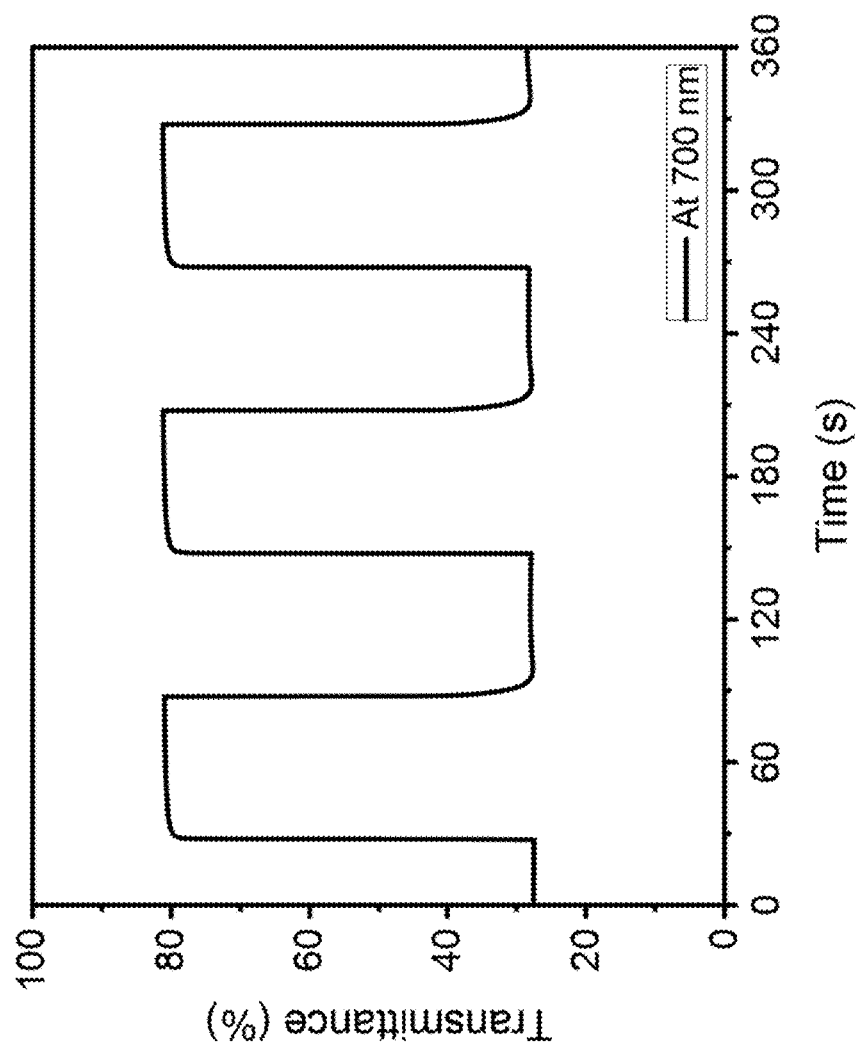

To demonstrate the performance of the disclosed n-doped organic conductive polymer as an EC layer, the example n-doped organic conductive polymer n-PBDF, is paired with PEDOT:PSS, an example p-doped polymer, to make a dual-polymer electrochromic device. In one embodiment, the n-PBDF is assembled into an electrochromic device using PEDOT:PSS as the p-doped ECP, in-situ crosslinked 1:1 PEGDA:0.2 M TBATFSI in PC as the electrolyte, the n-PBDF as the n-doped ECP. The schematic is drawn in FIG. 13. Spectroelectrochemical measurements were recorded between −0.5 V and 1.5 V with an increment of 0.2 V, as seen in FIG. 14(A) (only a few voltages were shown as an example). On the one electrode, n-PBDF loses electrons upon oxidation and returns to the neutral state, accompanied by the rise of an absorbance peak around 850 nm. On the other electrode, PEDOT:PSS is reduced and returns to the neutral state, accompanied by the rise of an absorbance peak around 700 nm. The electrochromic device shows fast-switching kinetics and a high optical contrast of 50%. It reaches bleached state within 0.2 s at the applied voltage of −0.5 V and becomes colored within 3 s at the applied voltage of 1.5 V as shown in FIG. 14(B). This device shows a high coloration efficiency of 1900 $cm^2/C$, which is the highest recorded number among known electrochromic devices.

N-Doped Capacitive Conductor

The disclosed n-doped organic conductive polymer is an n-doped transparent capacitive conductor, which can successfully replace the conventional ITO in ECDs using its air/water stable, high conductivity. More interestingly, the disclosed n-doped organic conductive polymer could directly balance the charges consumed at the electrochromic polymers (ECPs) with efficient capacitor behavior as ion storage layer by high mixed ionic and electronic conductivities. In some embodiments, the typical cyclic voltammetry (CV) of the example n-doped organic conductive polymer n-PBDF films are recorded at different scan speeds. They show thickness-independent, similar CV shapes with quasi-rectangular behavior and clear faradaic peak. It results from combination of pure capacitance via accumulation of charges at the volumetric polymer/electrolyte interface and capacitance through reversible redox reaction, leading to high specific capacitance from pseudo-capacitance. In addition, they maintain their shapes over 100 mV $s^{-1}$, which is indicative of easy and fast insertion/extraction of ions into the capacitive polymer films. Using the highly capacitive properties, the n-PBDF films at counter electrodes could directly work like complementary charge balancing layer without additional ion storage layers, which could be bleached and colored together with the cathodically coloring ECPs. Besides capacitive conductor, the disclosed n-doped organic conductive polymer can be used as an electrode and/or electric interconnect.

Figure 15:
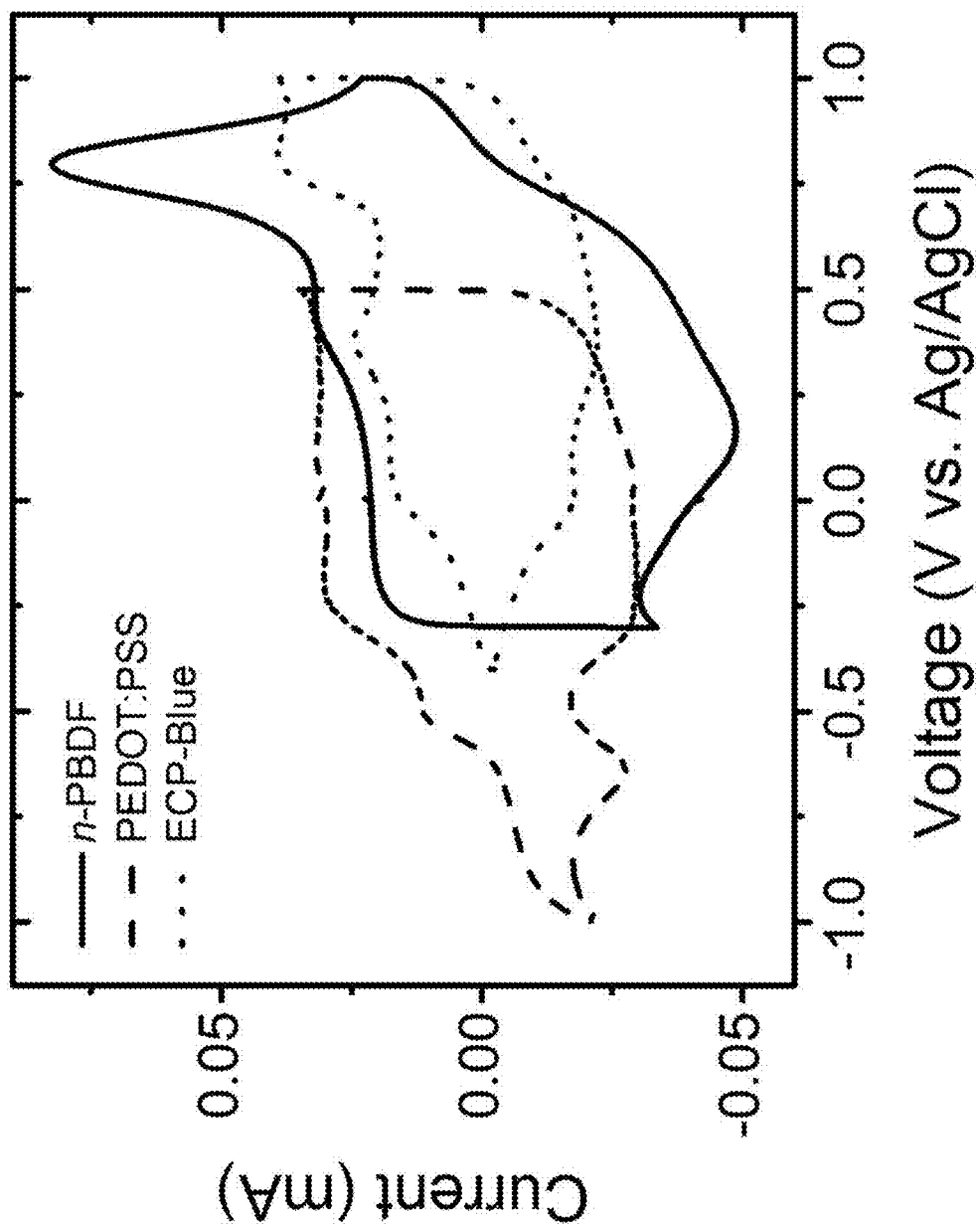
FIG. 15 is cyclic voltammetry results and specific volumetric capacitance from the CV of polymer counter electrodes (n-PBDF and PEDOT:PSS) and ECP-Blue films.

FIG. 15 displays CV results of two polymeric conductors (n-PBDF and PEDOT:PSS) and typical p-type electrochromic polymers for the electroactive voltage window comparison. Both polymeric conductors exhibit pure capacitive properties with charge accumulation in the bulk polymer/electrolyte interface, which is much larger charge storage compared to inorganic counterpart-ITO. It leads to a large, potential-independent current persisting even at high oxidation (for PEDOT:PSS) or reduction (for n-PBDF) potentials. The non-faradaic, electrical double layers formed in polymer domains contribute dominantly to the capacitance at the high doping level. Interestingly, n-PBDF exhibits a larger volumetric specific capacitance (~3 times, ~206 F $cm^{-3}$ for n-PBDF vs. ~72 F $cm^{-3}$ for PEDOT:PSS) from CV curves of identical thickness of unreacted films, resulting from the more facilitated proximity of ions and charge carriers into the conjugated network beyond polymer/electrolyte interface. The formation of double layers will not just be limited to polymer/electrolyte interface layer but rather extend within the conjugated network in ions and charge carriers due to high mixed ionic and electronic conductivity in polymer films. The excellent and stable electrolyte ion diffusion is confirmed in linear current dependence in differential anodic/cathodic charge density and scan rate. In the linear slope, the high volumetric specific capacitance is estimated to 200-250 F cm$^{-3}$ (area specific capacitance ~500 pF cm$^{-2}$) for n-PBDF films at the current plateau by EDL, which is higher than those of conventional carbonaceous materials and comparable with oxide hybrid materials. They show well-retained, quite high capacitance behavior upon high positive voltage (+0.7 V, 170 F cm$^{-3}$) by the Faradaic redox reactions, suggesting the excellent capacitive natures in the large electroactive potential window. The faradaic behavior is tested in fully conditioned n-PBDF films because we find large decrease in the faradaic capacitance in electrochemical cycles. However, the n-PBDF films show stable box-shaped CV natures from the capacitive process from EDL independent to electrochemical cycles.

Minimal Color-Changing Transparency

Figure 16:
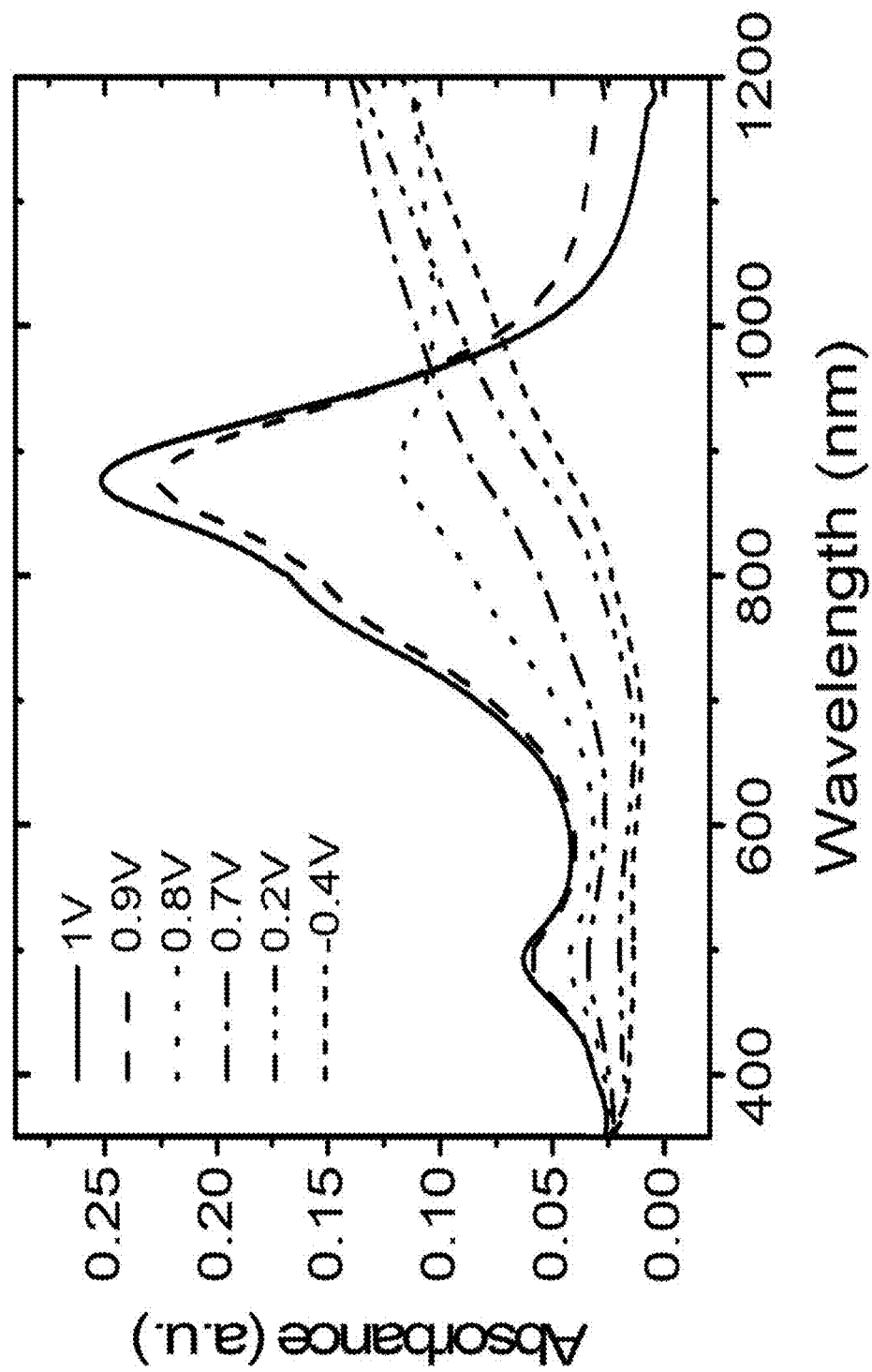
FIGS. 16(A)-(B) contain data of the example n-doped organic conductive polymer n-PBDF film for working electrode (20 nm), according to one example embodiment.
Figure 16:
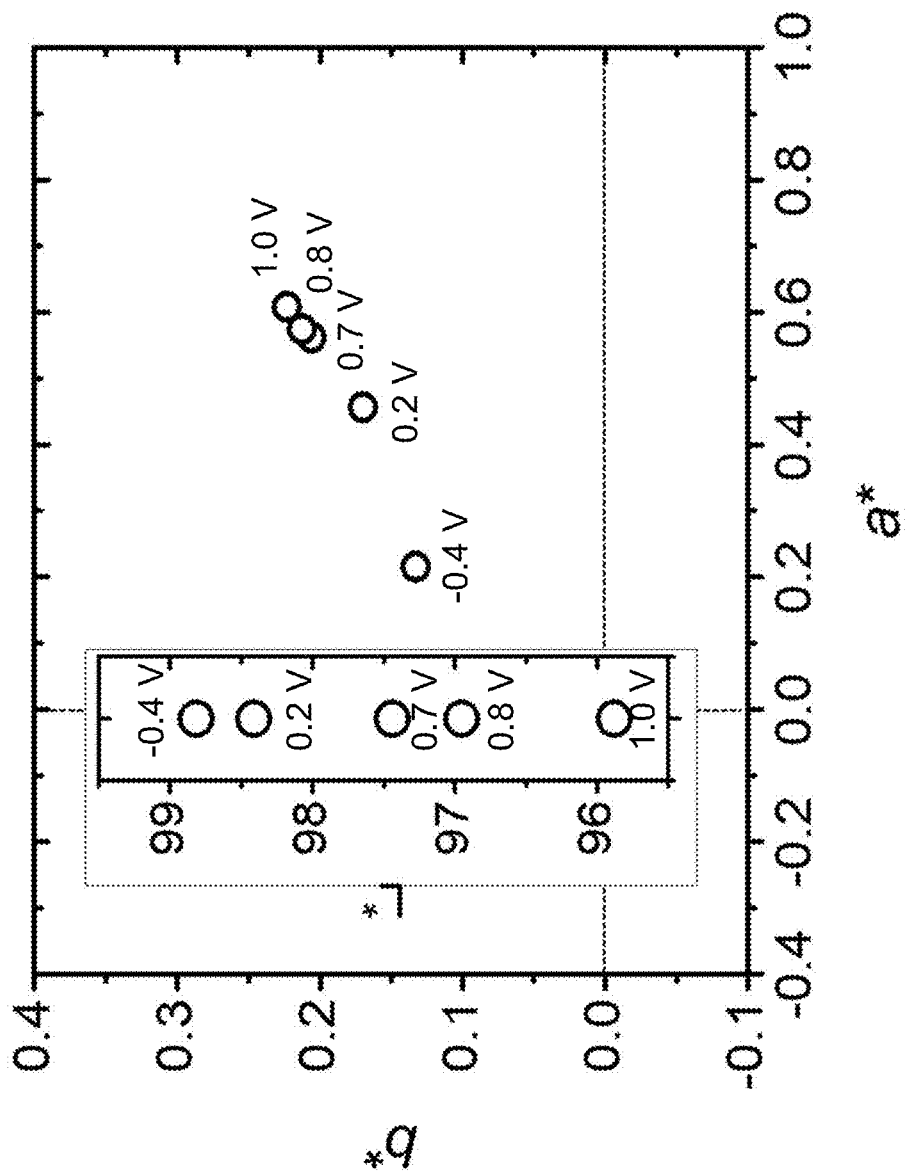

Besides high conductivity and high ion capacity, the disclosed n-doped organic conductive polymer exhibits minimal color changing transparency during the full-range electroactive potential window when the disclosed n-doped organic conductive polymer is used as a conductor and/or an ion storage material. In some embodiments, the disclosed n-doped organic conductive polymer exhibits minimal color changing transparency in wavelength between 380 nm and 800 nm with a color chroma change $\Delta C^*$ less than 5 between an oxidized state and a reduced state of the n-doped organic conductive polymer. In some embodiments, the disclosed n-doped organic conductive polymer exhibits minimal color changing transparency in wavelength between 380 nm and 800 nm with a color chroma change $\Delta C^*$ less than 4, or 3, or 2, or 1.5, or 1 between an oxidized state and a reduced state of the n-doped organic conductive polymer. The disclosed n-doped organic conductive polymer films at working electrode can be partially dedoped with the oxidation of ECPs with a positive bias applied, leading to residue color in bleaching state of ECPs. The electrochemically coloration effect of the example n-PBDF films is confirmed in measurement of the optical absorbance as a function of applying voltage in three electrode systems. As shown in FIG. 16(A), the n-PBDF films become more dedoped and visibly colored as the higher positive bias is applied. When the bias is higher than 0.8V, n-PBDF is fully dedoped and the neutral PBDF films show absorption peak at 877 nm with a small shoulder peak around 493 nm, still resulting in high optical transmittance in visible region. Due to the low coloration efficiency and minor absorption changes in visible region, n-PBDF electrodes show minimal color changing properties at both working and counter positions for ECDs. More detailed color presentation in human eyes is calculated and investigated by 1976 CIE L*a*b* color coordinates. Interestingly, the n-PBDF films show almost no change in chromaticity under entire redox states. As shown in FIG. 16(B), both color coordinates a* and b* for n-PBDF films in working electrode with 20 nm show minimal changes (a* increases about 0.4, b* increases about 0.09), and chroma $C^*(C^* = (a^{*2}+b^{*2})^{1/2})$) also shows a small change ($\Delta C^*$ is about 0.43 in wavelength between 380 nm and 800 nm). Similar trend is observed for n-PBDF films in counter electrode with 30 nm (a* increases about 0.8, b* decreases about 0.2, $\Delta C^*$ is about 0.78 in wavelength between 380 nm and 800 nm). This is indicative of no color residue at bleached state or additive color at colored state in ECDs. In transmissive electrochromic display applications, the absence of the chromaticity during entire electrochemical process is very significant for both neutral color display (i.e., the color of electrochromic active material itself) and high optical contrast. Need to mention that when n-PBDF is fully dedoped under high potential bias, it can be used as an electrochromic material with much thicker film, resulting in a color chroma change $\Delta C^*$ between 380 nm and 800 nm higher than 3 or 5.

Figure 17:
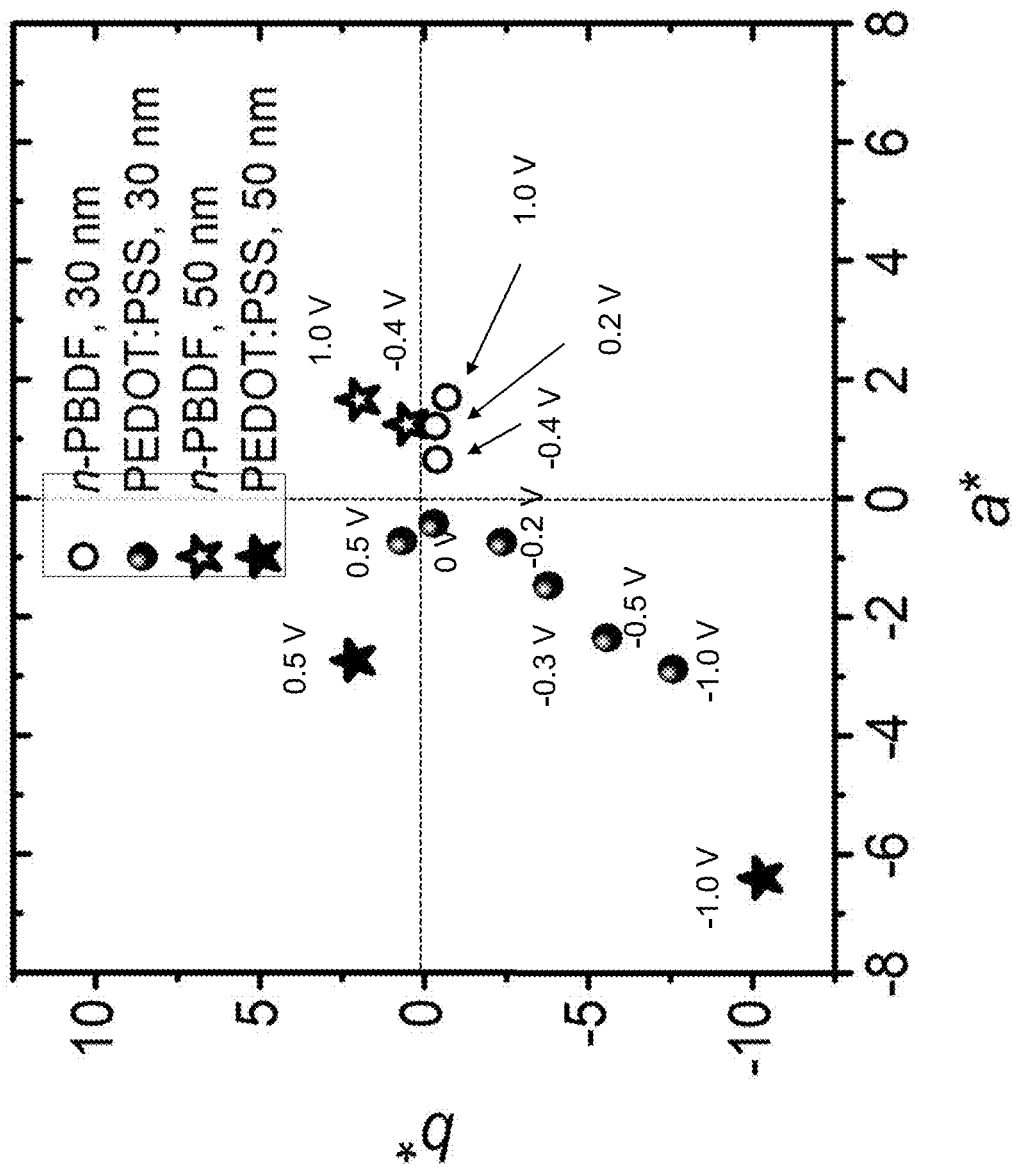
FIG. 17 shows CIE L*, a*, b* color coordinate values of two polymer conductors (n-PBDF and PEDOT:PSS) in different thickness.

This property makes our PBDF excellent candidate as transparent conductor in diverse electrochemical device applications, beyond the conventional transparent polymer conductors which suffer from the severe color change upon inevitable electrochemical reactions or charge transfers in electronic devices. Indeed, n-PBDF conductors exhibit minimal color changes during the full-range electrochemical reaction as compared to outstanding p-type conductor, PEDOT:PSS. As shown in FIG. 17, color coordinate values of two polymer conductors (n-PBDF and PEDOT:PSS) are compared. For comparison, PEDOT:PSS films are fabricated without other additional post treatment which functionalize PEDOT:PSS more. In identical thickness of polymer films (~30 nm), two polymeric conductors exhibit similar brightness changes from 98 to 92. However, the PEDOT:PSS show significant color changes and the chroma change $\Delta C^*$ is about 7.1, with a pronounced blue and moderate greenish shift at −1.0 V bias. These changes are detrimental to its use as a transparent conductor, especially when employed as a counter electrode with conventional high-performance p-type electrochromic polymers on opposite working electrode. When the p-type electrochromic polymer at the working electrode is bleached at a positive voltage, it results in strong oxidation of the counter materials. In addition, the coloration effect could occur at working electrode because of partial dedoping of PEDOT:PSS by unintended charge transfer or applied voltage for the p-type ECP coloration. In contrast, n-PBDF displays minimal color changes from oxidized (−0.4 V) to reduced (+1.0 V) states, regardless of film thickness, which suggests its suitability for use in both working and counter electrodes.

Low Lowest Unoccupied Molecular Orbital (LUMO) and Low Operation Voltage

The disclosed n-doped organic conductive polymer has a low lowest unoccupied molecular orbital (LUMO) level. In some embodiments, the disclosed n-doped organic conductive polymer has a LUMO level at ~−4.5 eV. In some embodiments, the disclosed n-doped organic conductive polymer has a LUMO level at ~−4.7 eV, or ~−4.9 eV, or ~−5.1 eV. The low LUMO enables the n-doped conductor application in ambient condition by avoiding water and oxygen reduction reactions. Besides that, the low LUMO can give rise to stable and strong capacitive behavior from electrical double layer (EDL) due to small doping changes without unwanted charge transfer to/from oxygen or poor charge injection and transport in strongly undoped state. In addition, the low LUMO level leads to an easy doping or low reduction potential, which allows ECDs broader bleached states in electroactive region. For exemplary n-PBDF, as shown in FIG. 16(A), they easily retain the doped state and the resultant transparent nature until around +0.7 V bias. They show a distinct increase in visible absorption at applied voltage higher than +0.8 V because of the very weak dedoping ability. The low onset reduction potential (~+0.7 V) brings about a larger potential window by capacitive EDL and efficient electroactive matching to that of the conventional p-type electrochromic polymers, as shown in FIG. 15. When conventional n-type transition metal oxides or non-conductive n-type polymers (e.g., PEDOT:PSS shown in FIG. 15) are used as the ion-storage material in an unbalanced configuration, the charge-balanced voltages applied to the counter electrodes is extended to the more negative end. However, the extremely low reduction potential in n-PBDF allows a closed matched electroactive voltage window with the p-type polymers, the voltage applied at the counter electrode is much less negative. The low reduction potential and narrow operation voltage prevents the electrochemical degradation caused by over-oxidation in both p-type electrochromic polymers and n-PBDF, leading to the better cycling stability in ECDs. In some embodiments, the disclosed ECD is operated at less than 3 volts. In some embodiments, the disclosed ECD is operated at less than 2 volts, or 1.5 volts, or 1 volt.

Used in All-Polymer Devices

The disclosed n-doped organic conductive polymer can be applied to both inorganic based electronics and all-polymer electronics. Conventionally, inorganic-based transparent conducting materials are used. However, they experience various issues, such as poor mechanical flexibility and processing incompatibility. Due to inexpensive, lightweight, low energy consumption, and tunable optoelectronic properties, emerging all-polymer electronics can make crucial advances in development of sophisticated wearable and portable electronics. In several decades, PEDOT:PSS clearly offers numerous advantages such as high processability, aqueous solution coating, stability in air and water, and high electrical conductivity along with optical transparency, which makes it a unique polymer conductor in all-polymer electronics. In addition, the high psuedocapacitance nature allows various electrochemical device applications such as supercapacitors, and energy converters. However, challenging issues with the PEDOT:PSS as the transparent and minimal color-changing electroactive conductor and ion storage for all-polymer electrochromic devices are i) transparent on doped state, but clear color switching to bluish upon dedoping, ii) relatively low conductivity without post-treatment, and iii) difficulty in electroactive voltage matching with other standard cathodically coloring p-type electrochromic polymers. On the other hand, the disclosed n-doped organic conductive polymer has air/water stability, high conductivity (>1000 S cm$^{-1}$), minimal color-changing transparency and high capacitance, thus, the disclosed n-doped organic conductive polymer has demonstrated to be a transparent polymeric conductor and capacitor in all-polymer electronics. As stated above, the disclosed n-doped organic conductive polymer can be used solely as a conducting layer or an ion storage layer or both a conducting layer and ion storage layer and/or electric interconnect in the circuit.

Figure 18:
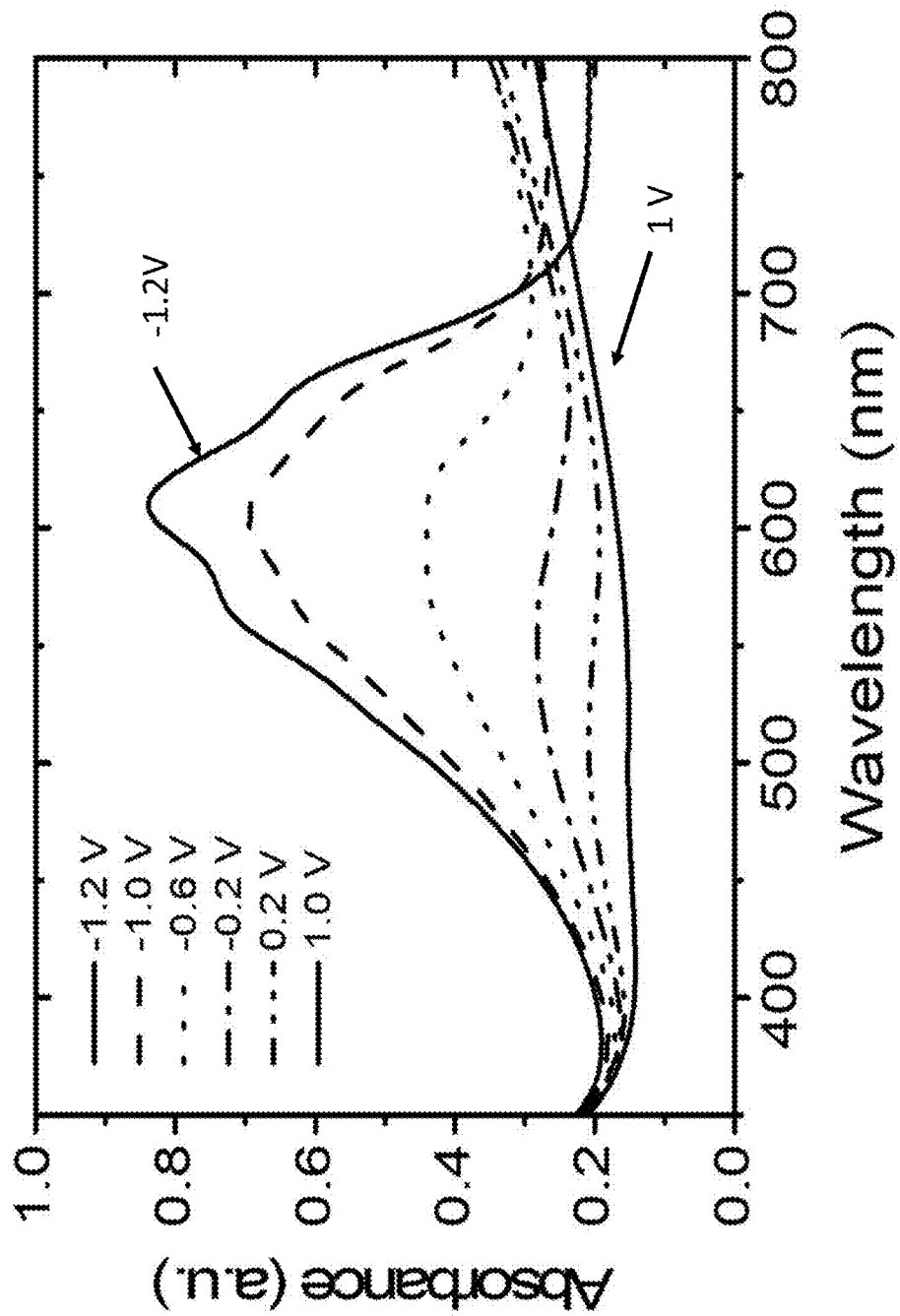
FIGS. 18(A)-(C) contain data of electrochromic behavior of transmissive ECP-B ECDs based on the example n-doped organic conductive polymer n-PBDF film as both working and counter electrodes, according to one example embodiment.
Figure 18:
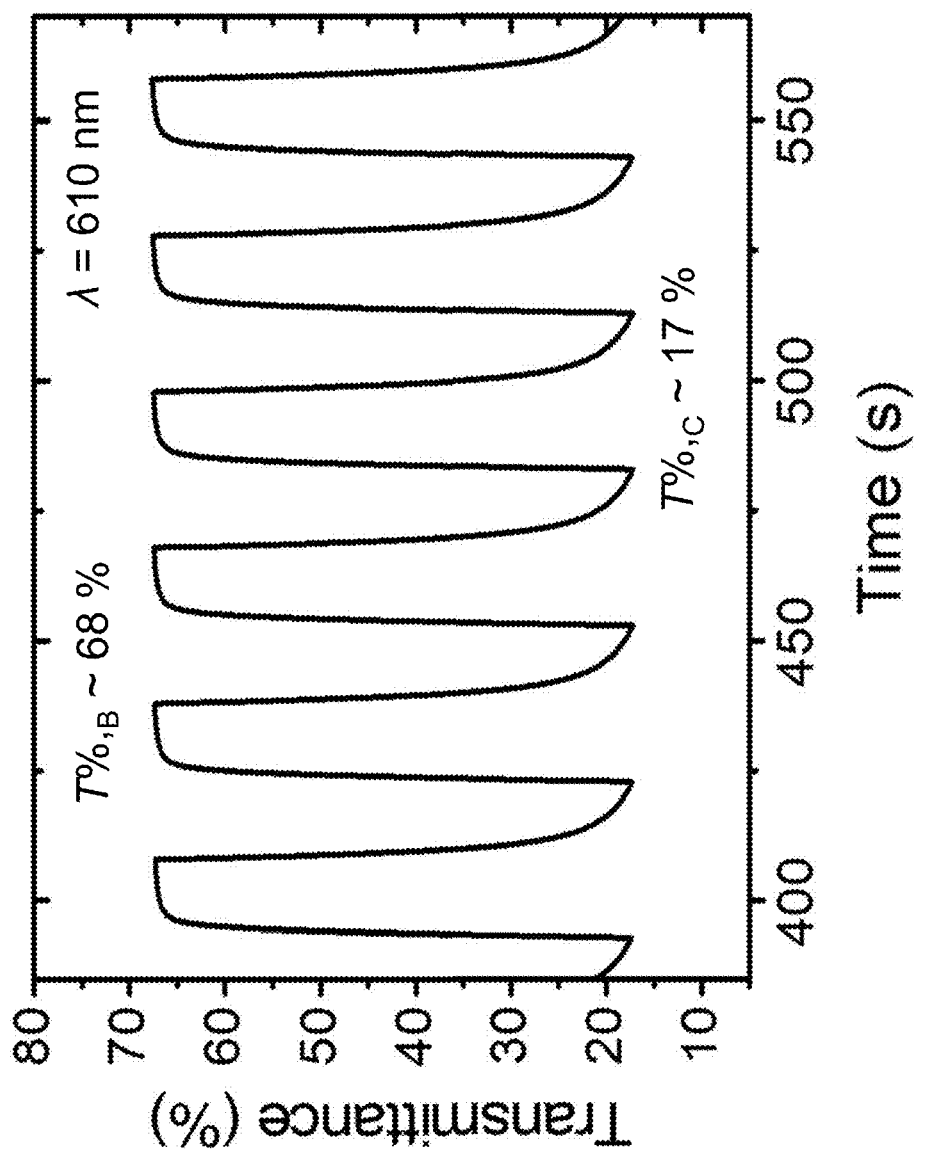
Figure 18:
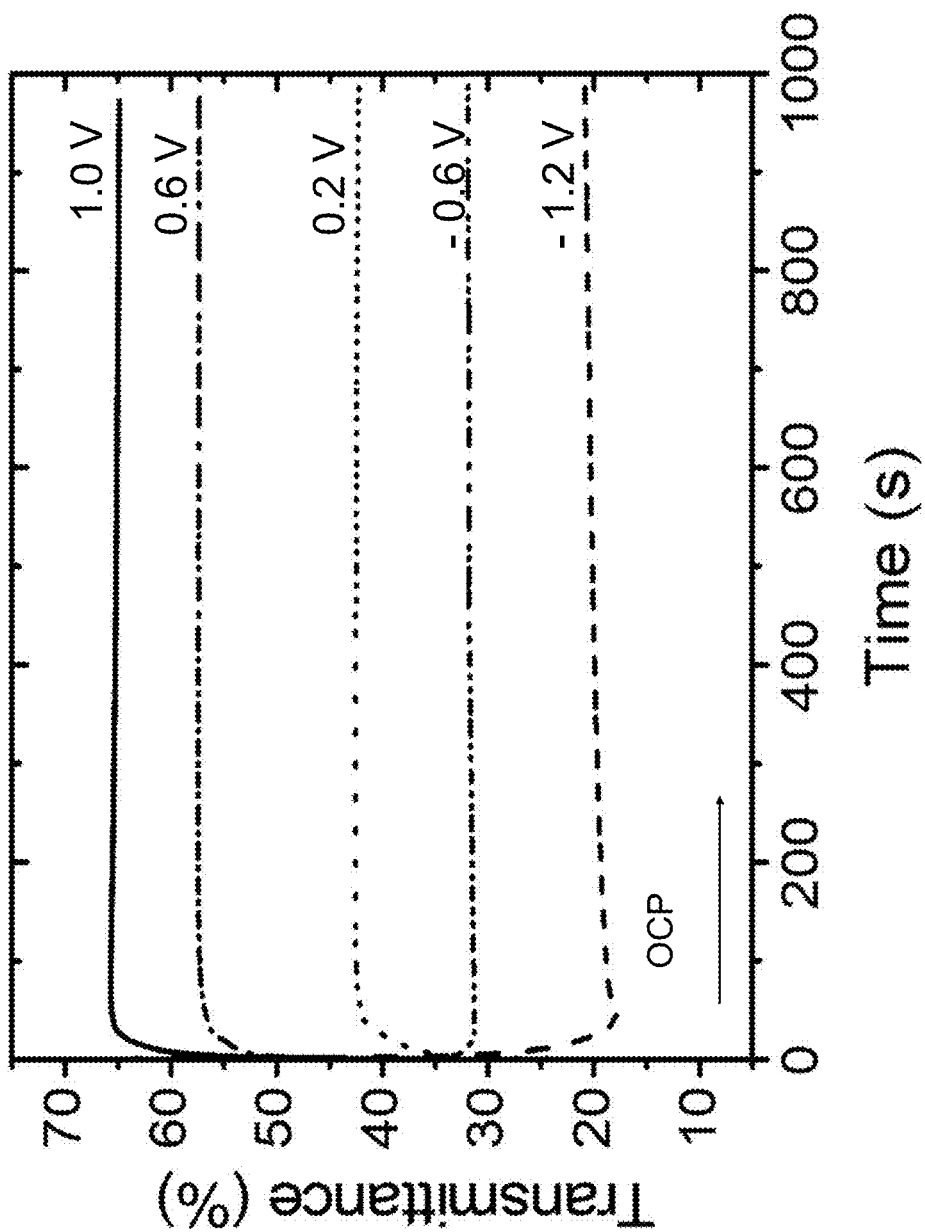

In some embodiments, the disclosed n-PBDF is used for the transparent conductors and conducting ion-storage layer in electrochromic devices. In polymerization and ink preparation process, PBDF immediately undergo reductive doping through water oxidation to yield n-doped PBDF, leading to very stable enhancement of electrical conductivity and low absorption coefficient in a visible region. In some embodiments, the n-PBDF is used to fabricate all-polymer ECDs in combination with photo-patternable ECP-B and solid electrolyte. The transparent, capacitive n-PBDF polymeric conductors can successfully replace conventional oxide-based ion storage layer and ITO at both counter and working electrodes. When the n-PBDF is introduced, the all-polymer ECDs display clear optical absorption changes upon the redox reaction between the p-type electrochromic polymers and the ion storing n-PBDF layers at the small operation voltage range (shown in FIG. 18(A)). Despite the complementary charge balancing by dedoping n-PBDF at counter electrode during electrochromic polymer reduction, the ECDs show pure blue colors of ECP-B because of the minor absorption of PBDF in visible region. In ECD bleached state, the doped n-PBDF contributes to the highly transparent nature, leading to high optical contrast. The partial dedoping of n-PBDF at the working electrode of all-polymer ECDs is observed under the device bleached state with a tiny increase of optical absorbance at 500 nm and relatively larger one at NIR range (700-800 nm), as compared to control devices where the PBDF only replaces counter electrodes or those based on conventional $VO_x$ ion storage layer and ITO conductors. However, the shoulder peak at 500 nm from partially dedoped n-PBDF is minor absorption, and the rest dominant absorptions are mainly localized at near IR region, which do not affect optical contrast in visible region and color display. The stable reversible transmittance changes in DPSC process show the high optical contrast and facilitated ionic liquid insertion and extraction into polymer capacitive conductors at both working and counter electrodes (as shown in FIG. 18(B)).

From a viewpoint in energy efficiency, the coloration and bleaching efficiencies are calculated at 95% change of optical contrast in the all-polymer ECDs. The electrochromic efficiencies of all-polymer ECDs are 760 $cm^2C^{-1}$ and 560 $cm^2C^{-1}$ for bleaching and coloration at 610 nm, respectively. The efficient electrochromic behavior is better than most metal oxide-based electrochromic materials and electrochromic polymers. Although the low reduction potential in n-PBDF allows many advantages as counter electrode materials such as whole-electrochemical-range transparent nature and low operation voltage, it inversely can give rise to detrimental self-bleaching phenomenon under open-circuit conditions to maintain the overall electroneutrality. Due to closed matched energy levels between p-type electrochromic polymers and conductive n-PBDF, electrons are spontaneously transferred from the electrochromic polymer to the n-PBDF, leading to unintentional electrochromic polymer oxidation at polymer/electrolyte interface for additional charge formation. Thus, the compact EDL between polymer and electrolyte is more important to suppress the self-bleaching behaviors when using the low-LUMO n-type polymers. The photo-crosslinkable solid electrolyte based on the fluidic ionic liquid can form the dense EDL with strong interactions with the electrochromic polymer films.

When the disclosed n-doped organic conductive polymer is used as either working or counter or both working and counter electrodes in a device, the electrochromic device shows great bistability. In some embodiments, the disclosed device has a transmittance decay $\Delta T<5\%$ for 1000 seconds of operation under an open circuit potential at each reduction or oxidation potential bias. In some embodiments, the disclosed device has a transmittance decay $\Delta T<4\%$, or $\Delta T<3\%$, or $\Delta T<2\%$, or $\Delta T<1\%$ for 1000 seconds of operation under an open circuit potential at each reduction or oxidation potential bias. In some embodiments, when n-PBDF is used as both working and counter electrodes, the all-polymer ECDs show good bistability by residual charge with $\Delta T$ decay<0.7% for 1000 s when the reduction potential varying from +1 V to −0.6 V (FIG. 18(C)). However, the transmittance change in open circuit potential is relatively larger in high electrochemical reduction potential of −1.2 V ($\Delta T$ decay 3% for 1000 s). It may originate from slow but unignorable fluidic ion penetration into thick electrochromic polymer layer and stronger self-bleaching effect due to n-PBDFs at working electrode. Indeed, the unstable bistability is not observed in the ECDs where n-PBDF is used as only counter electrodes with ITO as working electrodes (ΔT decay<0.3% for 600 s), which is similar to ECDs based on conventional $VO_x$ ion storage layer.

Figure 19:
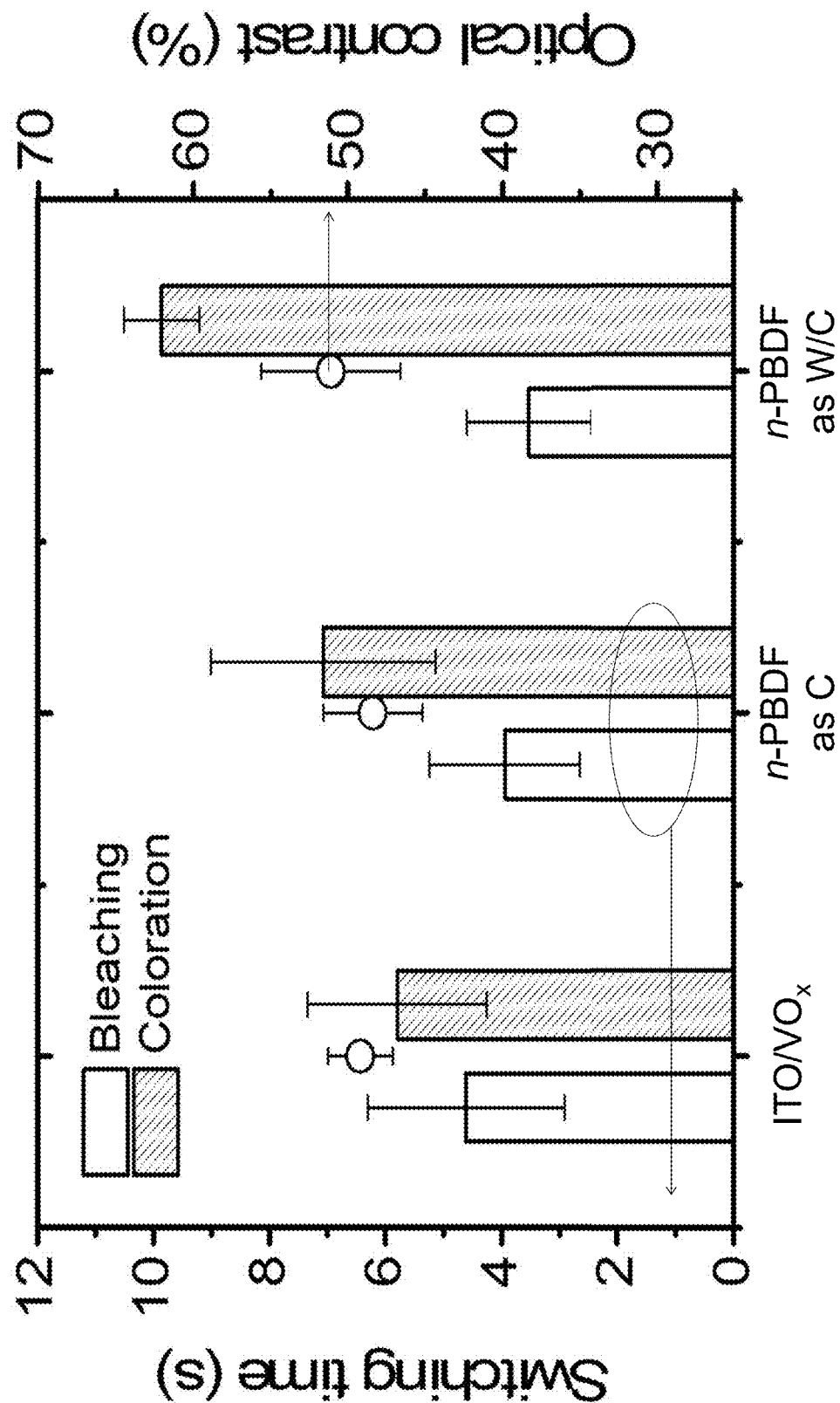
FIGS. 19(A)-(C) contain data of electrochromic behavior comparison of transmissive ECP-B ECDs using different conductors and ion storage layers, according to some example embodiments. "ITO/VO$_x$" means ECDs using Vo$_x$ as ion storage layer and ITO as working electrode. "n-PBDF as C" means ECDs using n-PBDF as ion storage counter electrode and ITO as working electrode. "n-PBDF as W/C" means ECDs using n-PBDF as ion storage counter electrode and working electrode.
Figure 19:
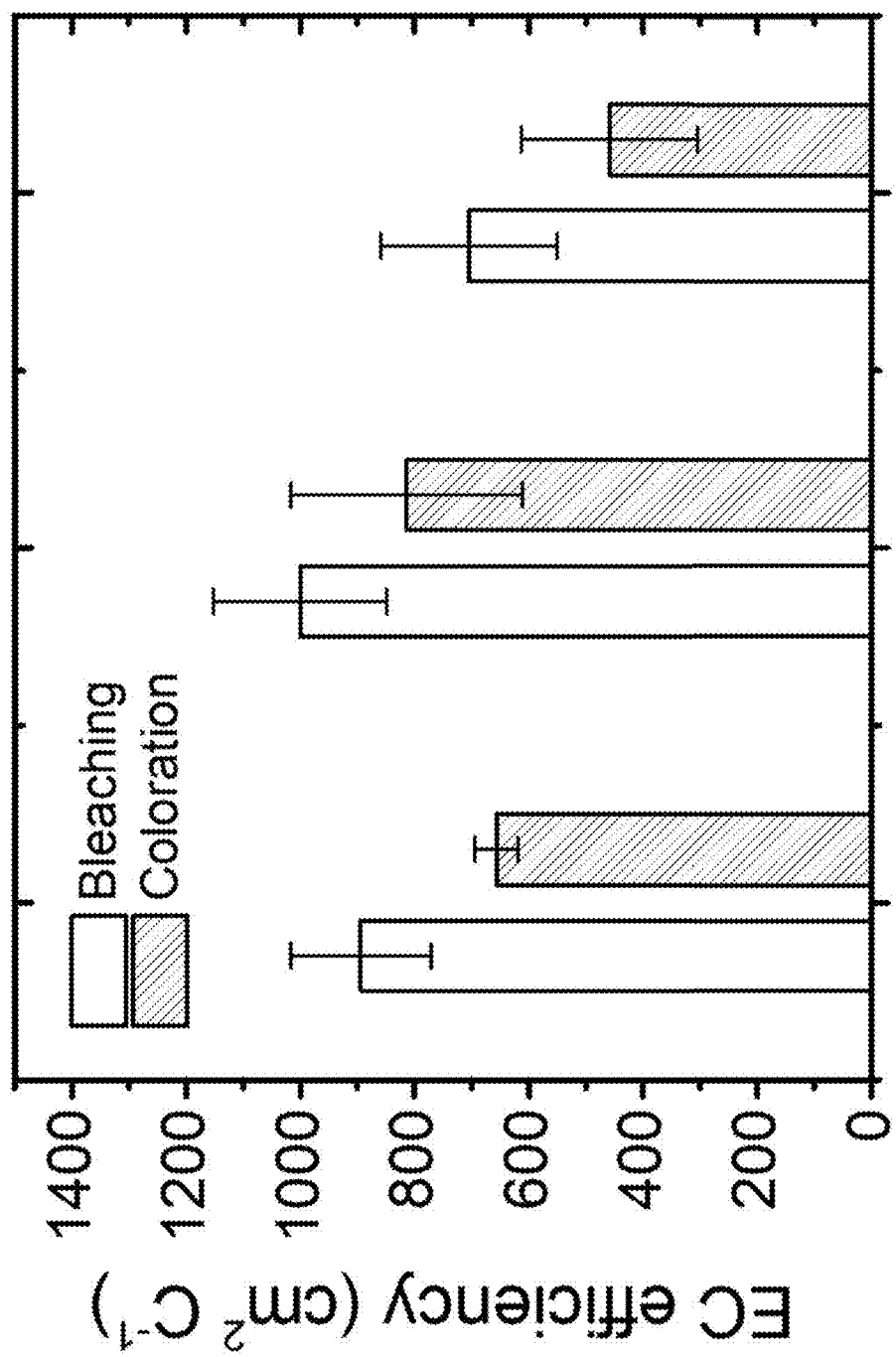
Figure 19:
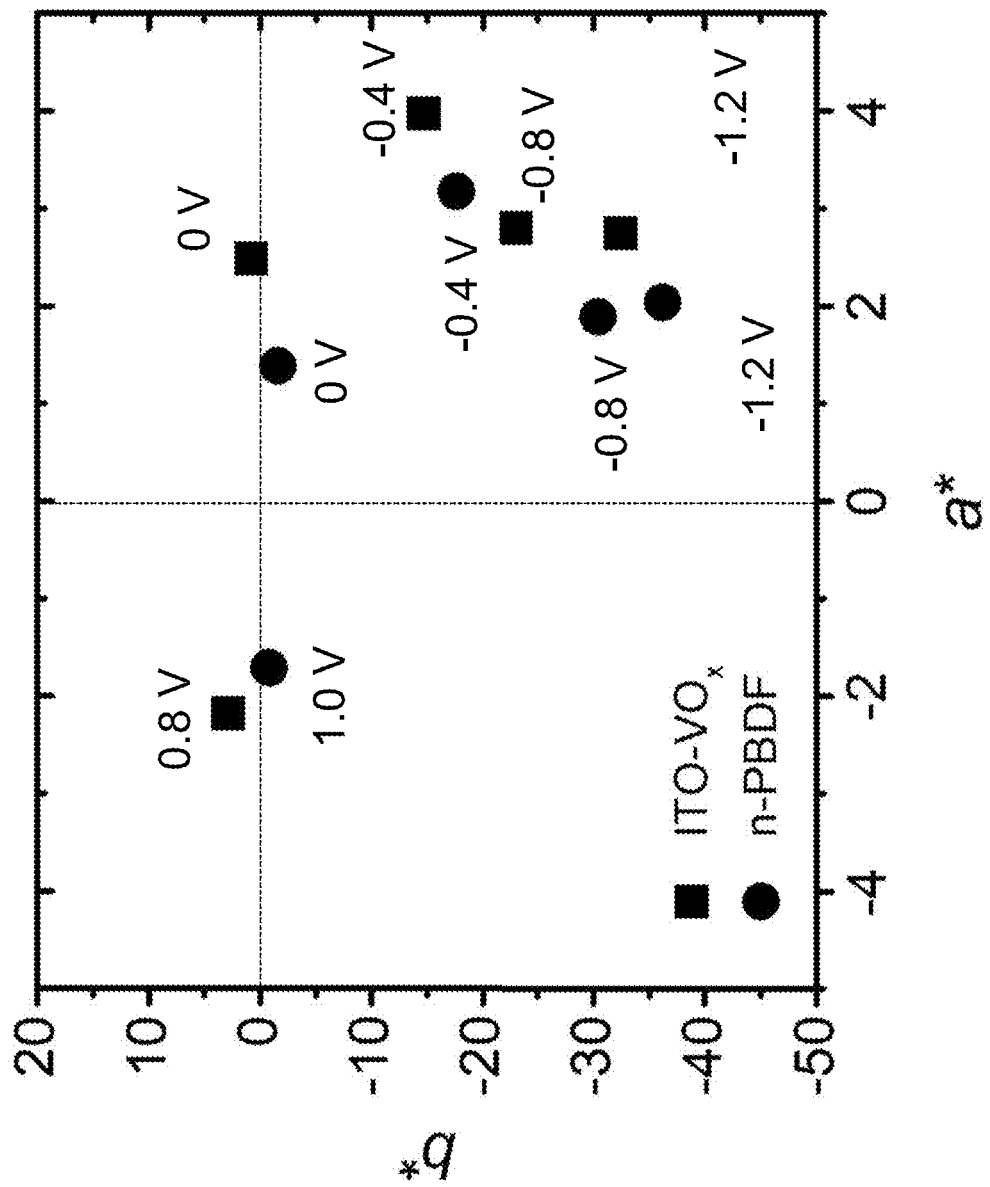

The effect from the slow redox behaviors at interface between electrochromic polymer and n-PBDF conductor at working electrode are also observed in the electrochemical dynamics during coloration and bleaching processes. In DPSC characterization, the coloration and bleaching switching rates of all-polymer ECDs are estimated as a function of time to reach 95% of the full optical contrast, $t_{95\%}$. The introduction of n-PBDF at working electrode decreases the transmittance switching rate, especially in the coloration process. For example, ECDs with the n-PBDF counter electrodes and ITO working electrode, $t_B$ is about 2.8 s and $t_C$ is about 4.2 s, while for example ECDs with n-PBDF as both working and counter electrodes, is $t_B$ about 3.2 s and $t_C$ is about 8.7 s. At the coloration process, the doped liquid ions migrate out of the electrochromic polymer layer to adjust the charge neutrality. The redox reaction and charge transfer between n-PBDF and electrochromic polymer prohibit the rapid ion movement, leading to slow transmittance difference. The quantitative comparison in electrochromic performances of see-through displays are shown in FIG. 19(A)-(B). The ECDs using n-PBDF as only counter electrodes show comparable optical contrast and electrochromic switching time compared to conventional ITO/$VO_x$-based ECDs, which indicates that the transparent polymeric conductors can successfully replace the oxide-based electrodes and ion storage layers. However, the all-polymer ECDs with n-PBDF as both working and counter electrodes show relatively reduced electrochromic efficiencies, especially on coloration process. Akin to the longer switching time at coloration process, it results from the charge transfer at working electrode and the additional redox reactions which need more charges. Despite the redox behavior at working electrodes, the all-polymer ECDs with n-PBDF as both working and counter electrodes show excellent color display with the minimally color changing properties at both working and counter electrodes (FIG. 19(C)). They show non-colored status with closer a* and b* color coordinate to zero at bleached state. In addition, the smaller color changes are observed in a* axis from bleached state to colored one, which indicates pure color display of ECP-B in all-polymer platform.

In some embodiments, to fabricate ECDs, e.g., non-patterned ECDs, electrochromic polymers (20-40 mg) are dissolved in 1 mL chloroform and stirred continuously overnight. PBDF inks are prepared in DMSO solution. The PBDF inks are spin-coated on UV-ozone treated glass or PET substrate. The prepared electrochromic polymer solutions are spin-coated on the ITO or PBDF-deposited substrates. The $VO_x$-based ion storage layer is fabricated on the other pre-rinsed ITO substrate. For conventional ECD fabrication without patternable solid electrolyte, PEGDA, PC with 0.2 M LiTFSI, and HMPP are mixed in a volume ratio of 5:5:1. After stirring for 10 min, the solution is dropped on the ion storage layer deposited substrate. The electrochromic polymer deposited substrate is transferred to the top after flipping. After waiting a few seconds for the electrolyte precursor solution to become uniform, the electrolyte is crosslinked under the UV light irradiation (~2000 mJ $cm^{-2}$; 405 nm). For electrical contact, copper tape is applied to both sides of the conducting layers. For ECD fabrication with patternable solid electrolyte, PEGDA, TT, EMIT-TFSI, and HMPP is mixed in a weight ratio of 1:1:2:0.1. After stirring for 10 min, the precursor solution is dropped on ion storage layer or on electrochromic layer. The electrolyte is crosslinked under the UV light irradiation (~300 mJ $cm^{-2}$; 405 nm). In some embodiments, the disclosed n-doped organic conductive polymer films with the same thickness are used separately for two conducting layers (counter electrodes and working electrodes). In some embodiments, slightly thicker conducting films (e.g., ~30 nm) are used for counter electrodes than working electrodes (e.g., ~20 nm) to make charge balance in the electrochemical reaction with electrochromic polymer films.

Used in Displays and Patterned Displays

Displays play a pivotal role in the modern digital landscape, serving as the primary interface for communication, entertainment, and information dissemination. Emissive displays, like LEDs and LCDs, are prevalent due to their vivid colors, high brightness, and sharp resolution. However, they come with drawbacks, including high energy consumption and potential eye strain caused by prolonged exposure to bright, artificial light. In this context, the development of transmissive non-emissive displays is essential. These displays, like see-through electrochromic displays, offer a promising alternative. They are characterized by lower power consumption and reduced eye strain, as they modulate natural light instead of emitting their own. This technology not only paves the way for more sustainable and comfortable visual experiences but also opens new avenues for innovative applications in smart devices and architectural design, blending functionality with aesthetic appeal. However, developing see-through transmissive electrochromic displays poses significant challenges, primarily due to the complexity of fabricating multiple layers with incompatible processing requirements. The transparent conductor, ion storage materials, solid-state electrolyte, and electrochromic layer each require distinct manufacturing conditions and materials, complicating the patterning, scaling, and integration of these components into a cohesive unit. This complexity often results in technical hurdles that make it challenging to produce uniformly performing, large-scale electrochromic displays suitable for commercial applications. The unique property of being electrically conductive and being able to store large amounts of charges in the disclosed n-doped organic conductive polymer thin film, coupled with the patternable solid-state electrolyte, enables us to fabricate the first see-through all-polymer flexible electrochromic display with low power consumption and bistability. For high flexibility and human-friendly nature in see-through display demonstration, transparent polymer components are utilized such as electrochromic active materials, electrolytes, ion storage layers, and electrodes including n-PBDF.

In some embodiments, the disclosed n-doped organic conductive polymer can be fabricated into a patterned device, e.g., an all-polymer based patterned electrochromic display. In some embodiments, the patterning of the electrochromic polymers, solid electrolyte and the disclosed n-doped organic conductive polymer films in the disclosed patterned device is fabricated using in-situ photolithography. In some embodiments, electrochromic polymers (20-40 mg) and photo-crosslinker (5 wt %, e.g., bis(fluorophenylazide) (bisFA) crosslinker, which induces a large solvent resistances via photocrosslinking) are dissolved in 1 mL chloroform and stirred continuously overnight. The spin-coated films are crosslinked under the UV light irradiation with photomask (2000 mJ $cm^{-2}$; 405 nm). The unexposed area is removed using toluene. In some embodiments, five colors of EC polymers based on poly(3,4-propylenedioxythiophene) (PProDOT) are studied for demonstration of diverse color representation in the display application. The electrochromic polymers (ECPs) are denoted as ECP-C, ECP-M, ECP-Y, ECP-BK, and ECP-B for cyan, magenta, yellow, black, and blue colors, respectively.). For see-through display applications, the optical properties of all the electrochromic components are investigated. All the ECP films exhibit reversible absorption changes in electrochemical reactions. Despite the strong photocrosslinking by azide molecule, they show almost unchanged absorbance in reduced state with clear five color spectra representation as corresponded to photographic images. They show a significant decrease in the visible absorbance to highly transparent state with a positive bias applied.

In some embodiments, the electrolyte precursor solutions are prepared using the same method to fabricate solid electrolyte layer. The photopolymerization of acrylate groups is executed in presence with ionic liquid and thiol monomer. The thiol monomer enables the free radical photopolymerization for both chain-growth and step-growth in polyethylene glycol diacrylate (PEGDA), leading to reduced polymerization time and the high energy efficiency in photolithography process. In addition, the use of ionic liquid without additional polar solvent as well as addition of the thiol molecules enhances a wettability of the precursor solution on various surface in display application (e.g., metal oxides, glass, ITO, and polymeric layers), which enables fabrication of size-tunable, patterned solid electrolyte layer using simple spin coating process up to several tens of nanometer thickness. The prepared precursor solutions are spin-coated or drop-casted on the ITO or the doped organic conductive polymer deposited substrates, followed by the selective UV light crosslinking with photomask ($\sim$300 mJ cm$^{-2}$; 405 nm). The unexposed area is cleaned by DI water. For see-through display applications, transmittance spectra of the patternable solid electrolyte layers depending on the different blending ratio in thiol molecule, PEGDA, and ionic liquid are investigated. The blended thiol and ionic liquid do not perturbate optical transmittivity of entire polymer matrix system, which gives rise to high transmittance (>98%) in whole visible region. Using an ionic conductivity of the photo-patternable solid electrolyte, ECDs are fabricated with ECP-B, conventional metal-oxide based charge-balancing material, VO$_x$, and ITO deposited glass. When considering their static optical absorbances in both coloration and bleaching states, there is no clear changes in terms of peak shapes, intensity, and spectral optical contrast by the solid electrolyte condition with different blending ratio. Dynamic optical property is recorded in ECP-B films with regard to their transmittance change in double potential step chronoabsorptometry (DPSC) characterization. The electrochromic dynamics based on ECP-B devices could be directly enhanced as increased ionic liquid loading contents, leading to short bleaching and coloration time of 3.5 s and 3.9 s with 75 wt % ionic liquid loading, respectively. It indicates that the presence of polymer network does not give rise to a detrimental effect on the movement of the liquid ions and the resultant ionic conductivity. The ionic conductivity is also increased by addition of thiol monomer in the polymer gel-based solid electrolyte layer, which may originate from the reduced crosslinking of acrylate photopolymerization via chain-growth mechanism with presence of the thiol monomer and reduced UV light power for crosslinking.

The disclosed doped organic conductive polymer is used for the conductors, conducting ion-storage layer and electric interconnect in electrochromic devices. In polymerization and ink preparation process, the exemplary organic conductive polymer PBDF immediately undergoes reductive doping through water oxidation to yield n-doped PBDF (n-PBDF), leading to very stable enhancement of electrical conductivity and low absorption coefficient in a visible region. In some embodiments, the patterning of the disclosed n-doped organic conductive polymer films is fabricated using conventional photolithography in combination with reactive ion etching (RIE) dry process and etch-blocking layer. In some embodiments, AZ1518 (Microchemicals) is spin-coated on the pre-deposited n-PBDF film as an etch blocking layer (5000 rpm, 45 s) and baked at 110° C. for 2 min to remove residual solvent. The photoresist films are then exposed to the near-UV light (405 nm, 100 mJ cm$^{-2}$) using a maskless aligner (Heidelberg MLA150). The films are developed in developer solution (Microposit, MF-26A) for 45 sec. After rinsing with DI water, the patterned films are exposed to etching plasma for 30 min to remove the unprotected polymer layer. After plasma etching, all the remaining photoresist films are removed with acetone. The conducting polymer films are chemically and mechanically robust from thermal treatment and orthogonal solution processing in photolithography process, leading to clear microscale patterns with sharp edge.

To fabricate a patterned electrochromic device or display, a first conducting layer is coated on a first substrate and the first conducting layer includes the disclosed n-doped organic conductive polymer and it is patterned to form first areas and first electric interconnects between adjacent first areas. A second transparent conducting layer is coated on a second substrate and the second conducting layer is patterned to form second areas and second electric interconnects between adjacent second areas. The electric interconnects provide pathway for precise activation and control of the areas. Then one of the following is performed: a) forming a first electrolyte layer on each of the first areas, wherein the first electrolyte layers are separated from each other; forming an electrochromic layer on each of the second areas, wherein the electrochromic layers are separated from each other; forming a second electrolyte layer on each of the electrochromic layers, wherein the second electrolyte layers are separated from each other; and laminating the first substrate and the second substrate such that the first electrolyte layers are aligned with and in contact with the second electrolyte layers; or b) forming an electrolyte layer on each of the first areas, wherein the electrolyte layers are separated from each other; forming an electrochromic layer on each of the electrolyte layers, wherein the electrochromic layers are separated from each other; and laminating the first substrate and the second substrate such that the electrochromic layers are aligned with and in contact with the second areas; or c) forming an electrochromic layer on each of the second areas, wherein the electrochromic layers are separated from each other; forming an electrolyte layer on each of the electrochromic layers, wherein the electrolyte layers are separated from each other; and laminating the first substrate and the second substrate such that the electrolyte layers are aligned with and in contact with the first areas. Similar fabrication method without patterning is used to make a non-patterned electrochromic device.

Figure 20:
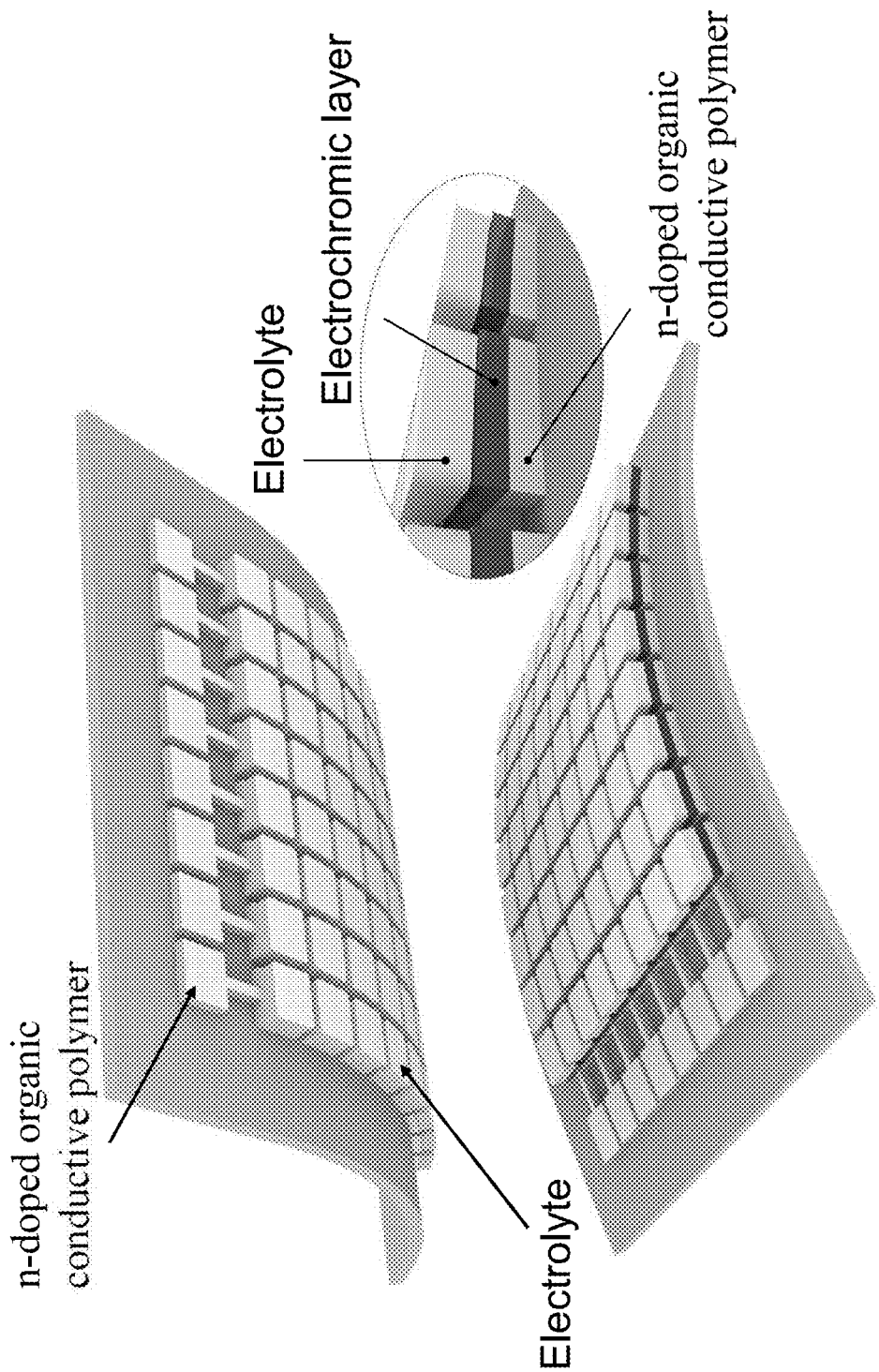
FIG. 20 is an example schematic diagram of a fabrication concept for a patterned electrochromic device, according to one embodiment.

In some embodiments, to make a patterned electrochromic device/display, e.g., an all-polymer pixelated electrochromic display, as illustrated in FIG. 20, the disclosed n-doped organic conductive polymer is included in the first and second conducting layers and step a mentioned above is used. The disclosed n-doped organic conductive polymer conductor lines are fabricated by patterning the n-doped organic conductive polymer films as mentioned and function as working electrodes, ion storing conducting layer (the counter electrode), and electric interconnects. On top of the working electrode, electrochromic polymer films are spin-coated and patterned using in-situ photolithography. To make two (or four) color display, the same processes are repeated for two (or four) times on the conductive patterned substrate. The precursor solution is dropped on both ion storing conducting layer (the counter electrode) and electrochromic polymer surfaces, followed by the UV light crosslinking with a photomask on the dropped precursor solution. The unexposed area is removed using acetone. Two substrates are carefully assembled and vacuumed using a rotary pump for 1 hour. In some embodiments, similar fabrication method described above and in FIG. 20 without patterning is used to make a non-patterned electrochromic device.

Figure 21:
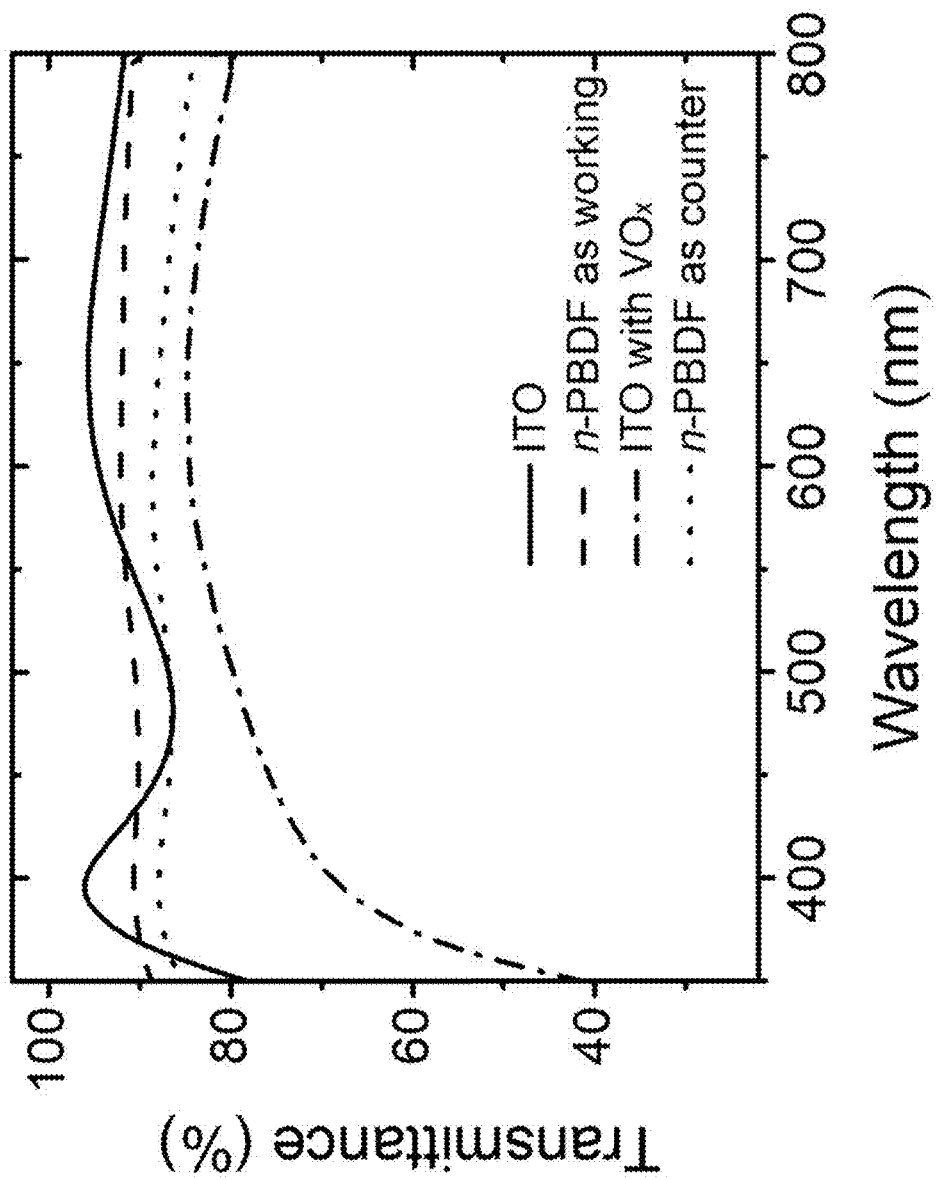
FIG. 21 shows optical transmittance spectra of ITO, ITO/VO$_x$, and n-PBDF films (as working electrode or counter electrode).

For capacitive electrode application in all-polymer ECDs, in some embodiments, transparent n-PBDF films are fabricated using simple spin-coating of polymer-dispersed solution in dimethyl sulfoxide (DMSO). Slightly thicker n-PBDF films (~30 nm) are used as counter electrodes than working ones (~20 nm) to make charge balance in the electrochemical reaction with electrochromic polymer films. Both n-PBDF films show highly transparent nature with transmittances larger than 80% in entire visible region (FIG. 21). The optical transparency of n-PBDF films rival with ITO, and superior to capacitive metal-oxide deposited ITO films.

In some embodiments, the disclosed pixelated electrochromic display adopts a passive matrix structure. A passive matrix structure is chosen to take advantage of low energy operation through the excellent optical memory effects in the disclosed all-polymer ECDs. However, in passive matrix driving, a severe image crosstalk can be caused because of an unintentional charge transfer between pixels through the electrolyte layer. Thus, for its certain separation in individual pixels, the solid electrolyte is patterned through in-situ photolithography on each pixel for fabrication of passive matrix-based display with 8×8 matrix pixels (see FIG. 22(A)-(B)). The solid electrolyte films are successfully deposited on both photo-patterned electrochromic polymer and n-PBDF films for working and counter electrodes, respectively. And then laminate the first substrate and the second substrate such that the first electrolyte layers are aligned with and in contact with the second electrolyte layers to make the device.

The photolithographic patterning allows clear localization and sharp edges of all the solid electrolyte, n-PBDF conductor, and electrochromic polymer layers for electrochromic passive matrix display pixel fabrication.

Figure 22A:
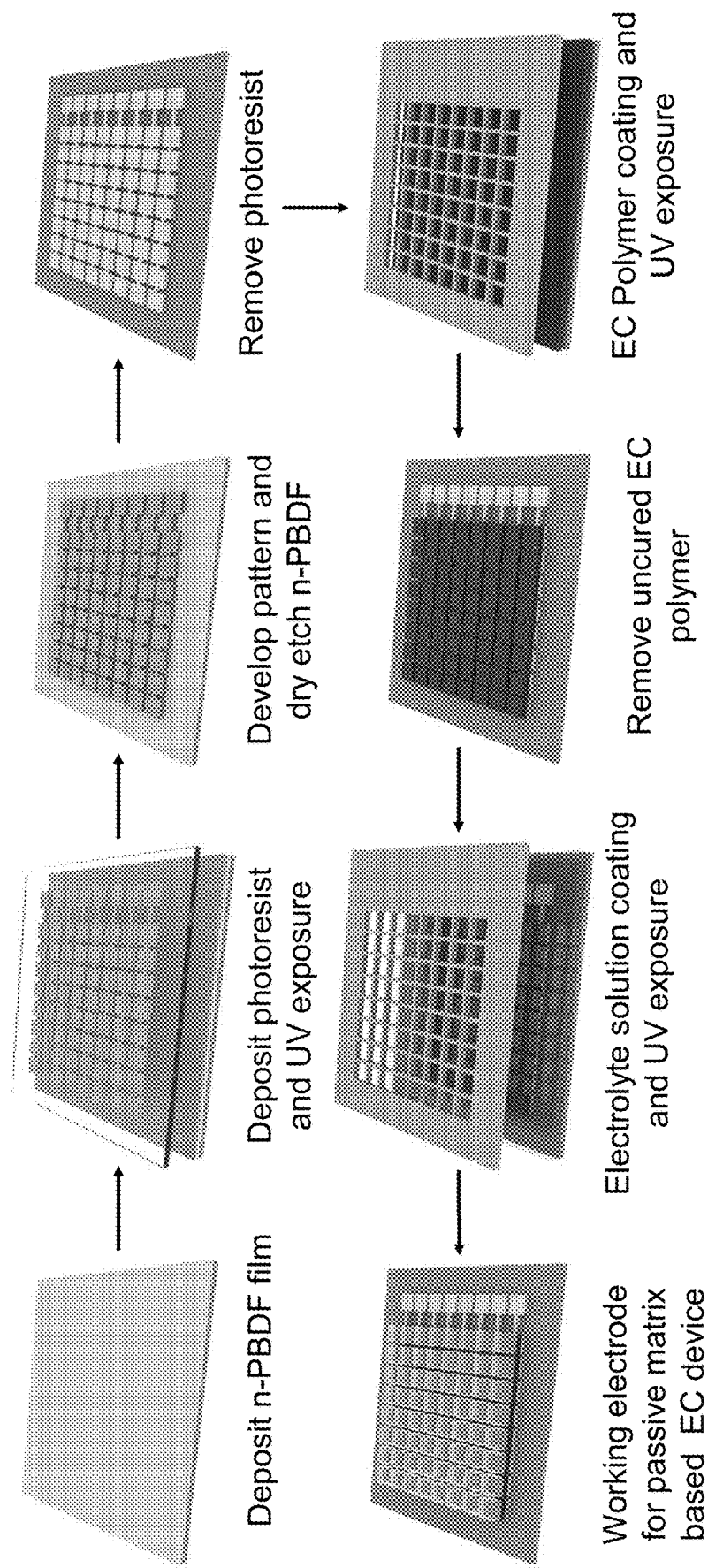
FIGS. 22(A)-(B) show schematic diagrams of fabrication process of a working electrode substrate (FIG. 22(A)) and a counter electrode substrate (FIG. 22(B)) for a passive matrix-based electrochromic device or display using photolithographic patterning according to some example embodiments.
Figure 22B:
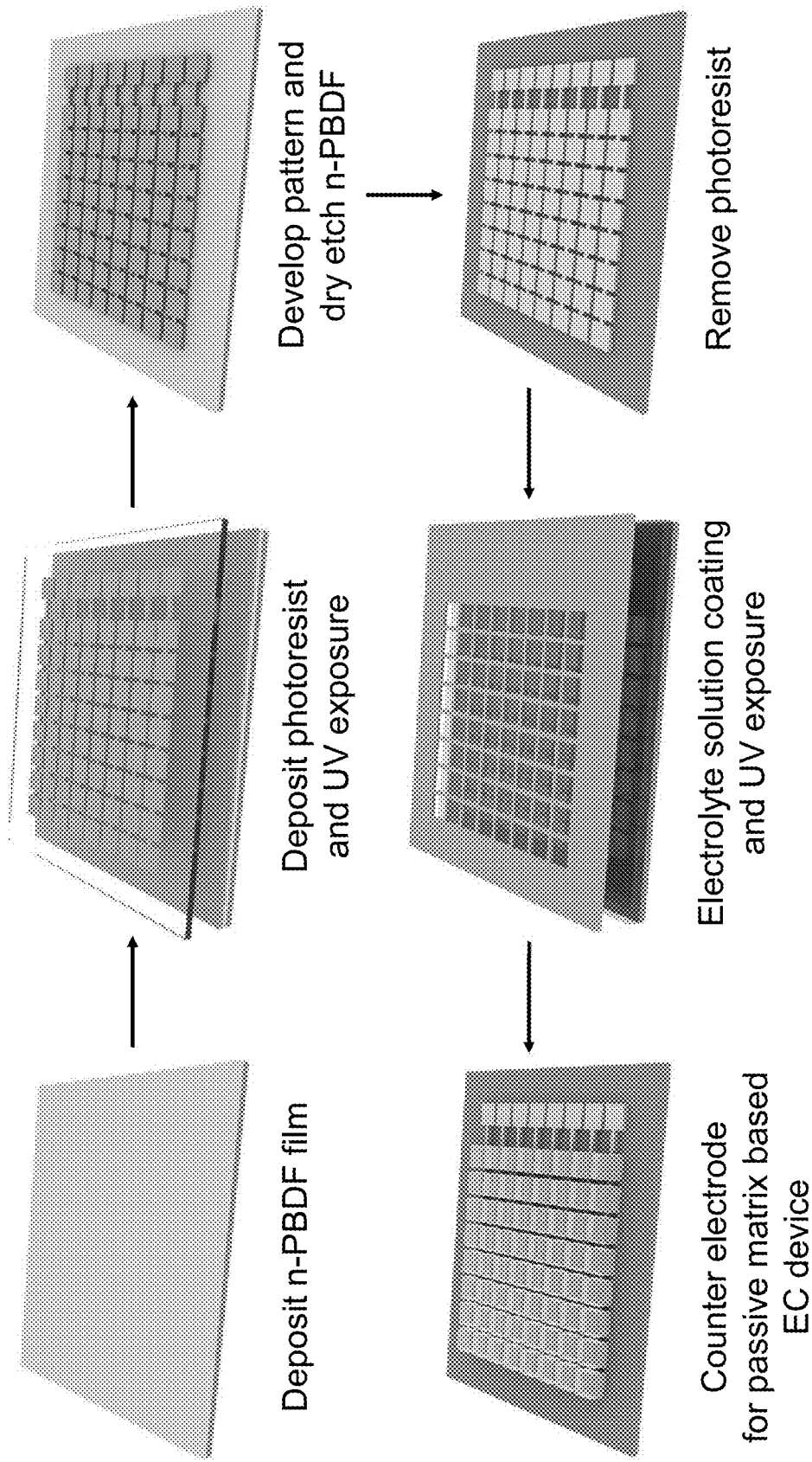

With reference to FIGS. 22(A) and 22(B), an example method for forming an electrochromic device is provided. In FIG. 22(A), a conducting film (e.g., n-PBDF film or other suitable conducting film) is deposited on a substrate. The substrate can be rigid (e.g., glass, metal, etc.) or flexible (e.g., plastic). The substrate can be transparent, semi-transparent, or reflective. Then a patterning process is performed on the conducting film. In this patterning process, a photoresist film is deposit on the conducting film, and a lithographical step including exposing the photoresist film with a UV light through a photomask having a desired pattern including areas or pixels, and interconnects between the areas or pixels is performed. The exposed photoresist film is then developed to form a photoresist pattern on the conducting film. An etching processing (e.g., dry etching) is performed using the photoresist pattern as a mask to etch the conducting film to form the desired pattern. The remaining photoresist is then removed. The patterning process can separate the conducting layers on different areas (e.g., pixels or segments). In some embodiments, the above processes can not only be used to form a pixelated device but also a segmented device. In some embodiments, the above patterning processing on the conducting film can be omitted when forming a non-patterned electrochromic device.

Following the patterning processes of the conducting film on the substrate, an electrochromic polymer (EC Polymer) layer is coated on the substrate. A lithographical process (including UV exposure through a photomask on the EC Polymer layer, and removing the uncured EC Polymer layer by wet etching after UV exposure) is then performed on the EC Polymer layer to pattern the EC Polymer layer. This patterning process can separate the EC Polymer layer on each of the pixels or segments. To make two-(or more) color display, the same processes are repeated for two (or more) times on the conductive patterned substrate. To form the non-patterned electrochromic device, only coating of the EC Polymer layer is performed without the patterning process.

Next, an electrolyte solution is coated on the substrate to form an electrolyte film. A lithographical process (including UV exposure through a photomask on the electrolyte film, and removing the uncured electrolyte film by wet etching after UV exposure) is then performed on the electrolyte film to pattern the electrolyte film. This patterning process can separate the electrolyte film on each of the pixels or segments. To form the segmented or the non-patterned electrochromic device, only coating of the electrolyte solution is performed without the patterning process. The step concludes forming the working electrode for an EC device or display, e.g., a passive matrix-based EC device or display in FIG. 22(A).

Reference is now made to FIG. 22(B), illustrating a method for forming a counter electrode substrate. As shown in FIG. 22(B), a conducting film (e.g., n-PBDF film or other suitable conducting film) is deposited on a substrate. The substrate can be rigid (e.g., glass, metal, etc.) or flexible (e.g., plastic). The substrate can be transparent, semi-transparent, or reflective. Then a patterning process is performed on the conducting film. In this patterning process, a photoresist film is deposit on the conducting film, and a lithographical step including exposing the photoresist film with a UV light through a photomask having a desired pattern including areas or pixels, and interconnects between the areas or pixels is performed. The exposed photoresist film is then developed to form a photoresist pattern on the conducting film. An etching processing (e.g., dry etching) is performed using the photoresist pattern as a mask to etch the conducting film to form the desired pattern. The remaining photoresist is then removed. The patterning process can separate the conducting layers on different areas (e.g., pixels or segments). In some embodiments, the above patterning processing on the conducting film can be omitted when forming a segmented or non-patterned electrochromic device.

Next, an electrolyte solution is coated on the substrate to form an electrolyte film. A lithographical process (including UV exposure through a photomask on the electrolyte film, and removing the uncured electrolyte film by wet etching after UV exposure) is then performed on the electrolyte film to pattern the electrolyte film. This patterning process can separate the electrolyte film on each of the pixels. To form the segmented or the non-patterned electrochromic device, only coating of the electrolyte solution is performed without the patterning process. The step concludes forming the counter electrode for an EC device or display, e.g., a passive matrix-based EC device or display in FIG. 22(B).

After the working electrode substrate and the counter electrode substrate are prepared, the two substrates can be laminated such that the electrolyte layer on the working electrode substrate is aligned with and in contact with the electrolyte layer on the counter electrode substrate, as shown in FIG. 20. This laminating method form an electrochromic device by contacting two electrolyte layers to improve yield and performance of the EC device as the contacting interface is formed by the same electrolyte. It eliminates potential contamination at much critical interfaces such as between the conducting layer and the electrolyte or ion storage layer, between the conducting layer and the electrochromic layer, or between the electrolyte layer and the electrochromic layer.

In some embodiments, the electrolyte film/layer and the electrochromic layer can be formed on the same substrate. For example, when the electrolyte film/layer and the electrochromic layer are both formed on the first substrate, the two substrates are laminated such that the electrochromic layer on the first substrate is aligned with and in contact with the conducting layer on the second substrate. In some embodiments, when the electrolyte film/layer and the electrochromic layer are both formed on the second substrate, the two substrates are laminated such that such that the electrolyte layer on the second substrate is aligned with and in contact with the conducting layer on the first substrate.

Figure 23B:
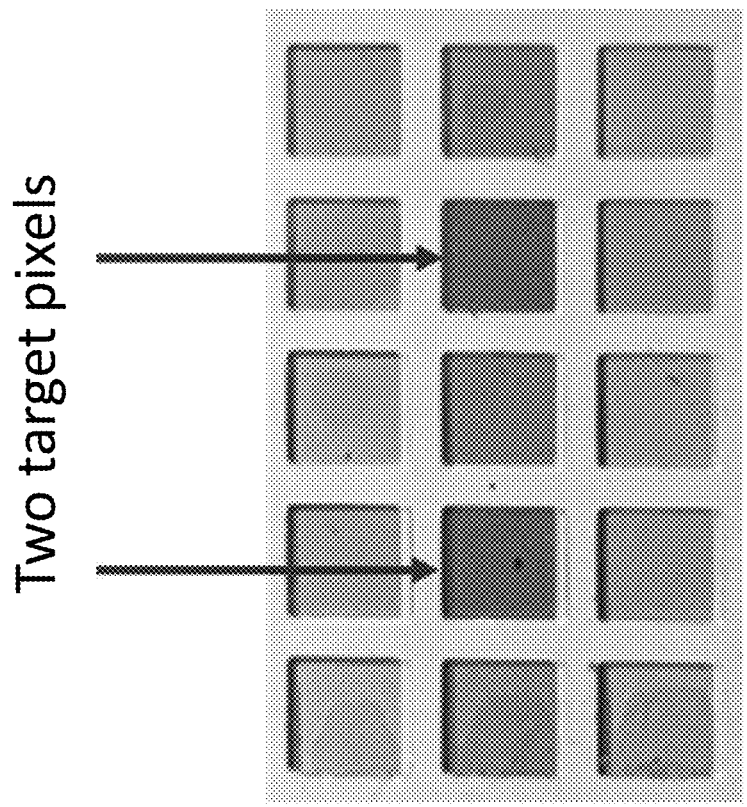
FIGS. 23(A)-(B) contain images of all-polymer passive matrix based electrochromic display with reduced crosstalk.
Figure 23A:
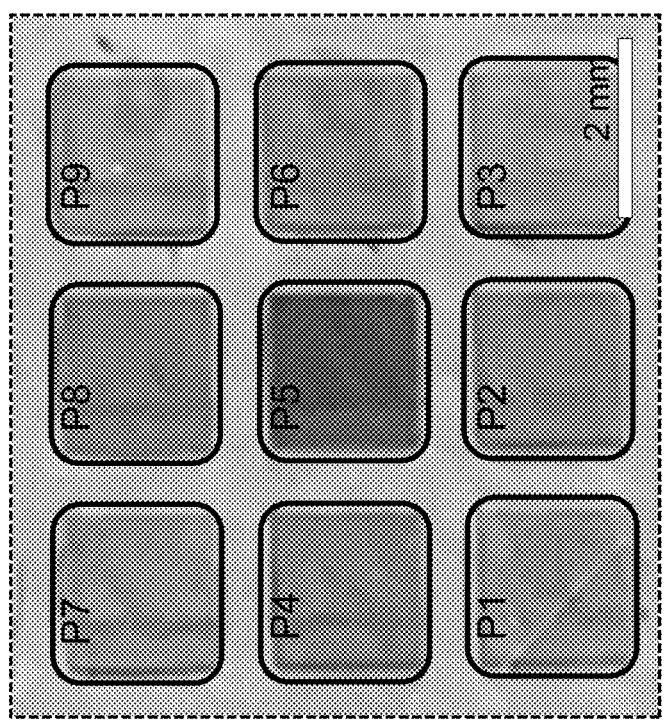

To demonstrate the minimized cross talk for the passive matrix-based all-polymer electrochromic display using in-situ patterned solid electrolyte localization, negative voltage (−0.8 V) is applied to turn on (colored) a target pixel at the intersection of the certain row and column electrode line after setting all pixels to fully bleached state with positive voltage (+1.0 V) for several seconds. When the negative voltage is applied for 10 seconds, only the target pixel shows distinct coloration without distinct color changes in adjacent eight pixels, which is indicative of highly reduced signal crosstalk in our electrolyte localized passive matrix electrochromic display (FIG. 23(A)). On the other hand, very severe crosstalk is observed in the electrochromic display where the electrolyte is not localized. Although the turn-off voltage (+1.0 V) is applied on only two crossed electrodes for target pixel bleaching, it affects surrounding pixels and makes them fully bleached on the working and counter electrode lines in a second. The significant and fast crosstalk is also observed at electrochromic displays where the electrochromic polymer is patterned, which indicates that the crosstalk originated from the unwanted charge transfer in pixels sharing same row or column electrodes through the delocalized electrolyte layer. The suppression of crosstalk in the electrolyte localized electrochromic display is also confirmed at multi-pixel coloration process and bleached process as shown in FIG. 23(B). When the two target pixels with one pixel space are biased by −0.8 V for 10 sec, they show distinct blue colors without severe crosstalk.

Great bistability is also demonstrated. When the bleaching voltage (+1.0 V) is applied on four target pixels with 30 second intervals. They show clear color bleaching at the target pixels and maintain the bleached transmittance at open-circuit potential due to their high optical memory. It is noteworthy that our electrochromic display retains signals without use of thin film transistors for active matrix deriving which require the high manufacturing cost, complex device structure, and large space. In some embodiments, a passive matrix-based display shows similar color display when the voltage of −0.8 V is applied for 10 s and stayed for 1000 s at open-circuit potential, which means the display has large bistability. With the large bistability, the passive matrix driving can significantly reduce the energy consumption in pixelated display applications. The outstanding bistability enables excellent energy saving display applications. The energy consumption for each coloration or bleaching process is recorded from the current profile in the chronoamperometry response of a single pixel in the passive matrix display. Remarkably, the energy required for one color switch is only $0.71 \pm 0.05$ mJ cm$^{-2}$. In scenarios involving static content, the power consumption remains at approximately 0.7 µW cm$^{-2}$ over a 1000 s if the content is not updated. In comparison to reported displays, the all-polymer electrochromic display demonstrates an ultra-low power consumption level, particularly advantageous for applications involving infrequent information updates. This efficiency is attributed to the fact that energy is only consumed during the switching and updating processes.

The optical absorption spectra are recorded quantitatively for nine pixels including one target, two working-line sharing, two counter-line sharing, 1 and four diagonal pixels. For static absorption measurement, the spectra are measured after the voltage was applied for 30 seconds in the target pixel. With increase in the applied negative voltage from −0.6 V to −1.0 V, the coloration at target pixel become more remarkable. However, we observe small absorption increases at the working- and counter-line sharing pixels unlike diagonal positions. The small color changes are also confirmed at photographic images. To elucidate the origin of the small crosstalk, we measure dynamic absorbance change in target coloration process in non-patterned, only electrochromic polymer patterned, and electrolyte localized electrochromic display. When the voltage is applied to target pixel in non-patterned electrochromic display, the change of absorption intensity in working- and counter-line sharing pixels reach around 100% (Δabs) compared to absorption change in target pixel in 1-4 s. The patterning of polymers slightly delay the switching speed in the adjacent pixels, but they show fully colored and bleached state in 5 s. On the other hand, the dynamic absorption changes at working- and counter-line sharing pixels are saturated at ~20% compared to the change at target pixel in the electrolyte localized electrochromic displays, which indicates that the remained crosstalk originate from other mechanism rather than the charge transfer through the electrolyte layer. We find another source of crosstalk from recorded voltages at the adjacent pixels in electrolyte patterned display. The working- or counter-line sharing pixels show small, but distinct voltage changes with applying bias to target pixel, resulting from an interaction between pixels via the electrodes associated with the matrix. The voltage communication effects in designing of electrical circuits can be resolved with introduction of semiconductor diode in integrated circuits or printed circuit board for further electrical applications.

The issue in electrical circuits is relatively small (~20%) compared to unwanted charge transfer in delocalized electrolyte, thus the real-time pixelated image display is demonstrated using the passive matrix electrochromic displays by applying the voltage to target pixels along the counter electrode lines sequentially. Although the voltage is applied with interval of ~10 s due to absence of the advanced processing chips, the all-polymer electrochromic displays exhibit well-resolved pixelated letter graphics of "P" and "U" using their excellent optical memory. The electrochromic displays successfully demonstrate the wanted graphics with reduced crosstalk and reversible image changes. The additional energy consumption is not required to maintain the displayed contents because of their large optical memory. Through the efficient energy consumption and pixelated image projection in all-polymer non-emissive displays, our findings open up new possibilities for the realization of compact see-through pixelated displays in energy saved, on-chip platforms.

In some embodiments, a transmissive display for segmented graphic production is achieved through photolithographic patterning of all-polymer electrochromic components. First, two electrochromic polymers of blue and magenta are directly patterned with the selective UV light exposure for wanted graphic display. After spin-coating ECP-B solution with the photo-crosslinker, the films are exposed to selective UV light and treated in solvent to remove the uncrosslinked polymer layer. The other ECP-M pattern is developed through same process. Due to the large solvent resistances via the photo-crosslinking in the polymer chains, sophisticated patterns can be formed with no crosstalk in even microscale. The patterned electrochromic displays show exceptional see-through properties with optical modulation between the transmissive "train" graphic and transparent blank depending on the extrinsic potential.

In some embodiments, fabrication of a flexible, all-polymer ECD is commenced by deposition of the polymer conductor on plastic substrate. The n-PBDF films are easily formed using spin-coating of DMSO solution on the flexible polyethylene terephthalate (PET) substrate without additional thermal treatment, suggesting the high compatibility to the flexible plastic substrates. Other electrochromic components are deposited similarly to rigid ECDs. Flexible characterizations are conducted at various bending radii to investigate the mechanical flexibility and operational stability of the all-polymer ECDs. Bending test is performed with five bending radii (i.e., 4.0, 2.5, 2.0, 1.4, and 0.5 cm). Based on the optical absorbance spectra of the all-polymer ECDs in both colored and bleached states at various radii, including initial status, all-polymer ECDs show highly stable color switching at the various bending radii, down to 1.4 cm. The electrochemical stability upon different bending radii is tested by recording transient current of ECDs in redox reaction. They exhibit highly stable and relatively enhanced transient current as the bending radius increased. It may originate from thinner device, especially on electrolyte thickness change by increased tensile strain. The optical densities at the smaller bending radii condition could not be recorded because of the difficulty of setting the bended samples in linear path between the beam and detector in our spectrometer. Instead, the color switching at highly bended status is demonstrated as shown in photographic images of all-polymer devices with bending radius of 5 mm. They show stable and reversible color switching by small electric bias (−1.2 V for coloration and +1.2 V for bleaching process). Furthermore, the bending cycle test is conducted to investigate the mechanical stability of the device at a bending radius of 5 mm. Optical absorbance and transient current of all-polymer ECDs are monitored before and after 100, 1000 and 10,000 bending cycles. Although it demonstrates a slightly reduced transient current in the electrochromic polymer oxidation but a negligible change in reduction transient current, switching time, and static optical absorbance in both coloration and bleaching of ECDs. This result clearly indicates the effectiveness of all-polymer ECDs in terms of flexibility and operational electrochemical stability even for repetitive and severe bending conditions.

Figure 24:
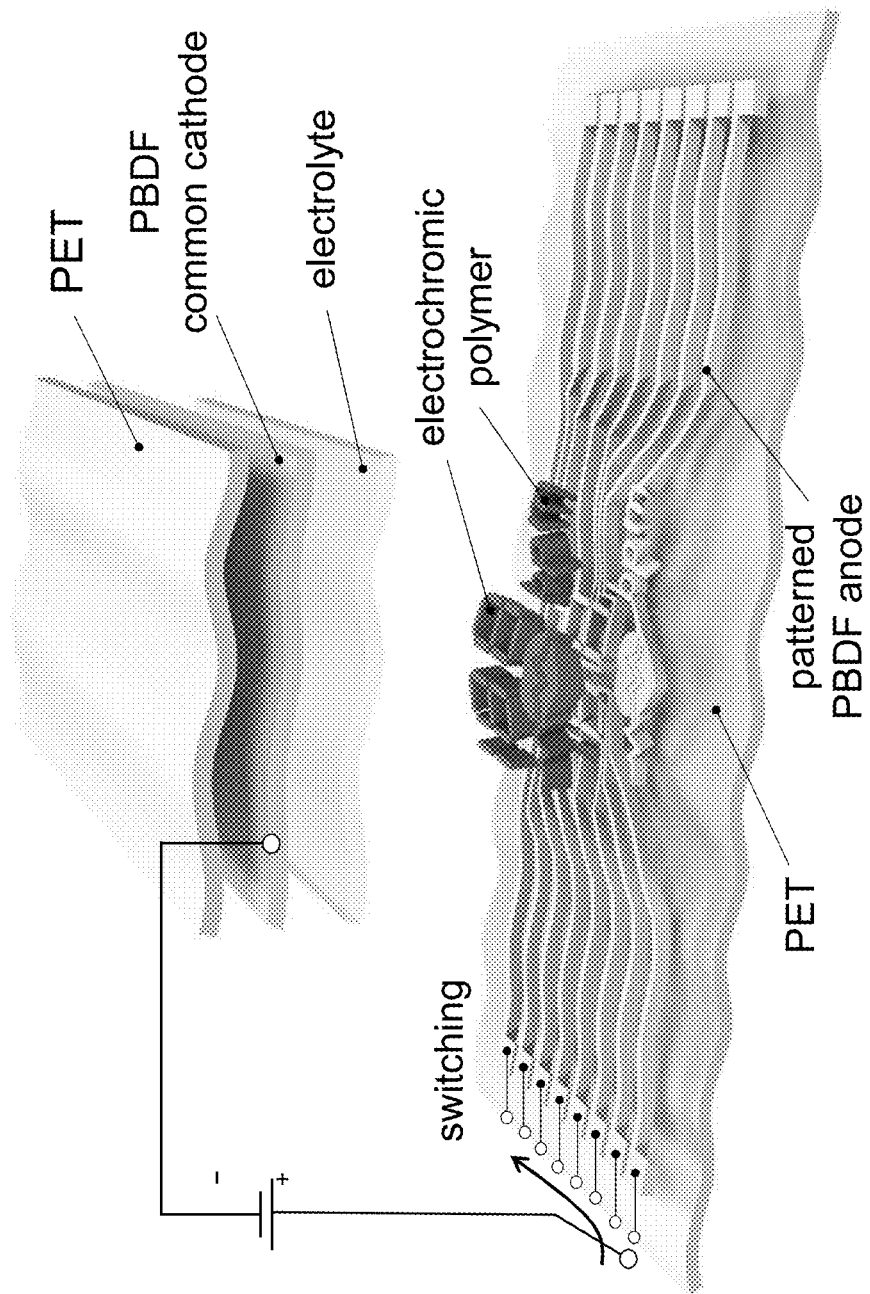
FIG. 24 is an example schematic diagram of all-polymer segmented electrochromic device or display.
Figure 25A:
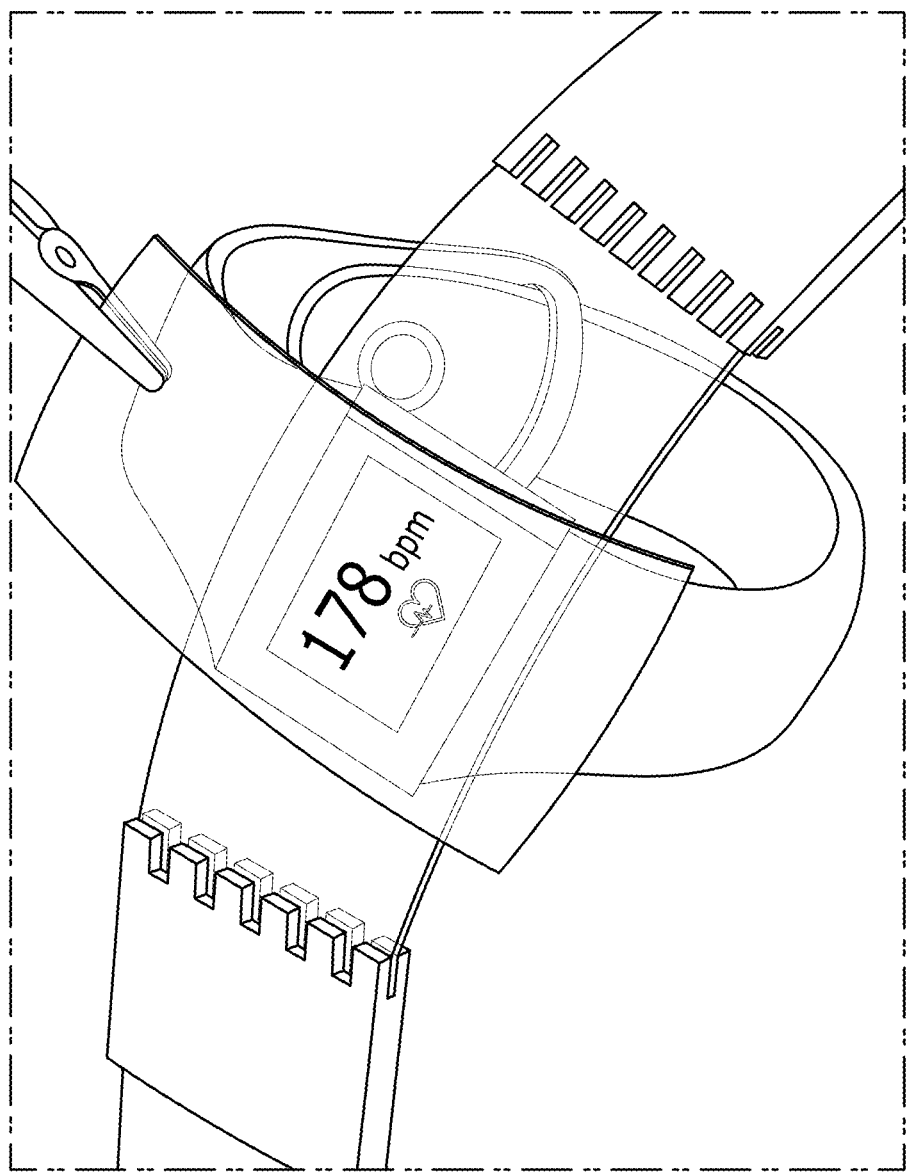
FIGS. 25(A)-(B) contain the images of diverse applications of all-polymer segmented electrochromic display.
Figure 25B:
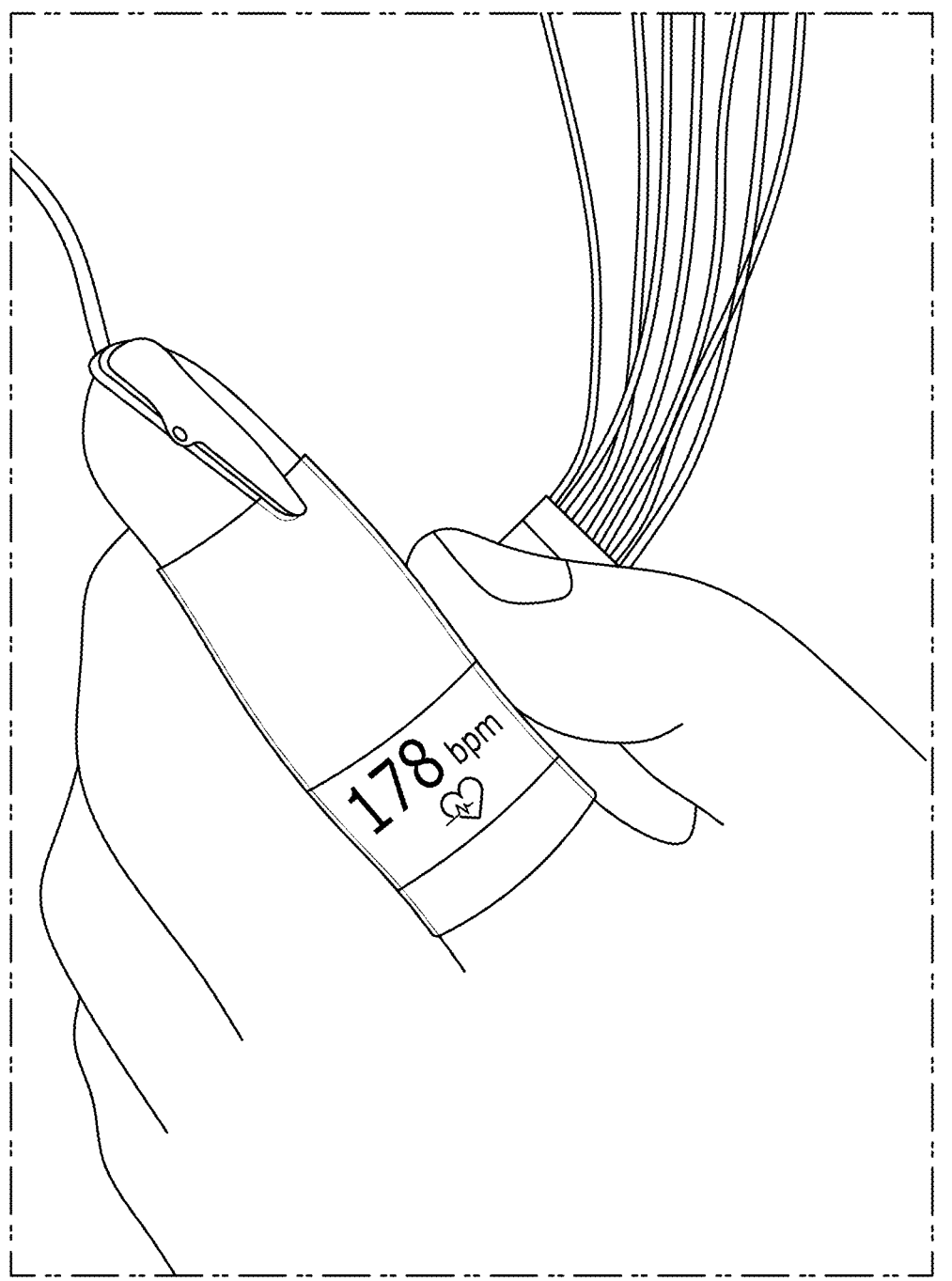

While considering the advantages such as the high optical contrast, neutral color expression, reliable flexibility, and photo-patternable nature in all-polymer ECDs, paper-like see-through electrochromic displays are carefully fabricated using the developed all-polymer systems here. For practical graphic production, we pattern more sophisticated design of both polymer conductor and electrochromic polymers for flexible, all-polymer electrochromic display. One example of all-polymer displays attached on human skin exhibit the designed, transmissive electrochromic polymer graphics on transparent n-PBDF conductor layers. Furthery, to operate two 7-segment display for all number representation and other "heart", alphabet, and "1" graphic display as illustrated in FIG. 24, fifteen PBDF conductor and contact lines are firstly deposited and patterned using conventional photolithography on plastic substrates. Two colors of ECPs are deposited and directly patterned with selective UV light on the patterned the n-PBDF conductor lines. As common cathode, n-PBDF is deposited on the other PET substrate and covers onto the electrolyte precursor solution dropped anode substrates, following by UV light irradiation for electrolyte crosslinking. Electrochromic graphics are digitally driven using a customed multiplexing multichannel controller with power supply through the n-PBDF contact lines and common cathode. The all-polymer electrochromic display successfully demonstrates different "numbers" and graphics with selective driving of segments and can be refreshed in several seconds through the redox reaction. Using the feature of all-polymer platforms, the flexible see-through display is utilized on watch band and human skin with ring-like structures to demonstrate their practical application potential (FIG. 25(A)-(B)). Thanks to reliable flexibility and robust electrochemical stability, all-polymer displays exhibit well-resolved, real-time transmissive graphic displays at bended condition, even on the human finger using ring-like structures with bending radius of 1.5 cm. The flexible, all-polymer electronics using transparent/capacitive n-type conductor is expected to be useful in next-generation optoelectronics with a further development on conjugated systems.

The adoption of the disclosed n-doped organic conductive polymer as a capacitive transparent organic conductor represents a novel strategy for fabricating flexible, electrochromic displays and is expected to advance the development of other electrochemical devices. The disclosed n-doped organic conductive polymer exhibits highly conductive and capacitive properties while retaining the high optical transmittance and minimal color changing transparency in the range of electrochemical potential window, serving as both the transparent conductor and the ion storage materials simultaneously as counter electrodes in electrochromic devices as well as transparent working electrodes and electrical interconnects in the devices. In addition, low reduction potential enables operational stability in ambient condition with well-matched potential window to p-type electrochromic polymers. The in-situ photolithographic patterning in ECPs and solid electrolyte allows development of the patterned devices (e.g., all-polymer displays) for both segmented and pixelated applications without distinct crosstalk. These photo-patternable electrochromic components are highly transparent, resulting in see-through display applications with excellent outdoor readability and a non-emissive eye-friendly mode, and exceptional energy-saving capabilities. In addition, the electrochromic devices exhibit excellent bistability (e.g., optical memory) because of the robust and dense EDL formed by ionic liquids. Our results demonstrate a successful approach to the transparent, capacitive polymer conductors and photo-patternable electrochromic components, which may serve as a commercially viable practical solution for bio-compatible, flexible optoelectronics through the all-polymer platforms.

The disclosed electrochemical device comprises the disclosed n-doped organic conductive polymer serving as a transparent conductor, and/or an ion storage material, and/or an electrical interconnect in electronic circuits. The disclosed electrochromic device is selected from the group including energy storage devices, bioelectronics, biosensors, and optoelectronic devices.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. An electrochromic device, comprising two substrates and a plurality of areas disposed between the two substrates, wherein each of the areas comprises:
   a first conducting layer;
   an electrolyte layer on top of the first conducting layer;
   an electrochromic layer on top of the electrolyte layer; and
   a second conducting layer on top of the electrochromic layer,
   wherein the first conducting layer comprises an n-doped organic conductive polymer with a formula of

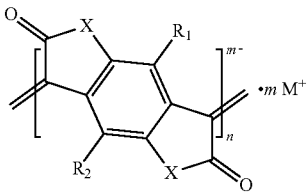

wherein X is O, S, or Se; each of m and n is an integer greater than zero; each of $R_1$ and $R_2$ is independently selected from one of hydrogen, halogen, or $C_1$-$C_{10}$ alkyl; $M^+$ is an organic or metal cation; $m^-$ is negative charges that balance $mM^+$.

2. The electrochromic device of claim 1, wherein the second conducting layer comprises the n-doped organic conductive polymer.

3. The electrochromic device of claim 1, wherein a thickness of the second conducting layer is less than a thickness of the first conducting layer.

4. The electrochromic device of claim 1, further comprising an ion storage layer disposed between the first conducting layer and the electrolyte layer, wherein the ion storage layer does not comprise the n-doped organic conductive polymer.

5. The electrochromic device of claim 1, wherein each of the electrolyte layer and the electrochromic layer are made of polymer.

6. The electrochromic device of claim 1, wherein the electrolyte layer is a solid electrolyte layer.

7. The electrochromic device of claim 1, wherein the areas comprise a first area and a second area, wherein the first area comprises a first electrochromic layer different from a second electrochromic layer of the second area for displaying different colors.

8. The electrochromic device of claim 1, wherein at least one of the substrates is flexible.

9. The electrochromic device of claim 1, wherein the first conducting layer or the second conducting layer are transparent or semi-transparent.

10. The electrochromic device of claim 1, further comprising a conductive polymer interconnect connecting two adjacent areas.

11. The electrochromic device of claim 10, wherein the conductive polymer interconnect comprises the n-doped organic conductive polymer.

12. The electrochromic device of claim 1, wherein each of the areas in a bleached stated is transparent to enable the electrochromic device to become a see-through display.

13. The electrochromic device of claim 1, wherein the first conducting layer has minimal color changing transparency in wavelength between 380 nm and 800 nm with a color chroma change $\Delta C^*$ less than 5 between an oxidized state and a reduced state of the first conducting layer.

14. The electrochromic device of claim 1, wherein the electrochromic device is applied with an electrical potential and operated at less than 3 volts.

15. The electrochromic device of claim 1, wherein the electrochromic device is applied with an open circuit potential and has a transmittance decay $\Delta T<5\%$ for 1000 seconds of operation at each reduction or oxidation potential bias.

16. The electrochromic device of claim 1, wherein the areas comprise a first area and a second area, wherein the electrochromic layer and the second conducting layer of the first area are separated from the electrochromic layer and the second conducting layer of the second area, wherein the second conducting layer of the first area and the second conducting layer of the second area are connected by a first conductive polymer interconnect disposed therebetween.

17. The electrochromic device of claim 16, wherein the electrolyte layer and the first conducting layer of the first area are separated from the electrolyte layer and the first conducting layer of the second area, wherein the first conducting layer of the first area and the first conducting layer of the second area are connected by a second conductive polymer interconnect disposed therebetween.

18. The electrochromic device of claim 1, wherein X is O, each of $R_1$ and $R_2$ is hydrogen, and $M^+$ is a proton, and the n-doped organic conductive polymer becomes a formula of

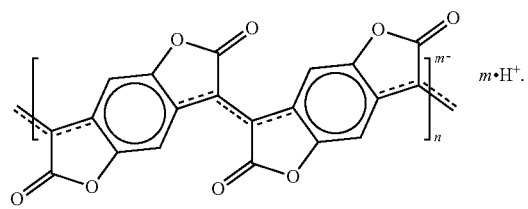

19. A method for forming an electrochromic device, comprising:

coating a first conducting layer on a first substrate, wherein the first conducting layer comprises an n-doped organic conductive polymer with a formula of

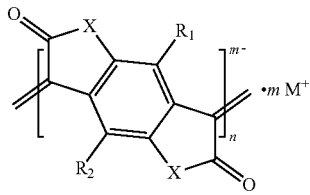

wherein X is O, S, or Se; each of m and n is an integer greater than zero; each of $R_1$ and $R_2$ is independently selected from one of hydrogen or $C_1$-$C_{10}$ alkyl; $M^+$ is an organic or metal cation; $m^-$ is negative charges that balance $mM^+$;

patterning the first conducting layer to form first areas and first electric interconnects between adjacent first areas;

coating a second conducting layer on a second substrate;

patterning the second conducting layer to form second areas and second electric interconnects between adjacent second areas; and performing one of the following:

a) forming a first electrolyte layer on each of the first areas, wherein the first electrolyte layers are separated from each other; forming an electrochromic layer on each of the second areas, wherein the electrochromic layers are separated from each other; forming a second electrolyte layer on each of the electrochromic layers, wherein the second electrolyte layers are separated from each other; and laminating (1) the first substrate having the first areas, the first electric interconnects, and the first electrolyte layers, and (2) the second substrate having the second areas, the second electric interconnects, the electrochromic layers, and the second electrolyte layers such that the first electrolyte layers are aligned with and in contact with the second electrolyte layers; or b) forming an electrolyte layer on each of the first areas, wherein the electrolyte layers are separated from each other; forming an electrochromic layer on each of the electrolyte layers, wherein the electrochromic layers are separated from each other; and laminating (1) the first substrate having the first areas, the first electric interconnects, the electrolyte layers, and the electrochromic layers, and (2) the second substrate having the second areas and the second electric interconnects such that the electrochromic layers are aligned with and in contact with the second areas; or c) forming an electrochromic layer on each of the second areas, wherein the electrochromic layers are separated from each other; forming an electrolyte layer on each of the electrochromic layers, wherein the electrolyte layers are separated from each other; and laminating (1) the first substrate having the first areas and the first electric interconnects, and (2) the second substrate having the second areas, the second electric interconnects, the electrochromic layers, and the electrolyte layers such that the electrolyte layers are aligned with and in contact with the first areas.

20. An electrochromic device, comprising two substrates and layers disposed between the two substrates, wherein the layers comprise:

a first conducting layer;

an electrolyte layer on top of the first conducting layer;

an electrochromic layer on top of the electrolyte layer; and a second conducting layer on top of the electrochromic layer, wherein the first conducting layer comprises a n-doped poly (3,7-dihydrobenzo [1,2-b:4,5-b']difuran-2,6-dione) (n-PBDF) with a formula of

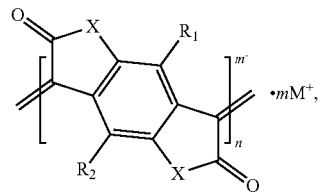

where each of m and n is an integer greater than zero, and m' is negative charges that balance mM+.

21. The electrochromic device of claim 20, wherein the second conducting layer comprises n-PBDF.

22. The electrochromic device of claim 20, wherein a thickness of the second conducting layer is less than a thickness of the first conducting layer.

23. The electrochromic device of claim 20, further comprising an ion storage layer disposed between the first conducting layer and the electrolyte layer, wherein the ion storage layer comprises no n-PBDF.

24. The electrochromic device of claim 20, wherein each of the electrolyte layer and the electrochromic layer are made of polymer.

25. The electrochromic device of claim 20, wherein the electrolyte layer is a solid electrolyte layer.

26. The electrochromic device of claim 20, wherein at least one of the substrates is flexible.

27. The electrochromic device of claim 20, wherein the first conducting layer or the second conducting layer are transparent or semi-transparent.

28. The electrochromic device of claim 20, wherein the first conducting layer has minimal color changing transparency in wavelength between 380 nm and 800 nm with a color chroma change $\Delta C^*$ less than 5 between an oxidized state and a reduced state of the first conducting layer.

29. The electrochromic device of claim 20, wherein the electrochromic device is applied with an electrical potential and operated at less than 3 volts.

30. The electrochromic device of claim 20, wherein the electrochromic device is applied with an open circuit potential and has a transmittance decay $\Delta T <5\%$ for 1000 seconds of operation at each reduction or oxidation potential bias.

* * * * *